(12) United States Patent
Liang et al.

(10) Patent No.: US 9,686,776 B2
(45) Date of Patent: Jun. 20, 2017

(54) METHOD AND DEVICE FOR PROCESSING INFORMATION

(71) Applicant: ZTE Corporation, Shenzhen (CN)

(72) Inventors: Chunli Liang, Shenzhen (CN); Bo Dai, Shenzhen (CN); Shuqiang Xia, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 88 days.

(21) Appl. No.: 14/420,346

(22) PCT Filed: Jul. 31, 2013

(86) PCT No.: PCT/CN2013/080558
§ 371 (c)(1),
(2) Date: Feb. 6, 2015

(87) PCT Pub. No.: WO2013/178187
PCT Pub. Date: Dec. 5, 2013

(65) Prior Publication Data
US 2015/0223230 A1    Aug. 6, 2015

(30) Foreign Application Priority Data
Aug. 6, 2012   (CN) .......................... 2012 1 0284733

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/0026* (2013.01); *H04L 1/0027* (2013.01);
(Continued)

(58) Field of Classification Search
CPC ... H04L 1/0026; H04L 1/0027; H04L 1/1671; H04L 1/1812; H04L 1/1854;
(Continued)

(56) References Cited

U.S. PATENT DOCUMENTS 9,100,969 B2 * 8/2015 Kim .................... H04W 72/082
9,338,768 B2 * 5/2016 Han .................. H04W 72/0413
(Continued)

FOREIGN PATENT DOCUMENTS

| CN | 101908951 A | 12/2010 |
|---|---|---|
| CN | 102315910 A | 1/2012 |

(Continued)

OTHER PUBLICATIONS

Samsung, R1-074786: Simultaneous transmission of ACK/NACK and CQI, Nov. 9, 2007, 3GPP TSG RAN WG1 Meeting #51.*
(Continued)

*Primary Examiner* — Michael Thier
*Assistant Examiner* — Eric Nowlin
(74) *Attorney, Agent, or Firm* — Cantor Colburn LLP

(57) ABSTRACT

Disclosed are a method and an device for processing information. In the method, a UE receives a higher-layer signaling from a base station, wherein the higher-layer signaling carries uplink channel resources configured by the base station for the UE, and the uplink channel resources are used for simultaneously transmitting periodic channel state information P-CSI of a plurality of serving cells corresponding to the UE, or are used for simultaneously transmitting hybrid automatic repeat request acknowledgments HARQ-ACKs of the plurality of serving cells corresponding to the UE and the P-CSI of the plurality of serving cells; and the UE simultaneously transmits the P-CSI of the plurality of serving cells on the uplink channel resources according to the higher-layer signaling in a preset uplink sub-frame, or
(Continued)

simultaneously transmits the HARQ-ACKs of the plurality of serving cells and the P-CSI of the plurality of serving cells.

9 Claims, 17 Drawing Sheets

(51) Int. Cl.
H04L 5/00 (2006.01)
H04L 1/16 (2006.01)
H04W 28/06 (2009.01)
H04L 5/14 (2006.01)
H04L 1/00 (2006.01)

(52) U.S. Cl.
CPC .......... *H04L 1/0031* (2013.01); *H04L 1/1671* (2013.01); *H04L 1/1861* (2013.01); *H04L 5/001* (2013.01); *H04L 5/0035* (2013.01); *H04L 5/0055* (2013.01); *H04L 5/0057* (2013.01); *H04L 5/0094* (2013.01); *H04L 5/14* (2013.01); *H04W 72/042* (2013.01); *H04W 72/0446* (2013.01); *H04L 1/1812* (2013.01); *H04W 28/06* (2013.01)

(58) Field of Classification Search
CPC ..... H04L 1/1861; H04L 5/001; H04L 5/0035; H04L 5/0053; H04L 5/0055; H04L 5/0057; H04L 5/0094; H04L 5/14; H04L 1/0031; H04L 1/1896; H04W 72/0413; H04W 72/042; H04W 72/0446; H04W 28/06; H04W 24/10; H04B 7/0626
See application file for complete search history.

(56) References Cited

U.S. PATENT DOCUMENTS

| 9,450,714 | B2* | 9/2016 | Hwang | H04L 1/0026 |
| 2011/0249578 | A1* | 10/2011 | Nayeb Nazar | H04L 1/0027 370/252 |
| 2011/0269490 | A1* | 11/2011 | Earnshaw | H04L 1/0026 455/509 |
| 2011/0310759 | A1* | 12/2011 | Gerstenberger | H04L 5/001 370/252 |
| 2012/0082157 | A1* | 4/2012 | Yamada | H04L 1/0073 370/389 |
| 2012/0087254 | A1* | 4/2012 | Yin | H04L 1/0031 370/252 |
| 2012/0113827 | A1* | 5/2012 | Yamada | H04L 1/0031 370/252 |
| 2012/0113907 | A1* | 5/2012 | Baldemair | H04W 52/146 370/329 |
| 2012/0120817 | A1* | 5/2012 | Khoshnevis | H04L 1/0026 370/252 |
| 2012/0127869 | A1* | 5/2012 | Yin | H04L 1/0031 370/252 |
| 2012/0140649 | A1* | 6/2012 | Choudhury | H04W 24/10 370/252 |
| 2012/0140708 | A1* | 6/2012 | Choudhury | H04W 72/082 370/328 |
| 2013/0083741 | A1* | 4/2013 | Larsson | H04L 5/0094 370/329 |
| 2013/0083742 | A1* | 4/2013 | Baldemair | H04L 1/003 370/329 |
| 2013/0083748 | A1* | 4/2013 | Li | H04L 5/14 370/329 |
| 2013/0121299 | A1* | 5/2013 | Kim | H04L 5/001 370/329 |
| 2013/0148515 | A1* | 6/2013 | Ribeiro | H04L 5/0094 370/252 |
| 2013/0170443 | A1* | 7/2013 | He | H04L 1/0026 370/329 |
| 2013/0188589 | A1* | 7/2013 | Nakashima | H04B 7/0404 370/329 |
| 2013/0208665 | A1* | 8/2013 | Baldemair | H04L 1/0031 370/329 |
| 2013/0242860 | A1* | 9/2013 | Kim | H04W 72/082 370/328 |
| 2013/0250903 | A1* | 9/2013 | Ahn | H04W 72/0413 370/329 |
| 2013/0272258 | A1* | 10/2013 | Lee | H04B 7/0413 370/329 |
| 2013/0286993 | A1* | 10/2013 | Lee | H04L 5/001 370/329 |
| 2014/0023011 | A1* | 1/2014 | Gao | H04L 1/0031 370/329 |
| 2014/0036704 | A1* | 2/2014 | Han | H04W 28/12 370/252 |
| 2014/0204842 | A1* | 7/2014 | Kim | H04W 52/146 370/328 |
| 2014/0307652 | A1* | 10/2014 | Zhang | H04W 52/325 370/329 |
| 2015/0016351 | A1* | 1/2015 | Lee | H04L 1/1671 370/329 |
| 2015/0043452 | A1* | 2/2015 | Li | H04L 1/0026 370/329 |
| 2015/0110029 | A1* | 4/2015 | Hwang | H04L 1/0026 370/329 |
| 2015/0365925 | A1* | 12/2015 | Fu | H04W 24/10 370/329 |
| 2016/0174212 | A1* | 6/2016 | Yang | H04L 5/001 370/330 |
| 2016/0212712 | A1* | 7/2016 | Chen | H04W 52/146 |
| 2016/0337110 | A1* | 11/2016 | Yang | H04L 1/1854 |

FOREIGN PATENT DOCUMENTS

| CN | 102377537 A | 3/2012 | |
| CN | 102468927 A | 5/2012 | |
| CN | 102468933 A | 5/2012 | |
| CN | WO 2012065578 A1 * | 5/2012 | ............ H04W 24/10 |
| CN | WO 2012155499 A1 * | 11/2012 | ........... H04B 7/0626 |
| WO | 2011115421 A2 | 9/2011 | |

OTHER PUBLICATIONS

CATT, R1-104318: Combination of UCI Transmission in LTE-A, Aug. 27, 2010, 3GPP TSG RAN WG1 Meeting #62.*
Huawei et al., R1-105123: Simultaneous Transmissio of CQI and ACK/NACK, Oct. 15, 2010, 3GPP TSG RAN WG1 meeting #62bis.*
International Search Report for corresponding application PCT/CN2013/080558 filed Jul. 31, 2013; Mail date Nov. 7, 2013.
Supplementary Partial European Search Report for corresponding application EP13797191 filed Jul. 31, 2013; Mail date Apr. 29, 2016.

* cited by examiner

METHOD AND DEVICE FOR PROCESSING INFORMATION

TECHNICAL FIELD

The disclosure relates to the field of communications, and in particular to a method and device for processing information.

BACKGROUND

The rapid development of digital communication systems raises a higher demand to the reliability of the data communication, however, under poor channel conditions, especially under high data rate or mobile environments, the phenomena such as multi-path interference and Doppler shift greatly affect the performance of these systems. Therefore, effective error control techniques-especially Hybrid Automatic Repeat Request (HARQ)-have became a research hotspot in the field of communication.

In the downlink HARQ of a Long Term Evolution (LTE) system, a HARQ Acknowledgement (HARQ-ACK) of a Physical Downlink Shared Channel (PDSCH) will be transmitted over a Physical Uplink Control Channel (PUCCH) when a User Equipment (UE) has no Physical Uplink Shared Channel (PUSCH), wherein the HARQ-ACK can comprise the following three states: acknowledgement (ACK), negative acknowledgement, and discontinuous transmission (DTX) respectively.

In a present LTE system, the Physical Uplink Shared Channel can support multiple uplink control signaling, including the above HARQ-ACK and Periodic Channel State Information (P-CSI), wherein the P-CSI may include Channel Quality Indicator (CQI), Precoding Matrix Indicator (PMI) and Rank Indicator (RI), Scheduling Request (SR) and their combinations when being transmitted simultaneously.

The LTE defines multiple PUCCH formats, including: PUCCH format 1/1a/1b (its structural schematic diagram is shown in FIG. 1) and format 2/2a/2b (its structural schematic diagram is shown in FIG. 2), wherein the format 1 is used for transmitting the scheduling requests of the UE, format 1a and 1b are used respectively for feeding back 1-bit HARQ-ACK and 2-bit HARQ-ACK, format 2 is used for transmitting the downlink P-CSI, format 2a is used for transmitting the P-CSI and 1-bit HARQ-ACK, and format 2b is used for transmitting the P-CSI information and 2-bit HARQ-ACK.

In a frequency division duplex (FDD) system of the LTE system, since there is a one-to-one correspondence between the uplink and downlink sub-frames, the UE will feed back 1-bit HARQ-ACK when the PDSCH comprises only one transmitting block; and the UE will feed back 2-bit HARQ-ACK when the PDSCH comprises two transmitting block. Therefore in a LTE FDD system, in the case of the UE needing to simultaneously transmit the SR and HARQ-ACK, the UE transmits 1-bit or 2-bit HARQ-ACK on the HARQ-ACK PUCCH resource allocated to it if it is necessary to transmit the negative SR (this indicates no scheduling request); the UE transmits 1-bit or 2-bit HARQ-ACK on the SR PUCCH resource allocated to it if it is necessary to transmit the positive SR (this indicates to make a scheduling request); and in the case of the UE needing to simultaneously transmit the HARQ-ACK and CSI information, if a sub-frame is a normal cyclic prefix, 1-bit or 2-bit HARQ-ACK are modulated to the second reference signal of each slot and transmitted the 1-bit or 2-bit HARQ-ACK by using the PUCCH format 2a/2b, and if the sub-frame is an extended cyclic prefix, 1-bit or 2-bit HARQ-ACK and P-CSI are encoded jointly and transmitted the encoded 1-bit or 2-bit HARQ-ACK and P-CSI by using the format 2.

However in a Time Division Duplexing (TDD) system of the LTE, there is no one-to-one correspondence between the uplink and downlink sub-frames, and a uplink sub-frame sometimes needs to feed back the HARQ-ACKs of a plurality of downlink sub-frames according to the configuration of different uplink and downlink sub-frames, wherein the plurality of downlink sub-frames corresponding to the uplink sub-frame are called as a bundling window, and a size of the bundling window can be defined as M. In addition, in the LTE system, two HARQ-ACK feedback modes are further defined: one of them is a bundling mode, the core idea of which is to perform a logic and operation on the HARQ-ACKs of transmitting blocks corresponding to each of the downlinks sub-frames needed to be fed back on the uplink sub-frame, and if a downlink sub-frame has two codeword streams, the UE will feed back 2-bit HARQ-ACK; and if each of the downlink sub-frames has only one word stream, the UE will feed back 1-bit HARQ-ACK; and the other one is a multiplexing mode (also known as multiplexing with channel selection), the core idea of which is to utilize the different PUCCHs and the different modulation symbols on these channels to denote the different feedback states of the downlinks sub-frames needed to be fed back on the uplink sub-frame, and if there are multiple word streams on the downlink sub-frames, before selecting the channel, a spatial logic and operation (also known as spatial bundling) can be performed firstly on the HARQ-ACKs fed back by the multiple word streams of the downlink sub-frames, and then they are transmitted by using the PUCCH format 1b. Namely, the HARQ-ACKs after the logic and operation is represented by 2-bit information b(0) and b(1) carried by the PUCCH format 1b and an index of the PUCCH channel.

Therefore in the TDD system, when the HARQ-ACKs need to be transmitted simultaneously together with the SR or P-CSI, the transmitting mode thereof is different from that of the foregoing FDD system. When the HARQ-ACK needs to be transmitted simultaneously together with the SR or CQI, the UE performs a spacial bundling on a plurality of HARQ-ACKs in the bundling window to obtain the HARQ-ACKs corresponding to each of the downlink sub-frames, acquires the corresponding 2-bit information b(0), b(1) according to the number of ACKs after the spacial bundling in the bundling window, and then transmits b(0), b(1) over the PUCCH corresponding to the SR (when the positive SR is transmitted simultaneously), or transmits b(0), b(1) on the PUCCH format 2 after b(0), b(1) are modulated on a second reference signal of the PUCCH format 2b or after b(0), b(1) and P-CSI are jointly coded (the latter two cases are corresponding to the scenario of simultaneous transmission of the P-CSI and HARQ-ACK), wherein there is a preset mapping relation between the number of ACKs after the spacial bundling processing in the bundling window and b(0), b(1), as shown in Table 1:

TABLE 1

The mapping relation between the number of ACKs after the spacial bundling processing in the bundling window and b(0), b(1)

| The number of ACKs after the spacial bundling processing in the bundling window | b(0), b(1) |
|---|---|
| 0 or none (The UE detects that at least one downlink allocation is lost) | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

In an International Mobile Telecommunications-Advanced (IMT-Advanced) system, it can realize the high-speed data transmission and has more system capacity, and in the case of low-speed movement, hot-spot coverage, the peak rate of the IMT-advanced can reach 1 Gbit/s, while in the case of high-speed movement, wide-area coverage, the peak rate of the IMT-advanced can reach 100 Mbit/s.

In order to satisfy the requirements of international telecommunication union-advanced (ITU-Advanced), a long term evolution advanced (LTE-A) system, as an evolution standard of the LTE, is required to support greater system bandwidth (up to 100 MHz) and backwards compatible with the existing standard of the LTE. Based on the existing LTE system, the bandwidth of a LTE system can be combined to obtain a wider bandwidth, which is called as a Carrier Aggregation (CA) technology, and the technology can improve the spectrum efficiency of the IMT-Advanced system and relieve the shortage of spectrum resources, thereby optimizing the utilization of the spectrum resources. Therefore the system bandwidth of LTE after carrier aggregation can be regarded as component carriers, each of which can also be called as a serving cell, namely a spectrum can be aggregated by n component carriers (cells). For the case that the resource of a UE is composed of a plurality of serving cells in frequency domain, one cell therein is called as a primary serving cell, and the others are called as secondary serving cells. After introducing the carrier aggregation technology, a downlink component carrier corresponds to a PDSCH transmitting block and a HARQ process when a space division multiplexing is not adopted, namely the UE needs to feed back 1-bit HARQ-ACK for the PDSCH transmitting block of each of the component carriers. However, when adopting the space division multiplexing, at most 2 transmitting blocks are support under current rules of LTE-A. Therefore in this case, the UE needs to feed back 2-bit HARQ-ACK for 2 PDSCH transmitting blocks of the downlink component carriers.

In a LTE-A system adopting the carrier aggregation technology, the uplink bandwidth and the downlink bandwidth thus can comprise a plurality of serving cells. When the base station has the PDSCH scheduled to a certain UE on multiple downlink component carriers, and when there is no PUSCH to be transmitted by the UE on the current sub-frame, the UE needs to feed back the HARQ-ACK transmitted by the PDSCH of the multiple downlink component carriers on the PUCCH. It is ruled in the related arts that all uplink control information, including SR, HARQ-ACK and P-CSI, are all transmitted on the primary serving cell.

In the LTE-A system, for the SR information, the UE adopts the PUCCH format 1 to transmit, and for the HARQ-ACK, besides the PUCCH format 1a and 1b and multiplexing with channels selection already defined in the LTE, one new format based on DFT-s-OFDM is added to LTE-A in order to transmit the HARQ-ACK with more load, and its structural schematic diagram is shown in FIG. 3. For ease of description, this structure can be called as PUCCH format 3, wherein adopting which mode to feed back the HARQ-ACK in the UE can be configured by the higher-layers. For the P-CSI, although the UE possibly needs to transmit the P-CSI of a plurality of downlink serving cells on a uplink sub-frame, in view of the fact that the case of carrier aggregation is mainly considered for aggregation of two serving cells in an initial version (hereinafter called as Rel-10) of the LET-A, it can be avoided for the UE to transmit the P-CSI of a plurality of serving cells in a same sub-frame so long as eNB is configured rationally. Namely in the Rel-10, the simultaneous transmission of the P-CSI of a plurality of serving cells is not supported. When a sub-frame needs to be transmitted on a plurality of uplink sub-frames, a corresponding priority principle is defined in the Rel-10 for the P-CSI, so that the UE can select a P-CSI with highest priority and transmit it according to the priority principle.

In the Rel-10, the following types of P-CSI reports are defined concretely:

Type 1: supporting the feedback of sub-bands CQI selected by the UE;

Type 1a: supporting the feedback of sub-bands CQI and the second PMI;

Type 2, Type 2b and Type 2c: supporting the feedback of broadband CQI and PMI;

Type 2a: supporting the feedback of broadband PMI;

Type 3: supporting the feedback of RI;

Type 4: supporting the feedback of broadband CQI;

Type 5: supporting the feedback of RI and broadband PMI;

Type 6: supporting the feedback of RI and PTI.

The priority of the above types of P-CSI reports is as following:

for a same serving cell, the priorities of report types 3, 5, 6 are higher than those of reports 1, 1a, 2, 2a, 2b, 2c, or 4;

for the different serving cells, the priorities of report types 3, 5, 6, 2a of a serving cell are higher than those of report types 1, 1a, 2, 2b, 2c, or 4 of another serving cell; and for the report types with a same priority, the priority of the P-CSI report type with a smallest index value in their corresponding serving cells is highest.

In addition, in the Rel-10 system, the UE also does not support the transmission of the HARQ-ACKs and P-CSI of a plurality of serving cells on an uplink sub-frame, the reason of which is same as above and no more repeat here. Since a typical case of carrier aggregation of the Rel-10 aims to two serving cells, it can be avoided for the UE to simultaneously transmit the HARQ-ACKs and P-CSI of a plurality of serving cells by means of a reasonable schedule, and if a collision occurs, according to the related rules in the Rel-10, the P-CSI are discarded and only HARQ-ACKs are transmitted.

However in a subsequent version (hereinafter called as Rel-11) of the LTE-A, the number of serving cells participating in aggregation is not limited to 2, and therefore the probability of collision of the P-CSI of a plurality of serving cells and collision between the HARQ-ACKs and P-CSI of a plurality of serving cells becomes increasingly higher. If a strategy of discarding the P-CSI with low priority or directly discarding the P-CSI of all serving cells ruled in the Rel-10 is adopted still, this may cause that the CSI information will be not fed back timely, thereby affecting the downlink scheduling and downlink throughput performance. Therefore in the Rel-11, two research goals of enhancing the uplink control signaling are presented: whether to support the simultaneous transmission of the P-CSI of a plurality of serving cells on a sub-frame; and whether to support the simultaneous transmission of the HARQ-ACKs and P-CSI of a plurality of serving cells. Meanwhile in the Rel-11, a Coordinated Multi-Point Transmission and Reception (CoMP) technology is introduced, and in a system with the CoMP being introduced, the P-CSI needed to be transmitted will also increases correspondingly, and the resource of each Channel State Information-Reference Signal (CSI-RS) corresponds to a P-CSI. In the following scenes without otherwise specified, the P-CSI of a plurality of serving cells comprise both the P-CSI of a plurality of serving cells in a carrier aggregation system and a plurality of P-CSI corresponding to a plurality of CSI-RS resources under a serving cell in a CoMP system.

Currently, in term of enhancement of the uplink control signaling, the conclusion is as following:

In the Rel-11, the simultaneous transmission of the P-CSI of a plurality of serving cells on a sub-frame is supported. For a UE supporting the PUCCH format 3, the UE can simultaneously transmit the HARQ-ACKs of a plurality of serving cells, 1-bit SR and the P-CSI of a serving cell on the PUCCH format 3. For how to support the simultaneous transmission of the P-CSI of a plurality of serving cells on a sub-frame, the uplink channel format in the related arts is needed only in terms of the conclusion presently available, but which channel format will be used has not been determined, and there are only two alternatives, including: PUCCH format 3 and PUSCH. If the PUCCH format 3 or PUSCH is introduced in the Rel-11 to support the transmission of P-CSI of a plurality of serving cells on a sub-frame, a problem existing in the related arts lies in how to indicate the resource and how to support the simultaneous transmission of the HARQ-ACKs and P-CSI of a plurality of serving cells.

SUMMARY

A method and device for processing information are provided in the disclosure to at least solve the problem that the simultaneous transmission of the P-CSI of a plurality of serving cells or the simultaneous transmission of the HARQ-ACKs of a plurality of serving cells and the P-CSI of a plurality of serving cells can not be realized in the related art.

According to one aspect of the disclosure, a method for processing information is provided.

The method for processing information according to the disclosure comprises: a User Equipment (UE) receiving a higher-layer signaling from a base station, wherein the higher-layer signaling carries uplink channel resources configured by the base station for the UE, and the uplink channel resources are used for simultaneously transmitting Periodic Channel State Information (P-CSI) of a plurality of serving cells corresponding to the UE, or are used for simultaneously transmitting Hybrid Automatic Repeat Request Acknowledgments (HARQ-ACKs) of the plurality of serving cells corresponding to the UE and the P-CSI of the plurality of serving cells; and the UE simultaneously transmitting the P-CSI of the plurality of serving cells on the uplink channel resources according to the higher-layer signaling in a preset uplink sub-frame, or simultaneously transmitting the HARQ-ACKs of the plurality of serving cells and the P-CSI of the plurality of serving cells on the uplink channel resources according to the higher-layer signaling in the preset uplink sub-frame.

Preferably, the uplink channel resources comprise at least one of the following: Physical Uplink Control Channel Format 3 (PUCCH format 3) and Physical Uplink Shared Channel (PUSCH).

Preferably, when the uplink channel resources are the PUCCH format 3, the UE simultaneously transmitting the P-CSI of the plurality of serving cells on the uplink channel resources according to the higher-layer signaling in the preset uplink sub-frame comprises: the UE determining the number of the plurality of serving cells to be transmitted in the preset uplink sub-frame; when the number of the plurality of serving cells is less than or equal to 2, the UE simultaneously transmitting the P-CSI of each of the plurality of serving cells on the PUCCH format 3; and when the number of the plurality of serving cells is greater than 2, the UE selecting two serving cells with the highest P-CSI priority from the plurality of serving cells, and simultaneously transmitting the P-CSI of each of the selected serving cells on the PUCCH format 3.

Preferably, when the uplink channel resources are the PUCCH format 3, the UE simultaneously transmitting the P-CSI of the plurality of serving cells on the uplink channel resources according to the higher-layer signaling in the preset uplink sub-frame comprises: the UE determining the number of bits fed back together by the P-CSI of the plurality of serving cells to be transmitted in the preset uplink sub-frame; when the number of bits fed back together do not exceed the maximum value of the number of bits that can be carried by the PUCCH format 3, the UE simultaneously transmitting the P-CSI of each of the plurality of serving cells on the PUCCH format 3; and when the number of bits fed back together exceeds the maximum value of the number of bits that can be carried by the PUCCH format 3, the UE selecting N serving cells with the highest P-CSI priority from the plurality of serving cells and simultaneously transmitting the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

Preferably, when the uplink channel resources are the PUCCH format 3, the UE simultaneously transmitting the HARQ-ACKs of the plurality of serving cells and the P-CSI of the plurality of serving cells on the uplink channel resources according to the higher-layer signaling in the preset uplink sub-frame comprises: the UE determining the number of the plurality of serving cells with the P-CSI to be transmitted in the preset uplink sub-frame; when the number of the plurality of serving cells with the P-CSI to be transmitted is 1, the UE simultaneously transmitting the P-CSI of the serving cell with the P-CSI to be transmitted and the HARQ-ACKs of the plurality of serving cells on the PUCCH format 3; and when the number of the plurality of serving cells with the P-CSI to be transmitted is more than one, the UE selecting a serving cell with the highest P-CSI priority from the plurality of serving cells, and simultaneously transmitting the P-CSI of the selected serving cell and the HARQ-ACKs of the plurality of serving cells on the PUCCH format 3.

Preferably, the above method further comprises: when the uplink channel resources are the PUCCH, the UE simultaneously transmitting the P-CSI of the plurality of serving cells on the PUSCH according to the higher-layer signaling in the preset uplink sub-frame, or simultaneously transmitting the HARQ-ACKs of the plurality of serving cells and the P-CSI of the plurality of serving cells on the PUSCH according to the higher-layer signaling in the preset uplink sub-frame.

Preferably, when the UE simultaneously transmits the P-CSI of the plurality of serving cells or the HARQ-ACKs of the plurality of serving cells and the P-CSI of the plurality of serving cells in the preset uplink sub-frame, the UE simultaneously transmits the P-CSI of the plurality of serving cells on the uplink channel resources according to the higher-layer signaling in the preset uplink sub-frame, or simultaneously transmits the HARQ-ACKs of the plurality of serving cells and the P-CSI of the plurality of serving cells on the uplink channel resource in the preset uplink sub-frame according to the higher-layer signaling.

According to another aspect of the disclosure, another method for processing information is provided.

The method for processing information according to the disclosure comprises: a UE receiving a higher-layer signaling from a base station, wherein the higher-layer signaling carries information of grouping a plurality of serving cells corresponding to the UE by the base station, and the base station respectively configures uplink channel resources for each group of serving cells after the grouping processing; and the UE transmitting P-CSI of any of the plurality of serving cells on the uplink channel resources according to the higher-layer signaling in a preset uplink sub-frame, or simultaneously transmitting the P-CSI of each of the plurality of serving cells on the uplink channel resources according to the higher-layer signaling in a preset uplink sub-frame; or on the uplink channel resources according to the higher-layer signaling in the preset uplink sub-frame, or on the uplink channel resources used when HARQ-ACKs of the plurality of serving cells are transmitted, the UE simultaneously transmitting the HARQ-ACKs of the plurality of serving cells and the P-CSI of the plurality of serving cells.

Preferably, the uplink channel resources comprise at least one of the following: PUCCH format 2, PUCCH format 3 and PUSCH.

Preferably, the UE simultaneously transmitting the P-CSI of the plurality of serving cells on the uplink channel resources according to the higher-layer signaling in the preset uplink sub-frame comprises: the UE judging whether the plurality of serving cells of which the P-CSI is to be transmitted are in a same group; if so, the UE determining configuration information for the uplink channel resources used by the same group of serving cells according to the higher-layer signaling, and transmitting the P-CSI of the plurality of serving cells on the determined uplink channel resources; and if no, the UE respectively determining the uplink channel resources used by various groups of serving cells according to the higher-layer signaling, and selecting from the determined uplink channel resources used by various groups of serving cells, and employing the selected uplink channel resources to transmit the P-CSI of the plurality of serving cells.

Preferably, the UE determining the configuration information for the uplink channel resources used by the same group of serving cells according to the higher-layer signaling, and transmitting the P-CSI of the plurality of serving cells on the determined uplink channel resources comprise one of the following: when the number of serving cells located in the same group is 1, and the uplink channel resources are PUCCH format 2 or PUCCH format 3 or PUSCH, the UE transmitting the P-CSI of the serving cell located in the same group on the PUCCH format 2 or the PUCCH format 3 or the PUSCH; when the number of serving cells located in the same group is 2, and the uplink channel resources are the PUCCH format 3 or the PUSCH, the UE simultaneously transmitting the P-CSI of each serving cell in the same group on the PUCCH format 3 or the PUSCH; when the number of serving cells located in the same group is greater than 2, and the uplink channel resources are the PUSCH, the UE simultaneously transmitting the P-CSI of each of serving cells in the same group on the PUSCH; when the number of serving cells located in the same group is greater than 2, and the uplink channel resources are the PUCCH format 3, the UE selecting two serving cells with the highest P-CSI priority from the same group of serving cells, and simultaneously transmitting the P-CSI of each of the selected serving cells on the PUCCH format 3; and when the number of serving cells located in the same group is greater than 2, and the uplink channel resources are the PUCCH format 3, if the number of bits fed back together by the P-CSI of the plurality of serving cells does not exceed the maximum value of the number of bits that can be carried by the PUCCH format 3, the UE transmitting the P-CSI of the plurality of serving cells on the PUCCH format 3, otherwise the UE selecting N serving cells with the highest P-CSI priority from the plurality of serving cells and simultaneously transmitting the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

Preferably, the UE respectively determining the uplink channel resources used by various groups of serving cells according to the higher-layer signaling, and selecting from the determined uplink channel resources used by various groups of serving cells, and employing the selected uplink channel resources to transmit the P-CSI of the plurality of serving cells comprises one of the following: when the uplink channel resources used by only one of various groups of serving cells are the PUSCH, the UE simultaneously transmitting the P-CSI of the plurality of serving cells on the PUSCH; when the uplink channel resources used by more than one of various groups of serving cells is the PUSCH, the UE selecting a PUSCH used by a serving cell with the highest P-CSI priority from the more than one of various groups of serving cells, and simultaneously transmitting the P-CSI of the plurality of serving cells on the selected PUSCH; when the uplink channel resources used by more than one of various groups of serving cells are the PUCCH format 3, the UE selecting a PUCCH format 3 used by a serving cell with the highest P-CSI priority from the more than one of various groups of serving cells and selecting two serving cells with the highest P-CSI priority from the plurality of serving cells, and simultaneously transmitting the P-CSI of each of the selected serving cells on the selected PUCCH format 3; and when the uplink channel resources used by more than one of various groups of serving cells are the PUCCH format 3, the UE selecting a PUCCH format 3 used by a serving cell with the highest P-CSI priority from the more than one of various groups of serving cells, and if the number of bits fed back together by the P-CSI of the plurality of serving cells does not exceed the maximum value of the number of bits that can be carried by the PUCCH format 3, the UE then transmitting the P-CSI of the plurality of serving cells on the selected PUCCH format 3, otherwise the UE selecting N serving cells with the highest P-CSI priority from the plurality of serving cells and simultaneously transmitting the P-CSI of each of the selected serving cells on the selected PUCCH format 3, wherein the number of bits fed back together by the P-CSI of the selected N serving cells does not exceed the maximum value of the number of bits that can be carried by the PUCCH format 3, with N being a positive integer.

Preferably, on the uplink channel resources according to the higher-layer signaling in the preset uplink sub-frame, or on the uplink channel resources used when HARQ-ACKs of the plurality of serving cells are transmitted, the UE simultaneously transmitting the HARQ-ACKs of the plurality of serving cells and the P-CSI of the plurality of serving cells comprises one of the following: when the uplink channel resources used by the P-CSI of only one group of serving cells of groups where the plurality of serving cells are located are the PUSCH, the UE simultaneously transmitting the P-CSI of the plurality of serving cells and the HARQ-ACKs of the plurality of serving cells on the PUSCH; when the uplink channel resources used by the P-CSI of multiple groups of serving cells of the groups where the plurality of serving cells are located are the PUSCH, the UE selecting a PUSCH used by a serving cell with the highest P-CSI priority from the multiple groups of serving cells, and simultaneously transmitting the P-CSI of each of the plurality of serving cells and the HARQ-ACKs of the plurality of serving cells on the selected PUSCH; when the uplink channel resources used when the P-CSI of the plurality of serving cells is transmitted are not configured as the PUSCH and the HARQ-ACKs of the plurality of serving cells are configured to use the PUCCH format 3 for transmission, the UE selecting a serving cell with the highest P-CSI priority from the plurality of serving cells, and simultaneously transmitting the P-CSI of the selected serving cell and the HARQ-ACKs of the plurality of serving cells on the PUCCH format 3 resource used when the HARQ-ACKs of the plurality of serving cells are transmitted; when the uplink channel resources used when the P-CSI of the plurality of serving cells is transmitted are the PUCCH format 2, and the HARQ-ACKs of the plurality of serving cells are configured to use a PUCCH format 1b combined channel selection for transmission, the UE performing spatial bundling processing on the HARQ-ACKs of the plurality of serving cells, and judging whether the HARQ-ACKs after the spatial bundling processing exceeds 2-bit information, if not, the UE then selecting a PUCCH format 2 used by a serving cell with the highest P-CSI priority from the plurality of serving cells, and simultaneously transmitting the P-CSI of the selected serving cell and the HARQ-ACKs of the plurality of serving cells after the spatial bundling on the selected PUCCH format 2; and if so, the UE then using a manner of PUCCH format 1b combined channel selection to transmit the HARQ-ACKs of the plurality of serving cells; and when the uplink channel resources used by the P-CSI of more than one of the plurality of serving cells are the PUCCH format 3, and the HARQ-ACKs of the plurality of serving cells are configured to use the PUCCH format 1b combined channel selection for transmission, the UE selecting a PUCCH format 3 used by a serving cell with the highest P-CSI priority from the plurality of serving cells, and simultaneously transmitting the P-CSI of a serving cell corresponding to the selected PUCCH format 3 and the HARQ-ACKs of the plurality of serving cells on the selected PUCCH format 3.

Preferably, when the UE transmits the P-CSI of any one of the plurality of serving cells or simultaneously transmits the P-CSI of the plurality of serving cells in the preset uplink sub-frame, the UE transmits the P-CSI of any of the plurality of serving cells on the uplink channel resources according to the higher-layer signaling in the preset uplink sub-frame, or simultaneously transmits the P-CSI of each of the plurality of serving cells.

Preferably, when the UE simultaneously transmits the HARQ-ACKs of the plurality of serving cells and the P-CSI of the plurality of serving cells corresponding to the UE in the preset uplink sub-frame, on the uplink channel resources according to the higher-layer signaling in the preset uplink sub-frame, or on uplink channel resources used when HARQ-ACKs of the plurality of serving cells are transmitted, the UE simultaneously transmitting the HARQ-ACKs of the plurality of serving cells and the P-CSI of the plurality of serving cells.

According to still another aspect of the disclosure, a device for processing information is provided.

The device for processing information in accordance with the disclosure comprises: a first receiving component configured to receive a higher-layer signaling from a base station, wherein the higher-layer signaling carries uplink channel resources configured by the base station for a UE, and the uplink channel resources are used for simultaneously transmitting P-CSI of a plurality of serving cells corresponding to the UE, or are used for simultaneously transmitting HARQ-ACKs of the plurality of serving cells corresponding to the UE and the P-CSI of the plurality of serving cells; and a first transmitting component configured to simultaneously transmit the P-CSI of the plurality of serving cells on the uplink channel resources according to the higher-layer signaling in the preset uplink sub-frame, or simultaneously transmit the HARQ-ACKs of the plurality of serving cells and the P-CSI of the plurality of serving cells.

Preferably, the uplink channel resources comprise at least one of the following: PUCCH format 3 and PUSCH.

Preferably, the first transmitting component comprises: a first determining unit configured to, when the uplink channel resources are the PUCCH format 3, determine the number of the plurality of serving cells to be transmitted in the preset uplink sub-frame; a first transmitting unit configured to, when the number of the plurality of serving cells is less than or equal to 2, simultaneously transmit the P-CSI of each of the plurality of serving cells on the PUCCH format 3; and a second transmitting unit configured to, when the number of the plurality of serving cells is greater than 2, select two serving cells with the highest P-CSI priority from the plurality of serving cells, and simultaneously transmit the P-CSI of each of the selected serving cells on the PUCCH format 3.

Preferably, the first transmitting component comprises: a second determining unit configured to, when the uplink channel resources are the PUCCH format 3, determine the number of bits fed back together by the P-CSI of the plurality of serving cells to be transmitted in the preset uplink sub-frame; a third transmitting unit configured to, when the number of bits fed back together by the P-CSI of the plurality of serving cells does not exceed the maximum value of the number of bits that can be carried by the PUCCH format 3, simultaneously transmit the P-CSI of each of the plurality of serving cells on the PUCCH format 3; and a fourth transmitting unit configured to, when the number of bits fed back together by the P-CSI of the plurality of serving cells exceeds the maximum value of the number of bits that can be carried by the PUCCH format 3, select N serving cells with the highest P-CSI priority from the plurality of serving cells and simultaneously transmit the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

Preferably, the first transmitting component comprises: a third determining unit configured to, when the uplink channel resources are the PUCCH format 3, determine the number of the plurality of serving cells with the P-CSI to be transmitted in the preset uplink sub-frame; a fifth transmitting unit configured to, when the number of the plurality of serving cells with the P-CSI to be transmitted is 1, simultaneously transmit the P-CSI of the serving cell with the P-CSI to be transmitted and the HARQ-ACKs of the plurality of serving cells on the PUCCH format 3; and a sixth transmitting unit configured to, when the number of the plurality of serving cells with the P-CSI to be transmitted is more than one, select a serving cell with the highest P-CSI priority from the plurality of serving cells, and simultaneously transmit the P-CSI of the selected serving cell and the HARQ-ACKs of the plurality of serving cells on the PUCCH format 3.

Preferably, the first transmitting component comprises: a seventh transmitting unit configured to, when the uplink channel resources are the PUSCH, simultaneously transmit the P-CSI of the plurality of serving cells corresponding to the UE on the PUSCH according to the higher-layer signaling in the preset uplink sub-frame, or simultaneously transmit the HARQ-ACKs of the plurality of serving cells and the P-CSI of the plurality of serving cells on the PUSCH according to the higher-layer signaling in the preset uplink sub-frame.

Preferably, the first transmitting component is configured to, when the P-CSI of the plurality of serving cells or the HARQ-ACKs of the plurality of serving cells and the P-CSI of the plurality of serving cells are simultaneously transmitted in the preset uplink sub-frame, simultaneously transmit the P-CSI of the plurality of serving cells on the uplink channel resources according to the higher-layer signaling in the preset uplink sub-frame, or simultaneously transmit the HARQ-ACKs of the plurality of serving cells and the P-CSI of the plurality of serving cells on the uplink channel resources according to the higher-layer signaling in the preset uplink sub-frame.

According to still yet another aspect of the disclosure, another device for processing information is provided.

The device for processing information according to the disclosure comprises: a second receiving component configured to receive a higher-layer signaling from a base station, wherein the higher-layer signaling carries information of grouping a plurality of serving cells corresponding to a UE by the base station, and the base station respectively configures an uplink channel resource for each group of serving cells after the grouping processing; and a second transmitting component configured to transmit P-CSI of any of the plurality of serving cells on the uplink channel resources according to the higher-layer signaling in a preset uplink sub-frame, or simultaneously transmit the P-CSI of each of the plurality of serving cells; or, on the uplink channel resources according to the higher-layer signaling in the preset uplink sub-frame, or on uplink channel resources used when the HARQ-ACKs of the plurality of serving cells are transmitted, simultaneously transmit the HARQ-ACKs of the plurality of serving cells and the P-CSI of the plurality of serving cells.

Preferably, the uplink channel resources comprise at least one of the following: PUCCH format 2, PUCCH format 3 and PUSCH.

Preferably, the second transmitting component comprises: a judging unit configured to judge whether the plurality of serving cells of which the P-CSI is to be transmitted are in a same group; a first determining unit configured to, when an output of the judging unit is yes, determine configuration information for the uplink channel resources used by the same group of serving cells according to the higher-layer signaling, and transmit the P-CSI of the plurality of serving cells on the determined uplink channel resources; and a second determining unit configured to, when the output of the judging unit is no, respectively determine configuration information of the uplink channel resources used by various groups of serving cells according to the higher-layer signaling, and select from the determined uplink channel resources used by various groups of serving cells, and employ the selected uplink channel resources to transmit the P-CSI of each of the plurality of serving cells.

Preferably, the first determining unit comprises: a first transmitting unit configured to, when the number of serving cells located in the same group is 1, and the uplink channel resources are the PUCCH format 2 or PUCCH format 3 or PUSCH, simultaneously transmit the P-CSI of the serving cell located in the same group on the PUCCH format 2 or the PUCCH format 3 or the PUSCH; a second transmitting unit configured to, when the number of serving cells located in the same group is 2, and the uplink channel resources are the PUCCH format 3 or the PUSCH, simultaneously transmit the P-CSI of each of serving cells in the same group on the PUCCH format 3 or the PUSCH; a third transmitting unit configured to, when the number of serving cells located in the same group is greater than 2, and the uplink channel resources are the PUSCH, simultaneously transmit the P-CSI of each of the serving cells in the same group on the PUSCH; the fourth transmitting unit, configured to, when the number of serving cells located in the same group is greater than 2, and the uplink channel resources are the PUCCH format 3, select two serving cells with the highest P-CSI priority from the same group of serving cells, and simultaneously transmit the P-CSI of each of the selected serving cells on the PUCCH format 3; and a fifth transmitting unit configured to, when the number of serving cells located in the same group is greater than 2 and the uplink channel resources are the PUCCH format 3, if the number of bits fed back together by the P-CSI of the plurality of serving cells does not exceed the maximum value of the number of bits that can be carried by the PUCCH format 3, transmit the P-CSI of the plurality of serving cells on the PUCCH format 3, otherwise select N serving cells with the highest P-CSI priority from the plurality of serving cells and simultaneously transmit the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

Preferably, the second determining unit comprises: a sixth transmitting unit configured to, when the uplink channel resources used by only one of various groups of serving cells are the PUSCH, simultaneously transmit the P-CSI of the plurality of serving cells on the PUSCH; a seventh transmitting unit configured to, when the uplink channel resources used by more than one of various groups of serving cells are the PUSCH, select a PUSCH used by a serving cell with the highest P-CSI priority from the more than one of various groups of serving cells, and simultaneously transmit the P-CSI of the plurality of serving cells on the selected PUSCH; an eighth transmitting unit configured to, when the uplink channel resources used by more than one of various groups of serving cells are the PUCCH format 3, select a PUCCH format 3 used by a serving cell with the highest P-CSI priority from the more than one of various groups of serving cells and select two serving cells with the highest P-CSI priority from the plurality of serving cells, and simultaneously transmit the P-CSI of each of the selected serving cells on the selected PUCCH format 3; and a ninth transmitting unit configured to, when the uplink channel resources used by more than one of various groups of serving cells are the PUCCH format 3, select a PUCCH format 3 used by a serving cell with the highest P-CSI priority from the more than one of various groups of serving cells, and if the number of bits fed back together by the P-CSI of the plurality of serving cells does not exceed the maximum value of the number of bits that can be carried by the PUCCH format 3, then transmit the P-CSI of the plurality of serving cells on the selected PUCCH format 3, otherwise select N serving cells with the highest P-CSI priority from the plurality of serving cells and simultaneously transmit the P-CSI of each of the selected serving cells on the selected PUCCH format 3, wherein the number of bits fed back together by the P-CSI of the selected N serving cells does not exceed the maximum value of the number of bits that can be carried by the PUCCH format 3, with N being a positive integer.

Preferably, the second transmitting component comprises: a tenth transmitting unit configured to, when the uplink channel resources used by the P-CSI of only one group of serving cells of groups where the plurality of serving cells are located are the PUSCH, simultaneously transmit the P-CSI of each of the plurality of serving cells and the HARQ-ACKs of the plurality of serving cells on the PUSCH; an eleventh transmitting unit configured to, when the uplink channel resources used by the P-CSI of multiple groups of serving cells of the groups where the plurality of serving cells are located are the PUSCH, select a PUSCH used by a serving cell with the highest P-CSI priority from the multiple groups of serving cells, and simultaneously transmit the P-CSI of each of the plurality of serving cells and the HARQ-ACKs of the plurality of serving cells on the selected PUSCH; a twelfth transmitting unit configured to, when the uplink channel resources used when the P-CSI of each of the plurality of serving cells is transmitted are not configured as the PUSCH and the HARQ-ACKs of the plurality of serving cells are configured to use the PUCCH format 3 for transmission, select a PUCCH format 3 used by a serving cell with the highest P-CSI priority from the plurality of serving cells, and simultaneously transmit the P-CSI of the selected serving cell and the HARQ-ACKs of the plurality of serving cells on the PUCCH format 3 resource used when the HARQ-ACKs of the plurality of serving cells are transmitted; a thirteenth transmitting unit configured to, when the uplink channel resources used when the P-CSI of each of the serving cells of the plurality of serving cells is transmitted are the PUCCH format 2, and the HARQ-ACKs of the plurality of serving cells are configured to use a PUCCH format 1b combined channel selection for transmission, perform a spatial bundling processing on the HARQ-ACKs of the plurality of serving cells, and judge whether the HARQ-ACKs after the spatial bundling processing exceeds 2-bit information, if not, the UE then selecting the PUCCH format 2 used by a serving cell with the highest P-CSI priority from the plurality of serving cells, and simultaneously transmitting the P-CSI of the selected serving cell and the HARQ-ACKs of the plurality of serving cells after the spatial bundling on the selected PUCCH format 2; and if so, then using a manner of PUCCH format 1b combined channel selection to transmit the HARQ-ACKs of the plurality of serving cells; and a fourteenth transmitting unit configured to, when the uplink channel resources used by the P-CSI of more than one of the plurality of serving cells are the PUCCH format 3, and the HARQ-ACKs of the plurality of serving cells are configured to use the PUCCH format 1b combined channel selection for transmission, select a PUCCH format 3 used by a serving cell with the highest P-CSI priority from the plurality of serving cells, and simultaneously transmit the P-CSI of the serving cell corresponding to the selected PUCCH format 3 and the HARQ-ACKs of the plurality of serving cells on the selected PUCCH format 3.

Preferably, the second transmitting component is configured to, when the P-CSI of any one of the plurality of serving cells is transmitted or the P-CSI of the plurality of serving cells is simultaneously transmitted in the preset uplink sub-frame, transmit the P-CSI of any of the plurality of serving cells on the uplink channel resource according to the higher-layer signaling in the preset uplink sub-frame, or simultaneously transmit the P-CSI of each of the plurality of serving cells.

Preferably, the second transmitting component is configured to, when the HARQ-ACKs of the plurality of serving cells and the P-CSI of the plurality of serving cells corresponding to the UE are simultaneously transmitted in the preset uplink sub-frame, on the uplink channel resources according to the higher-layer signaling in the preset uplink sub-frame, or on the uplink channel resources used when HARQ-ACKs of the plurality of serving cells are transmitted, simultaneously transmit the HARQ-ACKs of the plurality of serving cells and the P-CSI of the plurality of serving cells by the UE.

By means of the disclosure, the base station is used to configure the uplink channel resources for the UE, and transmit the uplink channel resources to the UE by a higher-layer signaling, wherein the uplink channel resources are used for simultaneously transmitting P-CSI of the plurality of serving cells corresponding to the UE, or are used for simultaneously transmitting HARQ-ACKs of the plurality of serving cells corresponding to the UE and the P-CSI of the plurality of serving cells; and the UE simultaneously transmits the P-CSI of each of the plurality of serving cells corresponding to the UE on the uplink channel resources according to the higher-layer signaling in the preset uplink sub-frame, or simultaneously transmits the HARQ-ACKs and the P-CSI of each of the plurality of serving cells corresponding to the UE, thus solving the problem that the simultaneous transmission of the P-CSI of the plurality of serving cells or the simultaneous transmission of the HARQ-ACKs of the plurality of serving cells and the P-CSI of the plurality of serving cells can not be realized in the related art, thereby implementing simultaneous transmission of acknowledgments of the plurality of downlink component carries and channel state information of the plurality of serving cells.

DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF EMBODIMENTS

The embodiments are described in conjunction with the drawings as follows. It shall be understood that the embodiments of the present application and the features of the embodiments can be combined with each other if there is no conflict.

Figure 1:
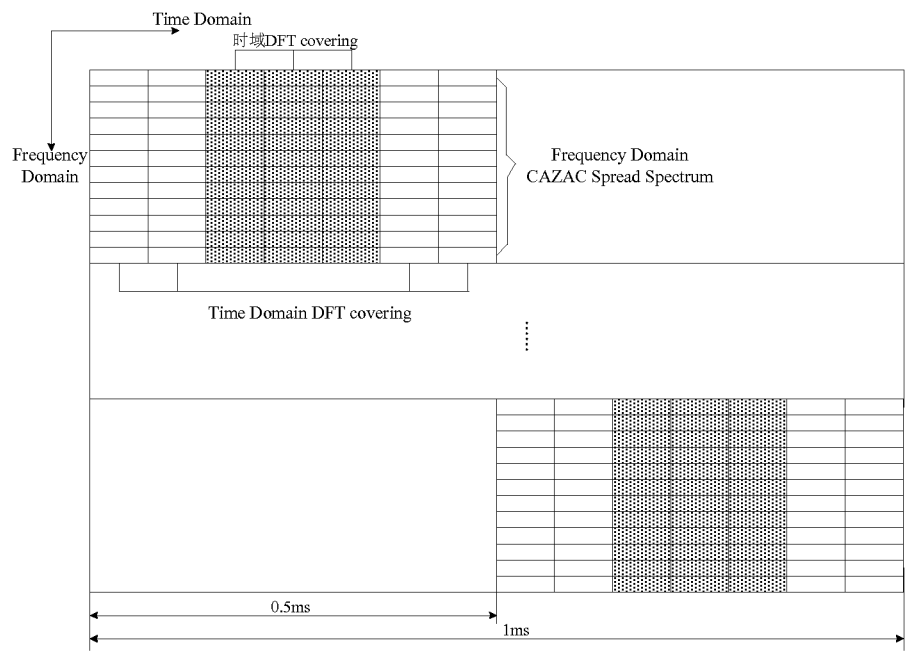
FIG. 1 is a schematic diagram of PUCCH format 1/1a/1b when a sub-frame employs a conventional cyclic prefix in a LTE system according to the related arts.
Figure 2:
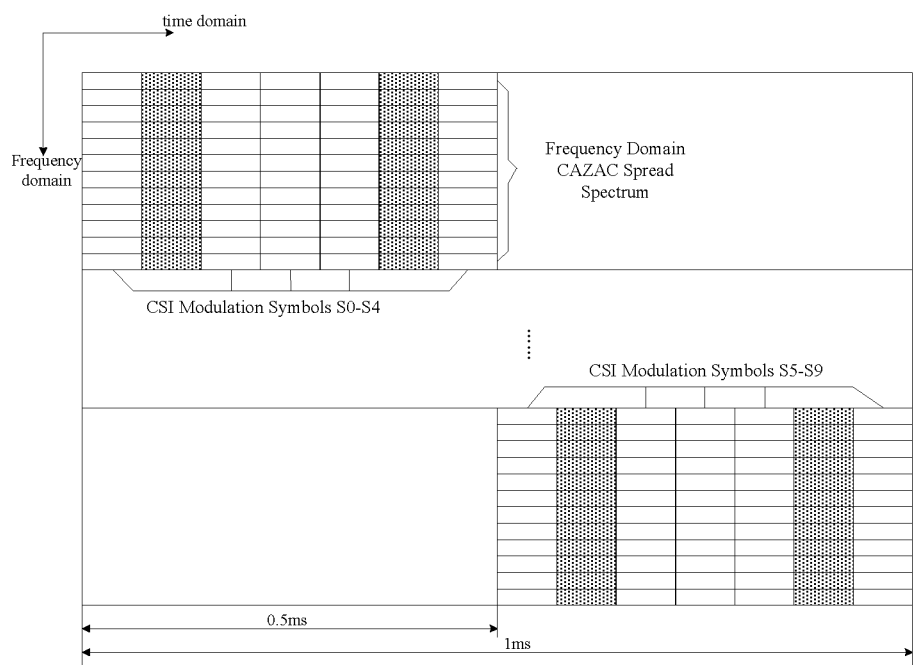
FIG. 2 is a schematic diagram of PUCCH format 2/2a/2b when a sub-frame employs a conventional cyclic prefix in a LTE system according to the related arts.
Figure 3:
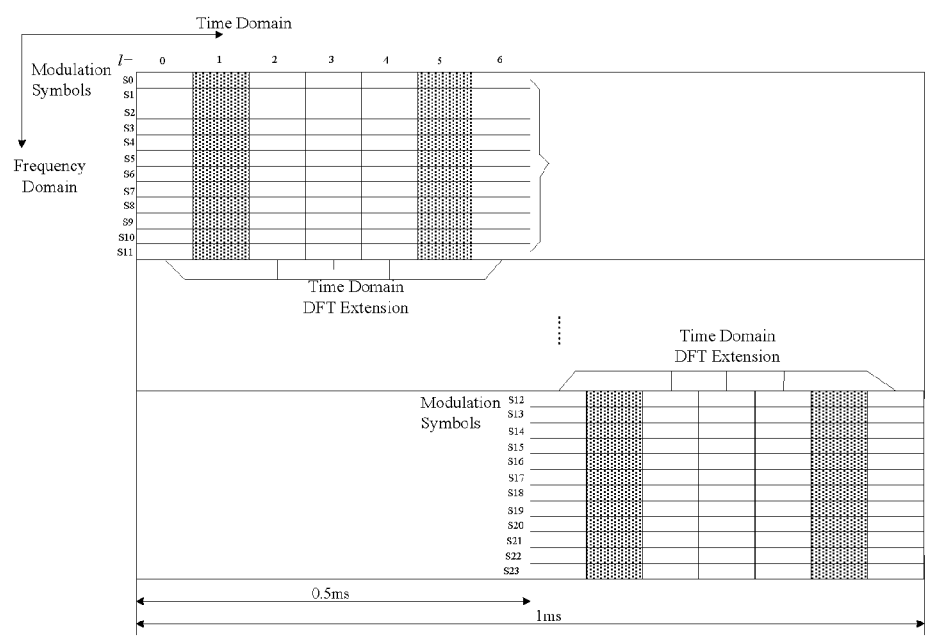
FIG. 3 is a schematic diagram of PUCCH format 3 when a sub-frame employs a conventional cyclic prefix in a LTE system according to the related arts.
Figure 4:
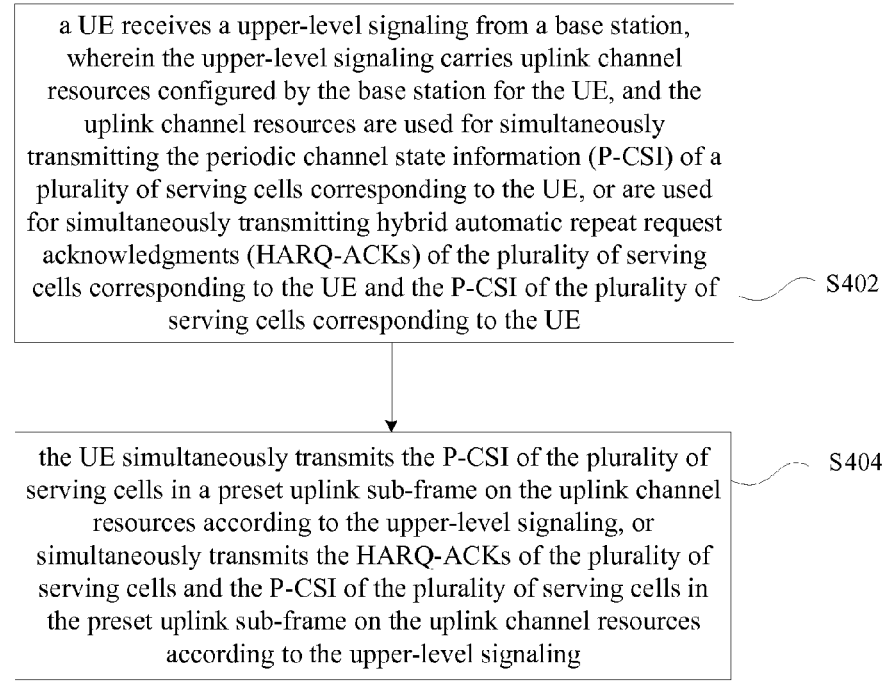
FIG. 4 is a flowchart of a method for processing information according to an embodiment of the disclosure.

FIG. 4 is a flowchart of a method for processing information according to an embodiment of the disclosure. As shown in FIG. 4, the method may include the following steps:

step S402: a UE receives a higher-layer signaling from a base station, wherein the higher-layer signaling carries uplink channel resources configured by the base station for the UE, and the uplink channel resources are used for simultaneously transmitting the periodic channel state information (P-CSI) of a plurality of serving cells corresponding to the UE, or are used for simultaneously transmitting hybrid automatic repeat request acknowledgments (HARQ-ACKs) of the plurality of serving cells corresponding to the UE and the P-CSI of the plurality of serving cells corresponding to the UE;

step S404: the UE simultaneously transmits the P-CSI of the plurality of serving cells on the uplink channel resources according to the higher-layer signaling in a preset uplink sub-frame, or simultaneously transmits the HARQ-ACKs of the plurality of serving cells and the P-CSI of the plurality of serving cells on the uplink channel resources according to the higher-layer signaling in the preset uplink sub-frame.

In the related arts, simultaneous transmission of the HARQ-ACKs of a plurality of serving cells or simultaneous transmission of the HARQ-ACKs of a plurality of serving cells and the P-CSI of a plurality of serving cells may not be realized. By means of the method shown in FIG. 4, the base station is configured to configure the uplink channel resources for the UE, and transmit the uplink channel resources to the UE by the higher-layer signaling, wherein the uplink channel resources are used for simultaneously transmitting the periodic channel state information P-CSI of the plurality of serving cells corresponding to the UE, or are used for simultaneously transmitting the HARQ-ACKs of the plurality of serving cells corresponding to the UE and the P-CSI of the plurality of serving cells corresponding to the UE; and the UE simultaneously transmits the P-CSI of each of the plurality of serving cells corresponding to the UE on the uplink channel resources according to the higher-layer signaling in the preset uplink sub-frame, or simultaneously transmits the HARQ-ACK and P-CSI of each of the plurality of serving cells corresponding to the UE, thus solving the problem that the simultaneous transmission of P-CSI of the plurality of serving cells, or the simultaneous transmission of the HARQ-ACKs of the plurality of serving cells and the P-CSI of the plurality of serving cells can not be realized in the related arts, thereby implementing simultaneous transmission of the HARQ-ACKs of the plurality serving cells and the P-CSI of the plurality of serving cells.

It should be noted that, the P-CSI of the plurality of serving cells, besides the P-CSI of multiple serving cells, also comprises a plurality of pieces of P-CSI corresponding to a plurality of CSI-RS resources under a serving cell.

In a preferred embodiment, the P-CSI report of each of the plurality of serving cell is configured independently by the higher-layer signaling. In addition, in a case where a collision occurs when transmitting the P-CSI of the plurality of serving cells or when transmitting the HARQ-ACKs and P-CSI of the plurality of serving cells, a PUCCH format 3 resource or a PUSCH resource is configured for transmitting the P-CSI of the plurality of serving cells simultaneously or for transmitting the HARQ-ACKs and P-CSI of the plurality of serving cells simultaneously.

In a preferred implementation, the P-CSI report of each of the plurality of serving cell is configured independently by the higher-layer signaling, and it can be configured by employing a same mode existing in the Rel-10 protocol, which is not explained here.

In a preferred implementation, the uplink channel resources may comprise, but are not limited to, at least one of the following: PUCCH format 3 and PUSCH.

Preferably, when the uplink channel resources are the PUCCH format 3, in step S404, the UE simultaneously transmitting the P-CSI of the plurality of serving cells on the uplink channel resources according to the higher-layer signaling in the preset uplink sub-frame may comprise the following steps:

step S1: the UE determines the number of the plurality of serving cells to be transmitted in the preset uplink sub-frame;

step S2: when the number of the plurality of serving cells to be transmitted is less than or equal to 2, the UE simultaneously transmitting the P-CSI of each of the plurality of serving cells on the PUCCH format 3;

step S3: when the number of the plurality of serving cells is greater than 2, the UE selects two serving cells with the highest P-CSI priority from the plurality of serving cells, and simultaneously transmits the P-CSI of each of the selected serving cells on the PUCCH format 3.

In a preferred embodiment, the priority of P-CSI of the plurality of serving cells may be sorted, and the top two serving cells are selected; or if there are two serving cells with the highest P-CSI priority, the two serving cells are selected from the plurality of serving cells.

Preferably, when the uplink channel resources are the PUCCH format 3, in step S404, the UE simultaneously transmitting the P-CSI of the plurality of serving cells on the uplink channel resources according to the higher-layer signaling in the preset uplink sub-frame may comprise the following steps:

step S4: the UE determines the number of bits fed back together by the P-CSI of the plurality of serving cells to be transmitted in the preset uplink sub-frame;

step S5: when the bits fed back together do not exceed the maximum value of the number of bits that can be carried by the PUCCH format 3, the UE simultaneously transmits the P-CSI of each of the plurality of serving cells on the PUCCH format 3;

step S6: when the number of bits fed back together exceed the maximum value of the number of bits that can be carried by the PUCCH format 3, the UE selects N serving cells with the highest P-CSI priority from the plurality of serving cells and simultaneously transmitting the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

In a preferred embodiment, when the uplink channel resources configured additionally according to the higher-layer signaling are the PUCCH format 3, the feedback with at most 22-bits is supported, and when the total number of bits of the P-CSI of the plurality of serving cells exceeds 22, according to the priority of the P-CSI report ruled in the Rel-10, the other P-CSI with the lower priority is discarded and the total number of bits of the P-CSI of the reserved N serving cells do not exceeds 22, and then they are transmitted on the PUCCH format 3 resource. Or, N is a predefined value, for example 2; or, the value of N is determined according to the report types of the P-CSI, for example: when the report types of P-CSI of the plurality of serving cells only comprise 3, 5, 6, 2a, N may be 3, 4, 5, while in other cases N may be 2.

Preferably, when the uplink channel resources are the PUCCH format 3, in step S404, the UE simultaneously transmitting the HARQ-ACKs of the plurality of serving cells and the P-CSI of the plurality of serving cells on the uplink channel resources according to the higher-layer signaling in the preset uplink sub-frame may comprise the following processing steps:

step S7: the UE determines the number of the plurality of serving cells to be transmitted in the preset uplink sub-frame;

step S8: when the number of the serving cells with the P-CSI to be transmitted is 1, the UE simultaneously transmits the P-CSI of this serving cell and the HARQ-ACKs of the plurality of serving cells on the PUCCH format 3;

step S9: when the number of the serving cells with the P-CSI to be transmitted is more than one, the UE selects a serving cell with the highest P-CSI priority from the plurality of serving cells, and simultaneously transmits the P-CSI of the selected serving cell and the HARQ-ACKs of the plurality of serving cells on the PUCCH format 3.

In a preferred embodiment, when the uplink channel resources configured additionally according to the higher-layer signaling are the PUCCH format 3, it supports to transmit at most P-CSI of one serving cell and HARQ-ACKs of a plurality of serving cells simultaneously when a collision occurs When a collision occurs between the P-CSI of more than one serving cells and the HARQ-ACKs of a plurality of serving cells, according to the priority of the P-CSI report ruled in the Rel-10, the other P-CSI with the lower priority is discarded and a P-CSI report with the highest priority is reserved, and then the reserved P-CSI and the HARQ-ACKs of the plurality of serving cells are transmitted on the PUCCH format 3.

Preferably, the above method may further comprise: when the uplink channel resources are the PUCCH, the UE simultaneously transmits the P-CSI of the plurality of serving cells in the preset uplink sub-frame on the PUSCH according to the higher-layer signaling, or simultaneously transmits the HARQ-ACKs of the plurality of serving cells and the P-CSI of the plurality of serving cells on the PUSCH according to the higher-layer signaling in the preset uplink sub-frame.

In a preferred embodiment, when the uplink channel resources configured additionally according to the higher-layer signaling are the PUSCH, in the case of a collision occurring among the P-CSI of two or more than two serving cells, it supports that the P-CSI of two or more than two serving cells are transmitted simultaneously, or the P-CSI of two or more than two serving cells and the HARQ-ACKs of a plurality of serving cells are transmitted simultaneously.

In a preferred implementation, when the UE simultaneously transmits the P-CSI of the plurality of serving cells, or the HARQ-ACKs of the plurality of serving cells and the P-CSI of the plurality of serving cells in the preset uplink sub-frame, the UE simultaneously transmits the P-CSI of the plurality of serving cells on the uplink channel resources according to the higher-layer signaling in the preset uplink sub-frame, or simultaneously transmits the HARQ-ACKs of the plurality of serving cells and the P-CSI of the plurality of serving cells on the uplink channel resources according to the higher-layer signaling in the preset uplink sub-frame.

The above preferred implementations will be further described in conjunction with the preferred embodiments shown in FIG. 5 to FIG. 8.

Figure 5:
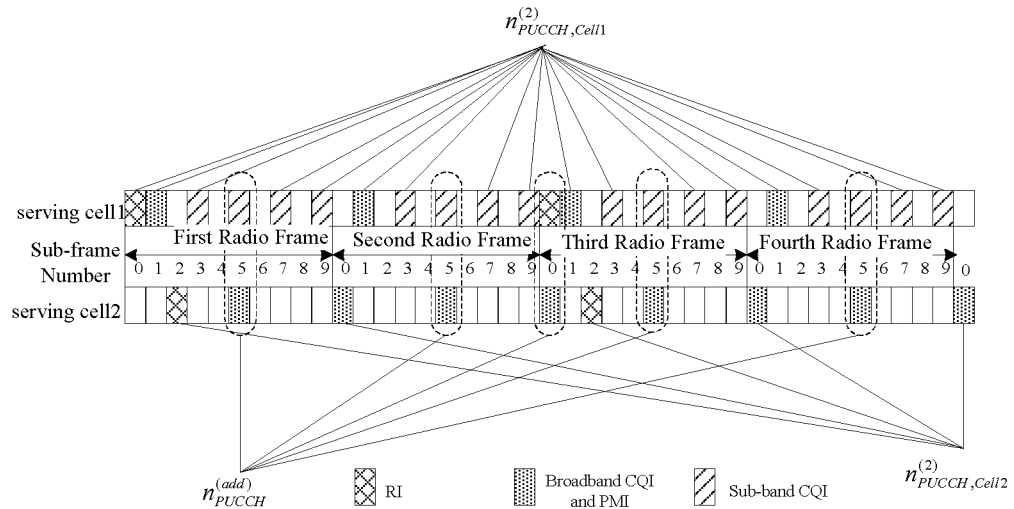
FIG. 5 is a flowchart of a method for processing information according to a preferred embodiment one of the disclosure.

FIG. 5 is a flowchart of a method for processing information according to a preferred embodiment one of the disclosure. As shown in FIG. 5, An aggregation processing is performed on serving cells 1 and 2, and the P-CSI of each of a plurality of serving cells is configured independently. It is assumed that a transmitting mode configured for the serving cell 1 needs to feed back a report type 3 (RI), report type 2 (broadband CQI and PMI) and report type 1 (the sub-band CQI selected by the UE), and a base period for transmitting the P-CSI report is set to 2 ms, wherein a bias of a sub-frame of RI is set to 1, the period for transmitting the RI is ten times of that for transmission the CSI, and the channel resources used for transmitting are configured as $n_{PUCCH,Cell1}^{(2)}$. The transmitting mode configured for the serving cell 2 needs to feed back a report type 3 (RI), report type 2 (broadband CQI and PMI), and a base period for transmitting the P-CSI report is set to 5 ms, wherein a bias of a sub-frame of RI is set to 3, the period for transmitting the RI is four times of that for transmitting the CSI, and the channel resources used for transmission are configured as $n_{PUCCH,Cell2}^{(2)}$. In addition, the higher-layer signaling also additionally configures resources $n_{PUCCH}^{(add)}$ for simultaneous transmission of the P-CSI of the plurality of serving cells when a collision occurs among them, or for simultaneous transmission of the HARQ-ACKs and P-CSI of the plurality of serving cells when a collision occurs among them.

In a preferred embodiment, it is assumed that the $n_{PUCCH}^{(add)}$ configured additionally according to the higher-layer signaling are the PUSCH. On the sub-frames 0, 1, 3, 7, 9 of a first radio frame, the sub-frames 1, 3, 7, 9 of a second radio frame, the sub-frames 1, 3, 7, 9 of a third radio frame and the sub-frames 1, 3, 7, 9 of a fourth radio frame, the UE only needs to transmit the P-CSI of serving cell 1 (it may comprise: RI, broadband CQI and PMI, as well as the sub-band CQI selected by the UE), and the UE will transmit the P-CSI of serving cell 1 by employing the channel resources i'-<, which are configured by the higher-layer signaling and for feedback of the P-CSI of serving cell 1. On the sub-frame 2 of the first radio frame, the sub-frame 0 of the second radio frame, the sub-frame 2 of the third radio frame, and the sub-frame 0 of the fourth radio frame, the UE only needs to transmit the P-CSI of serving cell 2 (it may comprise: RI, broadband CQI and PMI), and the UE transmits P-CSI of serving cell 2 by employing the channel resources $n_{PUCCH,Cell1}^{(2)}$, which is configured by the higher-layer signaling and for the feedback of the P-CSI of serving cell 2; while on the sub-frame 5 of each of the radio frames and the sub-frame 0 of the third radio frame, the UE needs to transmit the P-CSI of serving cell 1 and the P-CSI of serving cell 2, and then the UE will simultaneously transmit the P-CSI of serving cell 1 and serving cell 2 by employing the channel resources $n_{PUCCH}^{(add)}$ configured additionally according to the higher-layer signaling.

Figure 6:
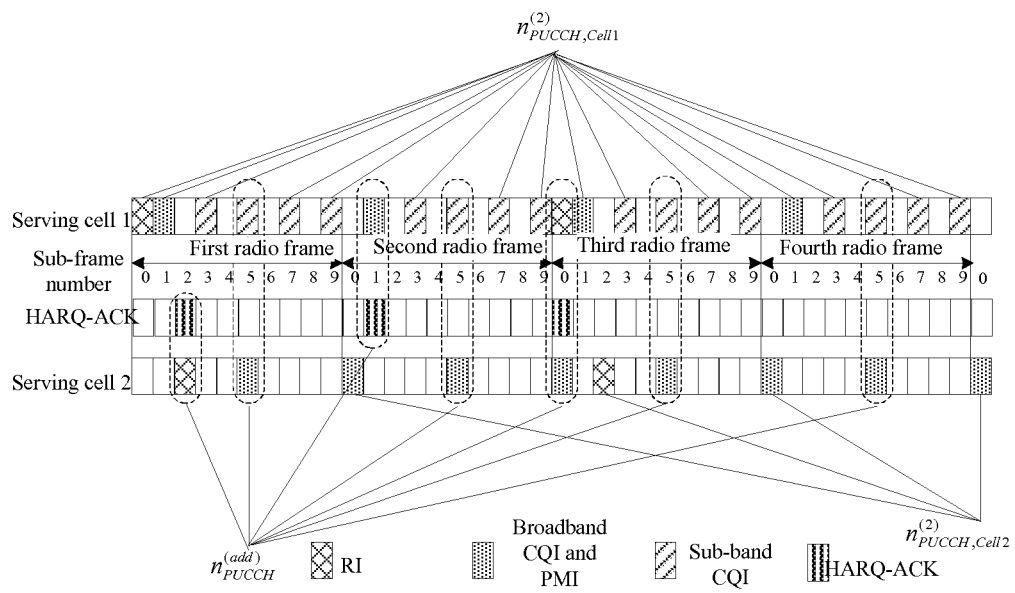
FIG. 6 is a flowchart of a method for processing information according to a preferred embodiment two of the disclosure.

FIG. 6 is a flowchart of a method for processing information according to a preferred embodiment two of the disclosure. As shown in FIG. 6, an aggregation processing is performed on serving cells 1 and 2, and the P-CSI of each of a plurality of serving cells is configured independently. It is assumed that a transmitting mode configured for serving cell 1 needs to feed back a report type 3 (RI), report type 2 (broadband CQI and PMI) and report type 1 (the sub-band CQI selected by the UE), and a base period for transmitting the P-CSI report is set to 2 ms, wherein a bias of a sub-frame of RI is set to 1, a period for transmitting the RI is ten times of that for transmitting the CSI, and the channel resources used for transmission are configured as $n_{PUCCH,Cell1}^{(2)}$. The transmitting mode configured for serving cell 2 needs to feed back a report type 3 (RI), report type 2 (broadband CQI and PMI), and a base period for transmitting the P-CSI report is set to 5 ms, wherein a bias of a sub-frame of RI is set to 3, a period for transmitting the RI is four times of that for transmitting the CSI, and the channel resource used for transmission is configured as $n_{PUCCH,Cell2}^{(2)}$. In addition, the higher-layer signaling) also additionally configures resourced $n_{PUCCH}^{(add)}$ for simultaneous transmission of the P-CSI of the plurality of serving cells when a collision occurs among them, or for simultaneous transmission of the HARQ-ACKs and P-CSI of the plurality of serving cells when a collision occurs between them.

In a preferred embodiment, it is assumed that the $n_{PUCCH}^{(add)}$ configured additionally by the higher-layer signaling are the PUSCH, and it is assumed that on the sub-frame 2 of the first radio frame, the sub-frame 1 of the second radio frame and the sub-frame 0 of the third radio frame, the UE needs to feed back the HARQ-ACKs of the plurality of serving cells. On the sub-frames 0, 1, 3, 7, 9 of the first radio frame, the sub-frames 3, 7, 9 of the second radio frame, the sub-frames 1, 3, 7, 9 of the third radio frame and the sub-frames 1, 3, 7, 9 of the fourth radio frame, the UE only needs to transmit the P-CSI of serving cell 1 (it may comprise: RI, broadband CQI and PMI, as well as the sub-band CQI selected by the UE), and the UE will transmit P-CSI of serving cell 1 by employing the resources $n_{PUCCH,Cell1}^{(2)}$ configured according to the higher-layer signaling and for the feedback of the P-CSI of serving cell 1; on the sub-frame 0 of the second radio frame, the sub-frame 2 of the third radio frame and the sub-frame 0 of the fourth radio frame, the UE only needs to transmit the P-CSI of serving cell 2 (it may comprise: RI, broadband CQI and PMI), and the UE will transmit the P-CSI of serving cell 1 by employing the resources $n_{PUCCH,Cell2}^{(2)}$ configured by the higher-layer signaling and for the feedback of the P-CSI of serving cell 2; on the sub-frame 5 of each of the radio frames, the UE needs to transmit the P-CSI of serving cell 1 and the P-CSI of serving cell 2, and the UE will simultaneously transmit the P-CSI of serving cell 1 and the P-CSI of serving cell 2 by employing the resources $n_{PUCCH}^{(add)}$ configured additionally according to the higher-layer signaling; on the sub-frame 2 of the first radio frame, the UE needs to transmit the HARQ-ACKs of serving cell 1 and the plurality serving cells by employing the resources $n_{PUCCH}^{(add)}$ configured additionally by the higher-layer signaling; on the sub-frame 1 of the second radio frame, the UE needs to simultaneously transmit the P-CSI of serving cell 2 and the HARQ-ACKs of the plurality serving cells, and the UE will simultaneously transmit the P-CSI of serving cell 2 and the HARQ-ACKs of the plurality serving cells using the resources $n_{PUCCH}^{(add)}$ configured additionally according to the higher-layer signaling; on the sub-frame 0 of the third radio frame, the UE needs to simultaneously transmit the P-CSI of serving cells 1 and 2 and the HARQ-ACKs of the plurality serving cells, and since the resources $n_{PUCCH}^{(add)}$ configured additionally are the PUSCH, the UE will simultaneously transmit the P-CSI of serving cells 1 and 2 and the HARQ-ACKs of the plurality serving cells by employing $n_{PUCCH}^{(add)}$ configured additionally according to the higher-layer signaling.

In a preferred embodiment, as shown in FIG. 5, the aggregation processing is performed on the serving cells 1 and 2, and the P-CSI of each of the serving cells is configured independently. It is assumed that the transmitting mode configured for serving cell 1 needs to feed back the report type 3 (RI), report type 2 (broadband CQI and PMI) and report type 1 (the sub-band CQI selected by the UE), and the base period for transmitting the P-CSI report is set to 2 ms, wherein a bias of a sub-frame of RI is set to 1, the period for transmitting the RI is ten times of that for transmitting the CSI, and the channel resources used for transmission is configured) as $n_{PUCCH,Cell1}^{(2)}$. The transmitting mode configured for serving cell 2 needs to feed back the report type 3 (RI), report type 2 (broadband CQI and PMI), and a base period for transmitting the P-CSI report is set to 5 ms, wherein a bias of a sub-frame of RI is set to 3, a period for transmitting the RI is four times of that for transmitting the CSI, and the channel resources used for transmission are configured as $n_{PUCCH,Cell2}^{(2)}$. In addition, the higher-layer signaling also additionally configures) resources $n_{PUCCH}^{(add)}$ for simultaneous transmission of the P-CSI of the plurality of serving cells when a collision occurs among them, or for simultaneous transmission of the HARQ-ACKs and P-CSI of the plurality of serving cells when a collision occurs between them.

In a preferred embodiment, it is assumed that the $n_{PUCCH}^{(add)}$ configured additionally by the higher-layer signaling is the PUCCH format 3. On the sub-frames 0, 1, 3, 7, 9 of the first radio frame, the sub-frames 1, 3, 7, 9 of the second radio frame, the sub-frames 1, 3, 7, 9 of the third radio frame and the sub-frames 1, 3, 7, 9 of the fourth radio frame, the UE only needs to transmit the P-CSI of serving cell 1 (it may comprise: RI, broadband CQI and PMI, as well as the sub-band CQI selected by the UE), and the UE will transmit P-CSI of serving cell 1 by employing the resources $n_{PUCCH,Cell1}^{(2)}$ which are configured according to the higher-layer signaling and for the feedback of the P-CSI of serving cell 1; On the sub-frame 2 of the first radio frame, the sub-frame 0 of the second radio frame, the sub-frame 2 of the third radio frame and the sub-frame 0 of the fourth radio frame, the UE only needs to transmit the P-CSI of serving cell 2 (it can comprise: RI, broadband CQI and PMI), and the UE will transmit the P-CSI of serving cell 2 by employing the resources $n_{PUCCH,Cell2}^{(2)}$ configured according to the higher-layer signaling and for the feedback of the P-CSI of serving cell 2; On the sub-frame 5 of each of the radio frames and the sub-frame 0 of the third radio frame, the UE needs to transmit the P-CSI of serving cell 1 and the P-CSI of serving cell 2, and the UE will simultaneously transmit the P-CSI of serving cell 1 and the P-CSI of serving cell 2 by employing the resources $n_{PUCCH}^{(add)}$ configured additionally by the higher-layer signaling.

Figure 7:
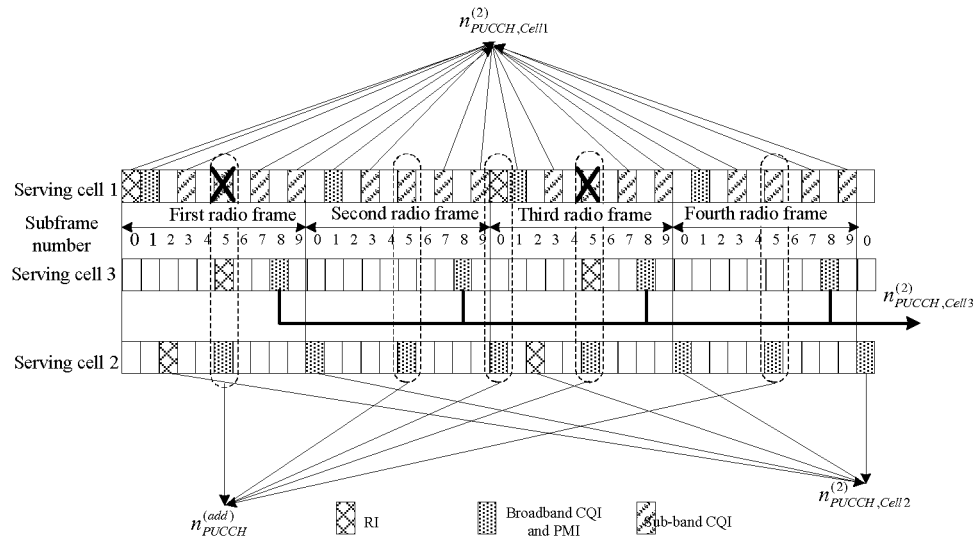
FIG. 7 is a flowchart of a method for processing information according to a preferred embodiment three of the disclosure.

FIG. 7 is a flowchart of a method for processing information according to a preferred embodiment three of the disclosure. As shown in FIG. 7, an aggregation processing is performed on the serving cells 1, 2 and 3, and the P-CSI of each of a plurality of serving cells is configured independently. It is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, a period of transmission of the RI is ten times of that of transmission of the CSI, and the channel resources used for transmission are configured as $n_{PUCCH,Cell1}^{(2)}$. The transmitting mode configured for serving cell 2 needs to feed back a report type 3 (RI), report type 2 (broadband CQI and PMI), and a base period of transmission of the P-CSI report is set to 5 ms, wherein a bias of a sub-frame of RI is set to 3, the period of transmission of the RI is four times of that of transmission of the CSI, and the channel resources used for transmission are configured as $n_{PUCCH,Cell2}^{(2)}$; the transmitting mode configured for serving cell 3 needs to feed back a report type 3 (RI), report type 2 (broadband CQI and PMI), and a base period of transmission of the P-CSI report is set to 10 ms, wherein a bias of a sub-frame of RI is set to 3, a period of transmission of the RI is two times of that of transmission of the CSI, and the channel resources used in transmission are configured as $n_{PUCCH,Cell3}^{(2)}$. In addition, resources $n_{PUCCH}^{(add)}$ are also configured additionally according to the higher-layer signaling, wherein the resources $n_{PUCCH}^{(add)}$ all are used for simultaneously transmitting the P-CSI of the plurality of serving cells when a collision occurs among them, or simultaneously transmitting the HARQ-ACKs and P-CSI of the plurality of serving cells when a collision occurs between them.

In a preferred embodiment, it is assumed that the $n_{PUCCH}^{(add)}$ configured additionally according to the higher-layer signaling are the PUCCH format 3. On the sub-frames 0, 1, 3, 7, 9 of a first radio frame, the sub-frames 1, 3, 7, 9 of a second radio frame, the sub-frames 1, 3, 7, 9 of a third radio frame and the sub-frames 1, 3, 7, 9 of a fourth radio frame, the UE only needs to transmit the P-CSI of serving cell 1 (it may comprise: RI, broadband CQI and PMI, as well as the sub-band CQI selected by the UE), and the UE will transmit the P-CSI of serving cell 1 by employing the $n_{PUCCH,Cell1}^{(2)}$ resources configured according to the higher-layer signaling and for the feedback of the P-CSI of serving cell 1; on the sub-frame 2 of the first radio frame, the sub-frame 0 of the second radio frame, the sub-frame 2 of the third radio frame and the sub-frame 0 of the fourth radio frame, the UE only needs to transmit the P-CSI of serving cell 2 (it may comprise: RI, broadband CQI and PMI), and the UE will transmit the P-CSI of serving cell 2 using the resources $n_{PUCCH,Cell2}^{(2)}$, wherein the resources $n_{PUCCH,Cell2}^{(2)}$ are configured according to the higher-layer signaling and for the feedback of the P-CSI of serving cell 2; on the sub-frame 8 of each of the radio frames, the UE only needs to transmit the P-CSI of serving cell 3, and the UE will transmit the P-CSI of serving cell 3 by employing the resources $n_{PUCCH,Cell3}^{(2)}$ which are configured by the higher-layer signaling and for the feedback of the P-CSI of serving cell 3; on the sub-frames 5 of the first and third radio frames, the UE needs to feed back the P-CSI of the serving cells 1, 2 and 3, wherein the P-CSI reports corresponding to the serving cells 1, 2 and 3 are a report type 1 (the sub-band CQI selected by the UE), report type 2 (broadband CQI and PMI) and report type 3 (RI) respectively, and since the $n_{PUCCH}^{(add)}$ configured additionally according to the higher-layer signalling are the PUCCH format 3 that only supports the feedback of two pieces of P-CSI, in which case the UE needs to get rid of the report type 1 of serving cell 1 according the priority of P-CSI report ruled in the Rel-10, and transmit the P-CSI reports of serving cell 2 and serving cell 3 on the $n_{PUCCH}^{(add)}$ which are the PUCCH format 3 and are configured additionally according to the higher-layer signaling; on the sub-frame 5 of the second radio frame, the sub-frame 0 of the third radio frame and the sub-frame 5 of the fourth radio frame, the UE needs to transmit the P-CSI of serving cell 1 and the P-CSI of serving cell 2, and the UE will simultaneously transmit the P-CSI of serving cell 2 and serving cell 2 using the resources $n_{PUCCH}^{(add)}$ configured additionally according to the higher-layer signaling.

Figure 8:
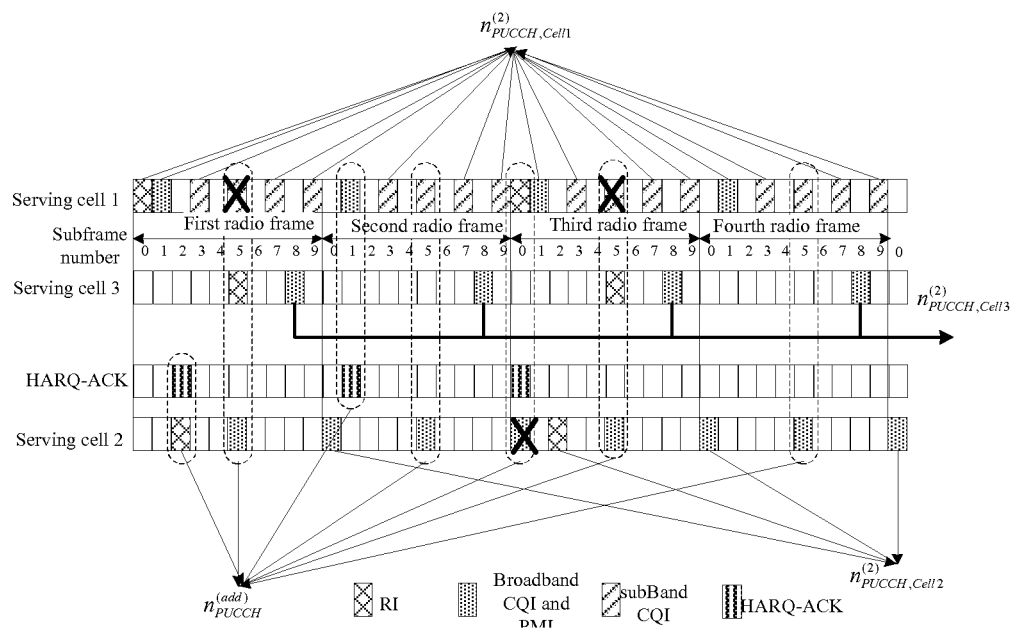
FIG. 8 is a flowchart of a method for processing information according to a preferred embodiment four of the disclosure.

FIG. 8 is a flowchart of a method for processing information according to a preferred embodiment four of the disclosure. As shown in FIG. 8, the serving cells 1, 2 and 3 are put through an aggregation processing, and the P-CSI of each of a plurality of serving cells is configured independently. It is assumed that a transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, a period of transmission of the RI is ten times of that of transmission of the CSI, and the channel resources used in transmission are configured as $n_{PUCCH,Cell1}^{(2)}$. The transmitting mode configured for serving cell 2 needs to feed back a report type 3 (RI), report type 2 (broadband CQI and PMI), and a base period of transmission of the P-CSI report is set to 5 ms, wherein a bias of a sub-frame of RI is set to 3, a period of transmission of the RI is four times of that of transmission of the CSI, and the channel resources used in transmission are configured as $n_{PUCCH,Cell1}^{(2)}$. The transmitting mode configured for serving cell 3 needs to feed back a report type 3 (RI), report type 2 (broadband CQI and PMI), and a base period of transmission of the P-CSI report is set to 10 ms, wherein a bias of a sub-frame of RI is set to 3, a period of transmission of the RI is two times of that of transmission of the CSI, and the channel resources used in transmission are configured as $n_{PUCCH,Cell3}^{(2)}$; in addition, the higher-layer signaling also additionally configures resources $n_{PUCCH}^{(add)}$ for simultaneously transmitting the P-CSI of the plurality of serving cells when a collision occurs among them, or simultaneously transmitting the HARQ-ACKs and P-CSI of the plurality of serving cells when a collision occurs among them.

In a preferred embodiment, it is assumed that the $n_{PUCCH}^{(add)}$ configured additionally according to the higher-layer signaling are the PUCCH format 3, and it is assumed that on the sub-frame 2 of the first radio frame, the sub-frame 1 of the second radio frame and the sub-frame 0 of the third radio frame, the UE needs to feed back the HARQ-ACKs of a plurality of serving cells. On the sub-frames 0, 1, 3, 7, 9 of a first radio frame, the sub-frames 3, 7, 9 of a second radio frame, the sub-frames 1, 3, 7, 9 of a third radio frame and the sub-frames 1, 3, 7, 9 of a fourth radio frame, the UE only needs to transmit the P-CSI of serving cell 1 (it may comprise: RI, broadband CQI and PMI, as well as the sub-band CQI selected by the UE), and the UE will transmit P-CSI of serving cell 1 by employing the resources $n_{PUCCH,Cell1}^{(2)}$ which are configured by the higher-layer signaling and for the feedback of the P-CSI of serving cell 1; on the sub-frame 0 of the second radio frame, the sub-frame 2 of the third radio frame and the sub-frame 0 of the fourth radio frame, the UE only needs to transmit the P-CSI of serving cell 2 (it may comprise: RI, broadband CQI and PMI), and the UE will transmit the P-CSI of serving cell 2 by employing the resources $n_{PUCCH,Cell1}^{(2)}$ which are configured by the higher-layer signaling and for the feedback of the P-CSI of serving cell 2; on the sub-frame 8 of each of the radio frames, the UE only needs to transmit the P-CSI of serving cell 3, and the UE will transmit the P-CSI of serving cell 3 by employing the resources $n_{PUCCH,Cell3}^{(2)}$ which are configured by the higher-layer signaling and for the feedback of the P-CSI of serving cell 3; on the sub-frame 2 of the first radio frame, the UE needs to transmit the P-CSI of serving cell 2 and the HARQ-ACKs of the plurality serving cells, and the UE will transmit the HARQ-ACKs of serving cell 2 and the plurality serving cells by employing the resources configured additionally according to the higher-layer signalling; on the sub-frames 5 of the first and third radio frames, the UE needs to feed back the P-CSI of the serving cells 1, 2 and 3, wherein the P-CSI reports corresponding to the serving cells 1, 2 and 3 respectively are report type 1 (the sub-band CQI selected by the UE), report type 2 (broadband CQI and PMI) and report type 3 (RI), and since the $n_{PUCCH}^{(add)}$ configured additionally according to the higher-layer signalling are the PUCCH format 3, the feedback with only two pieces of P-CSI is supported, in which case the UE needs to get rid of the report type 1 of serving cell 1 according the priority of P-CSI report ruled in the Rel-10, and transmit the P-CSI reports of serving cell 2 and serving cell 3 on the $n_{PUCCH}^{(add)}$ which are PUCCH format 3 and configured additionally according to the higher-layer signaling; on the sub-frame 1 of the second radio frame, the UE needs to transmit the P-CSI of serving cell 1 and the HARQ-ACKs of the plurality serving cells, and the UE will simultaneously transmit the P-CSI of serving cell 1 and the HARQ-ACKs of the plurality serving cells by employing the resources $n_{PUCCH}^{(add)}$ configured additionally according to the higher-layer signaling; on the sub-frame 5 of the second radio frame, the sub-frame 5 of the fourth radio frame, the UE needs to transmit the P-CSI of serving cell 1 and the P-CSI of serving cell 2, and the UE will simultaneously transmit the P-CSI of serving cell 1 and serving cell 2 using the resources $n_{PUCCH}^{(add)}$ configured additionally by the higher-layer signaling; on the sub-frame 0 of the third radio frame, the UE needs to feed back the P-CSI of serving cells 1 and 2 as well as the HARQ-ACKs of the plurality of serving cells, wherein the types of the P-CSI reports corresponding to the serving cells 1, 2 are report type 3 (RI), report type 2 (broadband CQI and PMI) respectively, and since the $n_{PUCCH}^{(add)}$ configured additionally according to the higher-layer signalling is the PUCCH format 3 that only supports the feedback of only a piece of P-CSI, in which case the UE needs to get rid of the report type 2 of serving cell 2 according the priority of P-CSI report ruled in the Rel-10, and transmits the P-CSI (RI) of serving cell 1 and the HARQ-ACKS of the plurality of serving cells on the $n_{PUCCH}^{(add)}$ which are PUCCH format 3 and configured additionally according to the higher-layer signaling.

Figure 9:
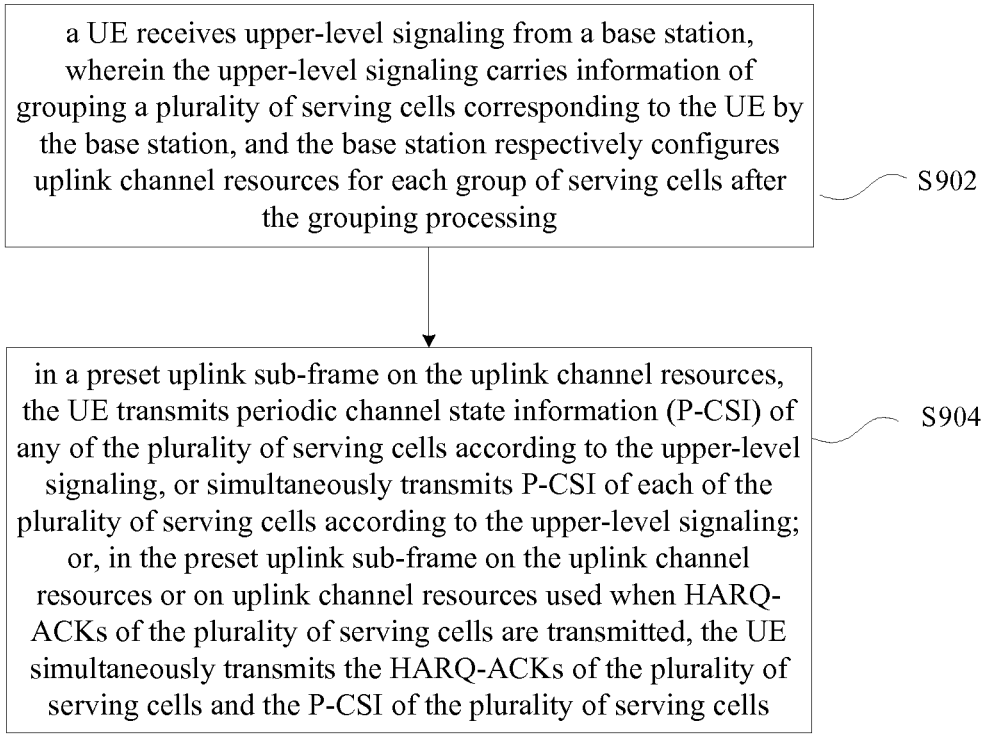
FIG. 9 is a flowchart of another method for processing information according to an embodiment of the disclosure.

FIG. 9 is a flowchart of another method for processing information according to an embodiment of the disclosure. As shown in FIG. 9, the method may comprise the following steps:

step S902: a UE receives higher-layer signaling from a base station, wherein the higher-layer signaling carries information of grouping a plurality of serving cells corresponding to the UE by the base station, and the base station respectively configures uplink channel resources for each group of serving cells after the grouping processing;

step S904: on the uplink channel resources in a preset uplink sub-frame, the UE transmits periodic channel state information (P-CSI) of any of the plurality of serving cells according to the higher-layer signaling, or simultaneously transmits P-CSI of each of the plurality of serving cells according to the higher-layer signaling; or, on the uplink channel resources in the preset uplink sub-frame or on uplink channel resources used when HARQ-ACKs of the plurality of serving cells are transmitted, the UE simultaneously transmits the HARQ-ACKs of the plurality of serving cells and the P-CSI of the plurality of serving cells.

By adopting the method shown in FIG. 9, the problem that the simultaneous transmission of P-CSI of the plurality of serving cells or the simultaneous transmission of the HARQ-ACKs of the plurality of serving cells and the P-CSI of the plurality of serving cells can not be realized in the related arts is solved, thereby realizing the simultaneous transmission of acknowledgements of the plurality of downlink component carriers and the channel state information of the plurality of serving cells.

In a preferred embodiment, the plurality of serving cells participating in aggregation are divided into multiple groups, wherein channel resources configured in configuration parameters for the P-CSI reports of serving cells within each group are the same.

In a preferred implementation, the uplink channel resources may comprise, but are not limited to, at least one of the following: PUCCH format 2, PUCCH format 3 and PUSCH.

Preferably, in step S904, the UE simultaneously transmitting the P-CSI of the plurality of serving cells on the uplink channel resources according to the higher-layer signaling in the preset uplink sub-frame may comprise the following operations:

step S1: the UE judges whether the plurality of serving cells with the P-CSI to be transmitted are in a same group;

step S2: if yes, the UE determines configuration information of the uplink channel resources used by the same group of serving cells according to the higher-layer signaling, and transmits the P-CSI of the plurality of serving cells on the determined uplink channel resources;

step S3: if no, the UE respectively determines uplink channel resources used by various groups of serving cells according to the higher-layer signaling, and selects from the determined uplink channel resources used by various groups of serving cells, and employs the selected uplink channel resources to transmit the P-CSI of the plurality of serving cells.

Preferably, in the above step S2, the UE determining the configuration information of the uplink channel resources used by the same group of serving cells according to the higher-layer signaling and transmitting the P-CSI of the plurality of serving cells on the determined uplink channel resource may comprise one of the following:

(1) when the number of serving cells in the same group is 1, and the uplink channel resources are PUCCH format 2 or PUCCH format 3 or PUSCH, the UE transmits the P-CSI of the serving cell on the PUCCH format 2 or the PUCCH format 3 or the PUSCH;

(2) when the number of serving cells in the same group is 2 and the uplink channel resources are the PUCCH format 3 or the PUSCH, the UE simultaneously transmits the P-CSI of each of the plurality serving cells in the same group on the PUCCH format 3 or the PUSCH;

(3) when the number of serving cells in the same group is greater than 2 and the uplink channel resources are the PUSCH, the UE simultaneously transmits the P-CSI of each of the plurality of serving cells in the same group on the PUSCH;

(4) when the number of serving cells in the same group is greater than 2 and the uplink channel resources are the PUCCH format 3, the UE selects two serving cells with the highest P-CSI priority from the group of serving cells, and simultaneously transmits the P-CSI of each of the plurality of selected serving cells on the PUCCH format 3;

(5) when the number of serving cells in the same group is greater than 2 and the uplink channel resources are the PUCCH format 3, if the number of bits fed back together by the P-CSI of the plurality of serving cells does not exceed the maximum value of the number of bits that can be carried by the PUCCH format 3, the UE transmits the P-CSI of the plurality of serving cells on the PUCCH format 3, otherwise the UE selects N serving cells with the highest P-CSI priority from the plurality of serving cells and simultaneously transmits the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

Preferably, in step S3, the UE determining the uplink channel resources used by various groups of serving cells according to the higher-layer signaling, selecting from the determined uplink channel resources used by various groups of serving cells, and employing the selected uplink channel resource to transmit the P-CSI of the plurality of serving cells may comprise one of the following:

(1) when the uplink channel resources used only by one of various groups of serving cells are the PUSCH, the UE simultaneously transmits the P-CSI of the plurality of serving cells on the PUSCH;

(2) when the uplink channel resources used by more than one of various groups of serving cells are the PUSCH, the UE selects a PUSCH used by a serving cell with the highest P-CSI priority from the more than one of various groups of serving cells, and simultaneously transmits the P-CSI of the plurality of serving cells on the selected PUSCH.

In a preferred embodiment, if multiple (suppose X) P-CSI reports are derived from different groups and multiple (suppose Y, and Y greater than or equal to 2 and less than or equal to X) channel resources used in transmission are configured as the PUSCH, then according to the priority principles of P-CSI reports ruled in the Rel-10, the PUSCH resources configured for the P-CSI report with the highest priority are used for transmit the X P-CSI reports, wherein the P-CSI report with the highest priority is selected from the Y P-CSI reports of which channel resources are configured as PUSCH when sending P-CSI reports.

(3) when the uplink channel resources used by more than one of various groups of serving cells are the PUCCH format 3, the UE selects a PUCCH format 3 used by a serving cell with the highest P-CSI priority from the more than one of various groups of serving cells, selects two serving cells with the highest P-CSI priority from the plurality of serving cells, and simultaneously transmits the P-CSI of each of the selected serving cells on the selected PUCCH format 3.

In a preferred embodiment, if multiple (suppose X) P-CSI reports are derived from different groups and the channel resources used in transmission are not configured as the PUSCH, and Y (Y greater than or equal to 1 and less than or equal to X) channel resources within the channel resources used in transmission of multiple P-CSI reports are configured as the PUCCH format 3, then according to the priority principles of P-CSI reports ruled in the Rel-10, the PUCCH format 3 resource configured for the P-CSI reports with the highest priority is selected from the Y P-CSI reports with their channel resource configuration used in transmission of the P-CSI reports being the PUCCH format 3, and again according to the priority principles of P-CSI reports ruled in the Rel-10, a P-CSI report with the highest priority is selected from the other X-1 P-CSI reports, and is transmitted on the selected PUCCH format 3 resource together with the selected P-CSI report with their channel resource being configured as PUCCH format 3.

(4) when the uplink channel resources used by more than one of various groups of serving cells are the PUCCH format 3, the UE selects the PUCCH format 3 used by a serving cell with the highest P-CSI priority from the more than one of various groups of serving cells, and if the number of bits fed back together by the P-CSI of the plurality of serving cells does not exceed the maximum value of the number of bits that can be carried by the PUCCH format 3, the UE then transmits the P-CSI of the plurality of serving cells on the selected PUCCH format 3, otherwise the UE selects N serving cells with the highest P-CSI priority from the plurality of serving cells and simultaneously transmits the P-CSI of each of the selected serving cells on the selected PUCCH format 3, wherein the number of bits fed back together by the P-CSI of the selected N serving cells does not exceed the maximum value of the number of bits that can be carried by the PUCCH format 3, with N being a positive integer.

Preferably, in step S40, on the uplink channel resources in the preset uplink sub-frame, or on the uplink channel resources used when the HARQ-ACKs of the plurality of serving cells are transmitted, the UE simultaneously transmitting the HARQ-ACKs of the plurality of serving cells and the P-CSI of the plurality of serving cells according to the higher-layer signaling may comprise one of the following:

(1) when the uplink channel resources used by the P-CSI of only one of various groups where the plurality of serving cells are located are the PUSCH, the UE simultaneously transmits the P-CSI of the plurality of serving cells and the HARQ-ACKs of the plurality of serving cells on the PUSCH;

(2) when the uplink channel resources used by the P-CSI of more than one of various groups where the plurality of serving cells are located is the PUSCH, the UE selects a PUSCH used by a serving cell with the highest P-CSI priority from the more than one of various groups of serving cells, and simultaneously transmits the P-CSI of each of the plurality of serving cells and the HARQ-ACKs of the plurality of serving cells on the selected PUSCH.

In a preferred embodiment, if within the channel resources used in transmission of multiple (suppose X) P-CSI reports, multiple (suppose Y, and Y is greater than or equal to 2 and less than or equal to X) channel resources are configured as the PUSCH, then according to the priority principles of P-CSI reports ruled in the Rel-10, a PUSCH resource configured for the P-CSI report with the highest priority is selected from resources corresponding to the Y P-CSI reports with their channel resource configuration used in transmission of the P-CSI reports being the PUSCH to transmit the X P-CSI reports and the HARQ-ACKs of the plurality of serving cells.

(3) when the uplink channel resourced used when the P-CSI of the plurality of serving cells is transmitted are not configured as the PUSCH and the HARQ-ACKs of the plurality of serving cells are configured to use the PUCCH format 3 for transmission, the UE selects a serving cell with the highest P-CSI priority from the plurality of serving cells, and simultaneously transmits the P-CSI of the selected serving cell and the HARQ-ACKs of the plurality of serving cells on the PUCCH format 3 resource used when the HARQ-ACKs of the plurality of serving cells are transmitted;

(4) when the uplink channel resources used when the P-CSI of the plurality of serving cells is transmitted are the PUCCH format 2, and the HARQ-ACKs of the plurality of serving cells are configured to use a PUCCH format 1b combined channel selection for transmission, the UE performs a spatial bundling processing on the HARQ-ACKs of the plurality of serving cells, and judging whether the bits of HARQ-ACKs after the spatial bundling processing exceeds 2-bit, if not, the UE then selects the PUCCH format 2 used by a serving cell with the highest P-CSI priority from the plurality of serving cells, and simultaneously transmits the P-CSI of the selected serving cell and the HARQ-ACKs of the plurality of serving cells after the spatial bundling on the selected PUCCH format 2; and if so, the UE then uses a manner of PUCCH format 1b combined channel selection to transmit the HARQ-ACKs of the plurality of serving cells.

In a preferred embodiment, when the channel resources used when a plurality of P-CSI reports are transmitted are configured as neither the PUSCH nor PUCCH format 3 and only the uplink channel resources used by multiple HARQ-ACKs are configured as the PUCCH format 2, for FDD and TDD with M=1, a spatial bundling may be performed on the HARQ-ACKs of the plurality serving cells to obtain 2-bit information, and then according to the priority principles of P-CSI reports ruled in the Rel-10, the resources configured for the P-CSI reports with the highest priority is selected to transmit the P-CSI reports and 2-bit HARQ-ACK after the spatial bundling; for TDD with M>1, only the HARQ-ACKs of the plurality of serving cells are transmitted, not the plurality of P-CSI.

(5) when the uplink channel resources used by the P-CSI of more than one of the plurality of serving cells are the PUCCH format 3, and the HARQ-ACKs of the plurality of serving cells are configured to use the PUCCH format 1b combined channel selection for transmission, the UE selects the PUCCH format 3 used by a serving cell with the highest P-CSI priority from the plurality of serving cells, and simultaneously transmits the P-CSI of the serving cell corresponding to the selected PUCCH format 3 and the HARQ-ACKs of the plurality of serving cells on the selected PUCCH format 3.

In a preferred embodiment, if Y (Y is greater than or equal to 1, and less than and equal to X) channel resources within the channel resources used in transmission of multiple P-CSI reports are configured as PUCCH format 3, then according to the priority principles of P-CSI reports ruled in the Rel-10, the PUCCH format 3 resource configured for a P-CSI report with the highest priority may be selected from resources corresponding to the Y P-CSI reports with their channel resource configuration used in transmission of the P-CSI reports being the PUCCH format 3, to transmit the P-CSI reports of the serving cells corresponding to the selected PUCCH format 3 resource and the HARQ-ACKs of the plurality of serving cells on the selected PUCCH format 3 resource.

In a preferred embodiment, according to the priority principles of P-CSI reports ruled in the Rel-10, the PUCCH format 3 resource configured for a P-CSI report with the highest priority may be selected from the Y P-CSI reports with their channel resource configuration used in transmission of P-CSI reports being the PUCCH format 3, and a P-CSI report with the highest priority is selected from X P-CSI reports, and the selected P-CSI report and the HARQ-ACKs of the plurality of serving cells are transmitted on the selected PUCCH format 3 resource.

In a preferred implementation, when the UE transmits the P-CSI of any of the plurality of serving cells or simultaneously transmits the P-CSI of the plurality of serving cells in the preset uplink sub-frame, the UE transmits the P-CSI of any of the plurality of serving cells on the uplink channel resources according to the higher-layer signaling in the preset uplink sub-frame, or simultaneously transmits the P-CSI of each of the plurality of serving cells according to the higher-layer signaling.

In a preferred implementation, when the UE simultaneously transmits the HARQ-ACKs of the plurality of serving cells corresponding to the UE and the P-CSI of the plurality of serving cells corresponding to the UE in the preset uplink sub-frame, on the uplink channel resources in the preset uplink sub-frame, or on the uplink channel resources used when HARQ-ACKs of the plurality of serving cells are transmitted, the UE simultaneously transmits the HARQ-ACKs of the plurality of serving cells and the P-CSI of the plurality of serving cells according to the higher-layer signaling.

The above preferred implementations will be described further in conjunction with the preferred embodiments shown in FIG. 10 to FIG. 19.

Figure 10:
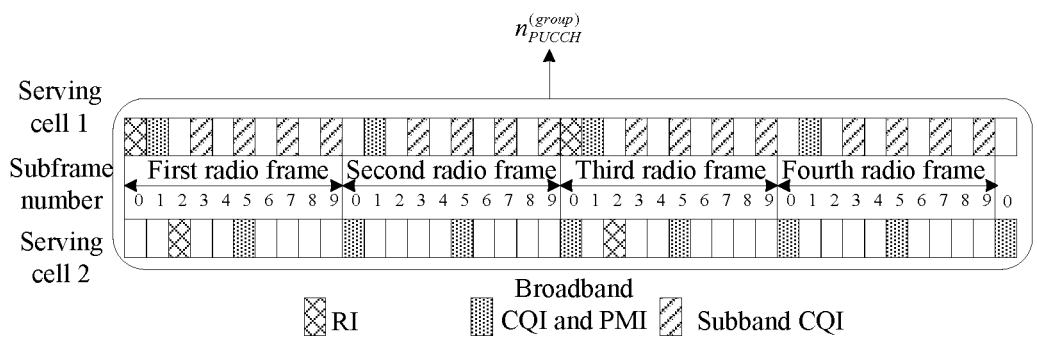
FIG. 10 is a flowchart of another method for processing information according to a preferred embodiment one of the disclosure.

FIG. 10 is a flowchart of another method for processing information according to a preferred embodiment one of the disclosure. As shown in FIG. 10, the serving cells 1 and 2 are put through an aggregation processing, and the serving cells 1 and 2 are put into a group in which the channel resources used when the P-CSI reports of the serving cell 1 and serving cell 2 are transmitted are configured as $n_{PUCCH}^{(group)}$. At the same time, it is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and a period of transmission of the RI is ten times of that of transmission of the CSI. The transmitting mode configured for serving cell 2 needs to feed back a report type 3 (RI), report type 2 (broadband CQI and PMI), and a base period of transmission of the P-CSI report is set to 5 ms, wherein a bias of a sub-frame of RI is set to 3, and a period of transmission of the RI is four times of that of transmission of the CSI.

In a preferred embodiment, since there are two serving cells included in the group, it is assumed here that the channel resources $n_{PUCCH}^{(group)}$ used when the P-CSI reports of the serving cells within the group are transmitted are the PUSCH or PUCCH format 3.

Figure 11:
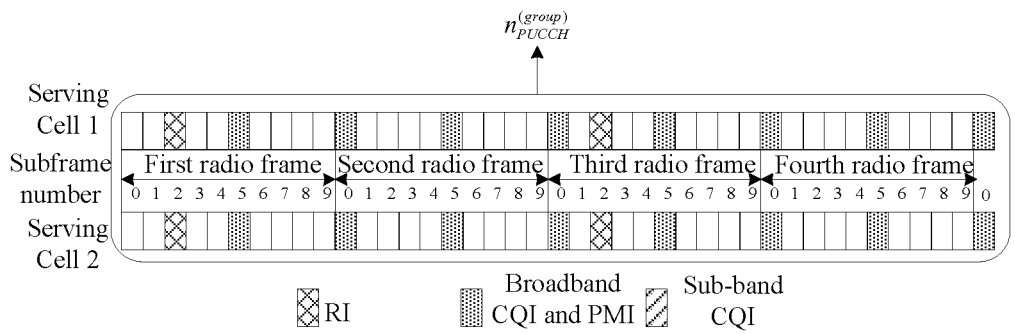
FIG. 11 is a flowchart of another method for processing information according to a preferred embodiment two of the disclosure.

Since there is only one group in which the number of serving cells is 2, and the channel resources $n_{PUCCH}^{(group)}$ used when the P-CSI reports of the serving cells within the group are transmitted are the PUSCH or PUCCH format 3 which both can support the feedback of the P-CSI of two serving cells, therefore on the sub-frame with the P-CSI needing to be transmitted, the following can be included: transmitting the P-CSI of only one serving cell and simultaneously transmitting the P-CSI of two serving cells, and the UE can adopt the $n_{PUCCH}^{(group)}$ to transmit the corresponding P-CSI FIG. 11 is a flowchart of another method for processing information according to a preferred embodiment two of the disclosure. As shown in FIG. 11, the serving cells 1 and 2 are put through an aggregation processing, and the serving cells 1 and 2 are put into a group in which the channel resources used when the P-CSI reports of serving cell 1 and serving cell 2 are transmitted are configured as $n_{PUCCH}^{(group)}$. Meanwhile it is assumed that the serving cell 1 and serving cell 2 have a same configuration, in which the transmitting mode configured for them needs to feed back a report type 3 (RI), report type 2 (broadband CQI and PMI), and a base period of transmission of the P-CSI report is set to 5 ms, wherein a bias of a sub-frame of RI is set to 3, and a period of transmission of the RI is four times of that of transmission of the CSI.

In a preferred embodiment, since there are two serving cells included in the group, it is assumed here that the channel resources $n_{PUCCH}^{(group)}$ used when the P-CSI reports of the serving cells within the group are transmitted are the PUSCH or PUCCH format 3.

Since there is only one group in which the number of serving cells is 2, and the channel resources $n_{PUCCH}^{(group)}$ used when the P-CSI reports of the serving cells within the group are transmitted are the PUCCH, on the sub-frames of the serving cell 1 and the serving cell 2 with the P-CSI needing to be transmitted, the following may be included: transmitting the P-CSI of only one serving cell and simultaneously transmitting the P-CSI of two serving cells, and the UE may adopt the $n_{PUCCH}^{(group)}$ to transmit the corresponding P-CSI.

Figure 12:
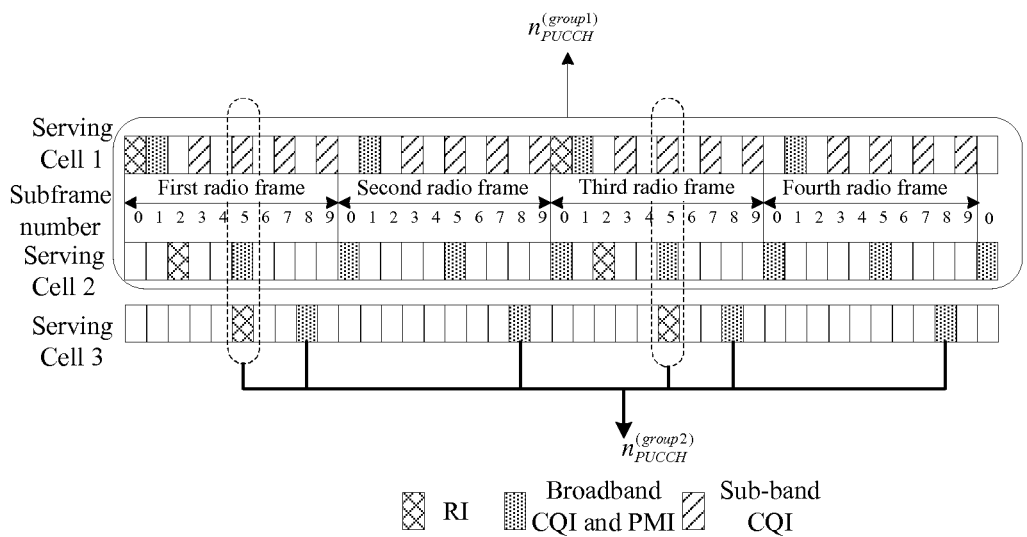
FIG. 12 is a flowchart of another method for processing information according to a preferred embodiment three of the disclosure.

FIG. 12 is a flowchart of another method for processing information according to a preferred embodiment three of the disclosure. As shown in FIG. 12, the serving cells 1, 2 and 3 are put through an aggregation processing, and the three serving cells are divided into two groups, wherein the serving cell 1 and serving cell 2 are put into group 1 in which the channel resources used when the P-CSI reports of the serving cell 1 and serving cell 2 are transmitted are configured as $n_{PUCCH}^{(group1)}$, and the serving cell 3 is put into group 2 in which the channel resources used when the P-CSI reports of serving cell 3 are transmitted are configured as $n_{PUCCH}^{(group2)}$. At the same time, it is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and a period of transmission of the RI is ten times of that of transmission of the CSI. The transmitting mode configured for serving cell 2 needs to feed back a report type 3 (RI), report type 2 (broadband CQI and PMI), and a base period of transmission of the P-CSI report is set to 5 ms, wherein a bias of a sub-frame of RI is set to 3, and a period of transmission of the RI is four times of that of transmission of the CSI. The transmitting mode configured for serving cell 3 needs to feed back the report type 3 (RI) and report type 2 (broadband CQI and PMI), and a base period of transmission of the P-CSI report is set to 10 ms, wherein a bias of a sub-frame of RI is set to 3, and the period of transmission of the RI is two times of that of transmission of the CSI.

In the preferred embodiment, it is assumed that both $n_{PUCCH}^{(group1)}$ and $n_{PUCCH}^{(group2)}$ are the PUSCH.

For the serving cells 1 and 2, in addition to the sub-frame 5 of the first radio frame and the sub-frame 5 of the third radio frame, on all of the other sub-frames where the P-CSI of serving cell 1 and serving cell 2 needs to be transmitted, the following may be included: transmitting the P-CSI of only one serving cell and simultaneously transmitting the P-CSI of two serving cells, and the UE may adopt $n_{PUCCH}^{(group1)}$ to transmit the corresponding P-CSI.

For serving cell 3, in addition to the sub-frame 5 of the first radio frame and the sub-frame 5 of the third radio frame, on all of the other sub-frames where the P-CSI of serving cell 3 needs to be transmitted, the UE may adopt $n_{PUCCH}^{(group2)}$ to transmit the corresponding P-CSI.

For the sub-frame 5 of the first radio frame and the sub-frame 5 of the third radio frame, the UE needs to feed back the P-CSI of three serving cells, and since the serving cells 1 and 2 belong to group 1, the serving cell 3 belongs to group 2, and the channel resources used in transmission are all configured as the PUSCH, according to the priority principles of P-CSI reports ruled in the Rel-10, the UE will select the PUSCH resource with the highest priority between $n_{PUCCH}^{(group1)}$ and $n_{PUCCH}^{(group2)}$; since the P-CSI report transmitted by the serving cell 3 is RI, the priority of which is higher than the priorities of the sub-band CQI of the serving cell 1 and the broadband CQI and PMI of the serving cell 2, the UE will adopt $n_{PUCCH}^{(group2)}$ to transmit the P-CSI reports of the serving cells 1, 2, 3.

Figure 13:
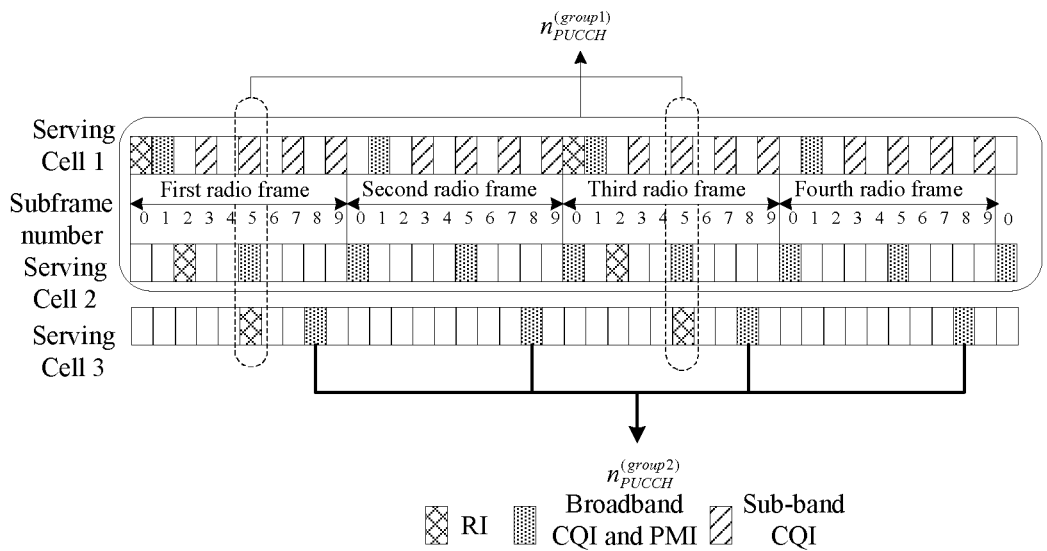
FIG. 13 is a flowchart of another method for processing information according to a preferred embodiment four of the disclosure.

FIG. 13 is a flowchart of another method for processing information according to a preferred embodiment four of the disclosure. As shown in FIG. 13, the serving cells 1, 2 and 3 are put through an aggregation processing, and the three serving cells are divided into two groups, wherein the serving cell 1 and serving cell 2 are put into group 1 in which the channel resources used when the P-CSI reports of the serving cell 1 and serving cell 2 are transmitted are configured as $n_{PUCCH}^{(group1)}$, and the serving cell 3 is put into group 2 in which the channel resources used when the P-CSI reports of serving cell 3 are transmitted are configured as $n_{PUCCH}^{(group2)}$. It is assumed that the transmitting mode configured for the serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and a period of transmission of the RI is ten times of that of transmission of the CSI. The transmitting mode configured for serving cell 2 needs to feed back the report type 3 (RI), report type 2 (broadband CQI and PMI), and a base period of transmission of the P-CSI report is set to 5 ms, wherein a bias of a sub-frame of RI is set to 3, and the period of transmission of the RI is four times of that of transmission of the CSI. The transmitting mode configured for serving cell 3 needs to feed back the report type 3 (RI) and report type 2 (broadband CQI and PMI), and a base period of transmission of the P-CSI report is set to 10 ms, wherein a bias of a sub-frame of RI is set to 3, and the period of transmission of the RI is two times of that of transmission of the CSI.

In a preferred embodiment, it is assumed that $n_{PUCCH}^{(group1)}$ are the PUSCH, while $n_{PUCCH}^{(group2)}$ are the PUCCH format 3.

For the serving cells 1 and 2, in addition to the sub-frame 5 of the first radio frame and the sub-frame 5 of the third radio frame, on all of the other sub-frames where the P-CSI of serving cell 1 and serving cell 2 needs to be transmitted, the following may be included: transmitting the P-CSI of only one serving cell and simultaneously transmitting the P-CSI of two serving cells, and the UE may adopt $n_{PUCCH}^{(group1)}$ to transmit the corresponding P-CSI.

For serving cell 3, in addition to the sub-frame 5 of the first radio frame and the sub-frame 5 of the third radio frame, on all of the other sub-frames where the P-CSI of serving cell 3 needs to be transmitted, the UE may adopt $n_{PUCCH}^{(group2)}$ to transmit the corresponding P-CSI.

For the sub-frame 5 of the first radio frame and the sub-frame 5 of the third radio frame, the UE needs to feed back the P-CSI of three serving cells, and since the serving cells 1 and 2 belong to group 1, the serving cell 3 belongs to group 2, and only one of the channel resources used in transmission is configured as the PUSCH, the UE will adopt $n_{PUCCH}^{(group1)}$ to transmit the P-CSI reports of the serving cells 1, 2 and 3.

Figure 14:
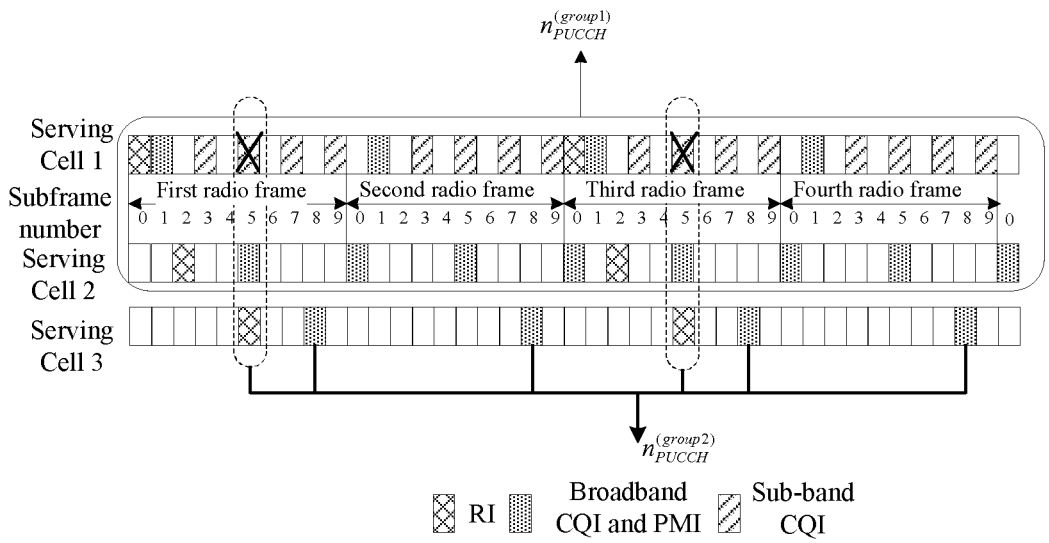
FIG. 14 is a flowchart of another method for processing information according to a preferred embodiment five of the disclosure.

FIG. 14 is a flowchart of another method for processing information according to a preferred embodiment five of the disclosure. As shown in FIG. 14, serving cells 1, 2 and 3 are put through an aggregation processing, and the three serving cells are divided into two groups, wherein the serving cell 1 and serving cell 2 are put into group 1 in which the channel resources used when the P-CSI reports of the serving cell 1 and serving cell 2 are transmitted are configured as $n_{PUCCH}^{(group1)}$, and the serving cell 3 is put into group 2 in which the channel resources used when the P-CSI report of serving cell 3 is transmitted are configured as $n_{PUCCH}^{(group2)}$. At the same time, it is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and a period of transmission of the RI is ten times of that of transmission of the CSI. The transmitting mode configured for serving cell 2 needs to feed back a report type 3 (RI), report type 2 (broadband CQI and PMI), and a base period of transmission of the P-CSI report is set to 5 ms, wherein a bias of a sub-frame of RI is set to 3, and a period of transmission of the RI is four times of that of transmission of the CSI. The transmitting mode configured for serving cell 3 needs to feed back the report type 3 (RI) and report type 2 (broadband CQI and PMI), and a base period of transmission of the P-CSI report is set to 10 ms, wherein a bias of a sub-frame of RI is set to 3, and a period of transmission of the RI is two times of that of transmission of the CSI.

In a preferred embodiment, it is assumed that both $n_{PUCCH}^{(group1)}$ and $n_{PUCCH}^{(group2)}$ are PUCCH format 3.

For the serving cells 1 and 2, in addition to the sub-frame 5 of the first radio frame and the sub-frame 5 of the third radio frame, on all of the other sub-frames where the P-CSI of the serving cell 1 and serving cell 2 needs to be transmitted, the following may be included: transmitting the P-CSI of only one serving cell and simultaneously transmitting the P-CSI of two serving cells, and the UE may adopt $n_{PUCCH}^{(group1)}$ to transmit the corresponding P-CSI.

For serving cell 3, in addition to the sub-frame 5 of the first radio frame and the sub-frame 5 of the third radio frame, on all of the other sub-frames where the P-CSI of serving cell 3 needs to be transmitted, the UE may adopt $n_{PUCCH}^{(group2)}$ to transmit the corresponding P-CSI.

For the sub-frame 5 of the first radio frame and the sub-frame 5 of the third radio frame, the UE needs to feed back the P-CSI of three serving cells, and since the serving cells 1 and 2 belong to a group, the serving cell 3 belongs to the other group, and the channel resources used in transmission are configured as the PUCCH format 3. According to the priority principles of the P-CSI reports ruled in the Rel-10, the UE will select a PUCCH format 3 resource with the highest priority between $n_{PUCCH}^{(group1)}$ and $n_{PUCCH}^{(group2)}$; since the P-CSI report transmitted by the serving cell 3 is RI, the priority of which is higher than the priorities of the sub-band CQI of the serving cell 1 and the broadband CQI and PMI of the serving cell 2, the UE will therefore adopt the channel resources $n_{PUCCH}^{(group2)}$ used when the P-CSI report of the serving cell 3 with the highest priority is transmitted, and then again according to the priority principles of P-CSI reports ruled in the Rel-10, select a P-CSI report with the highest priority from the P-CSI reports of the other serving cell 1 and serving cell 2, and since the P-CSI report of serving cell 2 is broadband CQI and PMI, the priority of which is higher than that of the sub-band CQI of the serving cell 1, therefore the UE will transmit the P-CSI report of the serving cell 3 and the P-CSI report of serving cell 2 on $n_{PUCCH}^{(group2)}$.

Figure 15:
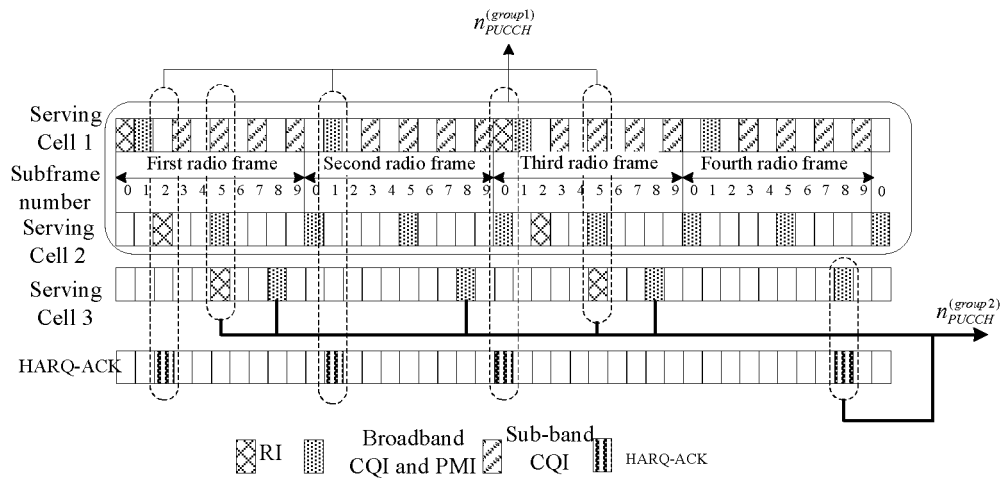
FIG. 15 is a flowchart of another method for processing information according to a preferred embodiment six of the disclosure.

FIG. 15 is a flowchart of another method for processing information according to a preferred embodiment six of the disclosure. As shown in FIG. 15, the serving cells 1, 2 and 3 are put through an aggregation processing, and the three serving cells are divided into two groups, wherein the serving cell 1 and serving cell 2 are put into group 1 in which the channel resources used when the P-CSI reports of serving cell 1 and serving cell 2 are transmitted are configured as $n_{PUCCH}^{(group1)}$, and the serving cell 3 is put into group 2 in which the channel resources used when the P-CSI report of serving cell 3 is transmitted are configured as $n_{PUCCH}^{(group2)}$. At the same time, it is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and a period of transmission of the RI is ten times of that of transmission of the CSI. The transmitting mode configured for serving cell 2 needs to feed back the report type 3 (RI), report type 2 (broadband CQI and PMI), and the base period of transmission of the P-CSI report is set to 5 ms, wherein a bias of a sub-frame of RI is set to 3, and the period of transmission of the RI is four times of that of transmission of the CSI. The transmitting mode configured for serving cell 3 needs to feed back a reports type 3 (RI) and report type 2 (broadband CQI and PMI), and a base period of transmission of the P-CSI report is set to 10 ms, wherein a bias of a sub-frame of RI is set to 3, and a period of transmission of the RI is two times of that of transmission of the CSI.

In a preferred embodiment, it is assumed that both $n_{PUCCH}^{(group1)}$ and $n_{PUCCH}^{(group2)}$ are the PUSCH, and at the same time, it is assumed that on the sub-frame 2 of a first radio frame, the sub-frame 1 of a second radio frame, the sub-frame 0 of a third radio frame and the sub-frame 8 of a fourth radio frame, the UE needs to feed back the HARQ-ACKs of a plurality of serving cells.

For the serving cells 1 and 2, in addition to the sub-frames 2 and 5 of the first radio frame, the sub-frame 1 of the second radio frame and the sub-frames 0 and 5 of the third radio frame, on all of the other sub-frames where the P-CSI of serving cell 1 and serving cell 2 needs to be transmitted, the following may be included: transmitting the P-CSI of only one serving cell and simultaneously transmitting the P-CSI of two serving cells, and the UE may adopt $n_{PUCCH}^{(group1)}$ to transmit the corresponding P-CSI.

For the serving cell 3, in addition to the sub-frame 5 of the first radio frame, the sub-frame 5 of the third radio frame and the sub-frame 8 of the fourth radio frame, on all of the other sub-frames where the P-CSI of serving cell 3 needs to be transmitted, the UE may adopt $n_{PUCCH}^{(group2)}$ to transmit the corresponding P-CSI.

For the sub-frame 2 of the first radio frame, the UE needs to transmit the P-CSI of the serving cell 2 and the HARQ-ACKs of the plurality of serving cells, and since the resources used when the P-CSI of serving cell 2 is transmitted are the PUSCH, the UE will transmit the P-CSI of serving cell 2 and the HARQ-ACKs of the plurality of serving cells on $n_{PUCCH}^{(group1)}$.

For the sub-frame 5 of the first radio frame and the sub-frame 5 of the third radio frame, the UE needs to feed back the P-CSI of three serving cells, and since the serving cells 1 and 2 belong to group 1, the serving cell 3 belongs to group 2, and the channel resources used in transmission are configured as the PUSCH, according to the priority principles of P-CSI reports ruled in the Rel-10, the UE will select a PUSCH resource with the highest priority between $n_{PUCCH}^{(group1)}$ and $n_{PUCCH}^{(group2)}$; since the P-CSI report transmitted by the serving cell 3 is RI, the priority of which is higher than the sub-band CQI of the serving cell 1 and the) broadband CQI and PMI of the serving cell 2, the UE will adopt $n_{PUCCH}^{(group2)}$ to transmit the P-CSI reports of the serving cells 1, 2 and 3.

For the sub-frame 1 of the second radio frame, the UE needs to transmit the P-CSI of serving cell 1 and the HARQ-ACKs of the plurality of serving cells, and since the resources used when the P-CSI of serving cell 1 is transmitted are the PUSCH, the UE will transmit the P-CSI of serving cell 1 and the HARQ-ACKs of a plurality of serving cells on $n_{PUCCH}^{(group1)}$.

For the sub-frame 0 of the third radio frame, the UE needs to transmit the P-CSI of the serving cells 1 and 2 and the HARQ-ACKs of the plurality of serving cells, and since the serving cells 1 and 2 belong to a same group and the resources used in transmission of the corresponding P-CSI are the PUSCH, the UE will transmit the P-CSI of the serving cells 1 and 2 and the HARQ-ACKs of the plurality of serving cells on $n_{PUCCH}^{(group1)}$.

For the sub-frame 8 of the fourth radio frame, the UE needs to transmit the P-CSI of the serving cell 3 and the HARQ-ACKs of the plurality of serving cells, and since the resources used when the P-CSI of serving cell 3 is transmitted are the PUSCH, the UE will transmit the P-CSI of the serving cell 3 and the HARQ-ACKs of the plurality of serving cells on $n_{PUCCH}^{(group2)}$.

Figure 16:
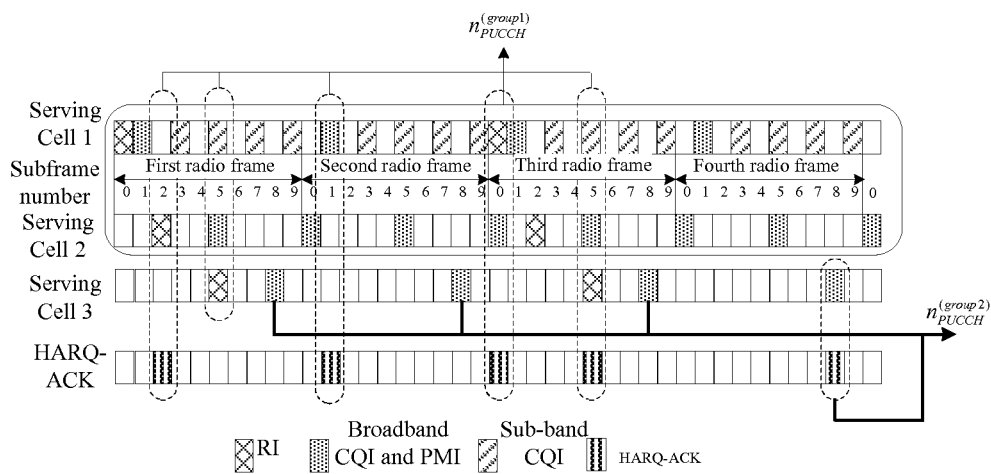
FIG. 16 is a flowchart of another method for processing information according to a preferred embodiment seven of the disclosure.

FIG. 16 is a flowchart of another method for processing information according to a preferred embodiment seven of the disclosure. As shown in FIG. 16, the serving cells 1, 2 and 3 are put through an aggregation processing, and the three serving cells are divided into two groups, wherein the serving cell 1 and serving cell 2 are put into group 1 in which the channel resources used when the P-CSI reports of serving cell 1 and serving cell 2 are transmitted are configured as $n_{PUCCH}^{(group1)}$, and the serving cell 3 is put into group 2 in which the channel resources used when the P-CSI report of the serving cell 3 is transmitted are configured as $n_{PUCCH}^{(group2)}$. At the same time, it is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and a period of transmission of the RI is ten times of that of transmission of the CSI. The transmitting mode configured for serving cell 2 needs to feed back a reports type 3 (RI), report type 2 (broadband CQI and PMI), and a base period of transmission of the P-CSI report is set to 5 ms, wherein a bias of a sub-frame of RI is set to 3, and the period of transmission of the RI is four times of that of transmission of the CSI. The transmitting mode configured for serving cell 3 needs to feed back a report type 3 (RI) and report type 2 (broadband CQI and PMI), and a base period of transmission of the P-CSI report is set to 10 ms, wherein a bias of a sub-frame of RI is set to 3, and a period of transmission of the RI is two times of that of transmission of the CSI.

In a preferred embodiment, it is assumed that $n_{PUCCH}^{(group1)}$ are the PUSCH and $n_{PUCCH}^{(group2)}$ are the PUCCH format 3, and it is assumed that on the sub-frame 2 of the first radio frame, the sub-frame 1 of the second radio frame, the sub-frames 0 and 5 of the third radio frame and the sub-frame 8 of the fourth radio frame, the UE needs to feed back the HARQ-ACKs of the plurality of serving cells, and it is assumed that the HARQ-ACKs are transmitted by using the PUCCH format 3, and the channel resources are symbolized by $n_{PUCCH}^{(HARQ-ACK)}$.

For the serving cells 1 and 2, in addition to the sub-frames 2 and 5 of the first radio frame, the sub-frame 1 of the second radio frame and the sub-frames 0 and 5 of the third radio frame, on all of the other sub-frames where the P-CSI of the serving cell 1 and serving cell 2 needs to be transmitted, the following may be included: transmitting the P-CSI of only one serving cell and simultaneously transmitting the P-CSI of two serving cells, and the UE may adopt $n_{PUCCH}^{(group1)}$ to transmit the corresponding P-CSI.

For the serving cell 3, in addition to the sub-frame 5 of the first radio frame, the sub-frame 5 of the third radio frame and the sub-frame 8 of the fourth radio frame, on all of the other sub-frames where the P-CSI of serving cell 3 needs to be transmitted, the UE may adopt $n_{PUCCH}^{(group2)}$ to transmit the corresponding P-CSI.

For the sub-frame 2 of the first radio frame, the UE needs to transmit the P-CSI of the serving cell 2 and the HARQ-ACKs of the plurality of serving cells, and since the resources used when the P-CSI of serving cell 2 is transmitted are the PUSCH, the UE will transmit the P-CSI of serving cell 2 and the HARQ-ACKs of the plurality of serving cells on $n_{PUCCH}^{(group1)}$.

For the sub-frame 5 of the first radio frame, the UE needs to feed back the P-CSI of three serving cells, and since the serving cells 1 and 2 belong to group 1, the serving cell 3 belongs to group 2, and only one of the channel resources used in transmission is configured as the PUSCH, namely $n_{PUCCH}^{(group1)}$, the UE will adopt $n_{PUCCH}^{(group1)}$ to transmit the P-CSI reports of the serving cells 1, 2 and 3.

For the sub-frame 1 of the second radio frame, the UE needs to transmit the P-CSI of serving cell 1 and the HARQ-ACKs of the plurality of serving cells, and since the resources used when the P-CSI of serving cell 1 is transmitted are the PUSCH, the UE will transmit the P-CSI of serving cell 1 and the HARQ-ACKs of the plurality of serving cells on $n_{PUCCH}^{(group1)}$.

For the sub-frame 0 of the third radio frame, the UE needs to transmit the P-CSI of the serving cells 1 and 2 and the HARQ-ACKs of the plurality of serving cells, and since the serving cells 1 and 2 belong to the same group and the resources used in transmission of the corresponding P-CSI are the PUSCH, the UE will transmit the P-CSI of the serving cells 1 and 2 and the HARQ-ACKs of the plurality of serving cells on $n_{PUCCH}^{(group1)}$.

For the sub-frame 5 of the third radio frame, the UE needs to feed back the P-CSI of three serving cells and the HARQ-ACKs of the plurality of serving cells, and since the serving cells 1 and 2 belong to group 1, the serving cell 3 belongs to group 2, and only one of the channel resources used in transmission is configured as the PUSCH, namely $n_{PUCCH}^{(group1)}$, the UE will therefore adopt $n_{PUCCH}^{(group2)}$ to transmit the P-CSI reports of the serving cells 1, 2, 3 and the HARQ-ACKs of the plurality of serving cells.

For the sub-frame 8 of the fourth radio frame, the UE needs to transmit the P-CSI of the serving cell 3 and the HARQ-ACKs of the plurality of serving cells, and since the resources used when the P-CSI of serving cell 3 is transmitted are the PUSCH format 3, and the PUCCH format 3 is also used for transmitting the HARQ-ACKs, the UE will transmit the P-CSI of the serving cell 3 and the HARQ-ACKs of the plurality of serving cells on $n_{PUCCH}^{(HARQ-ACK)}$.

Figure 17:
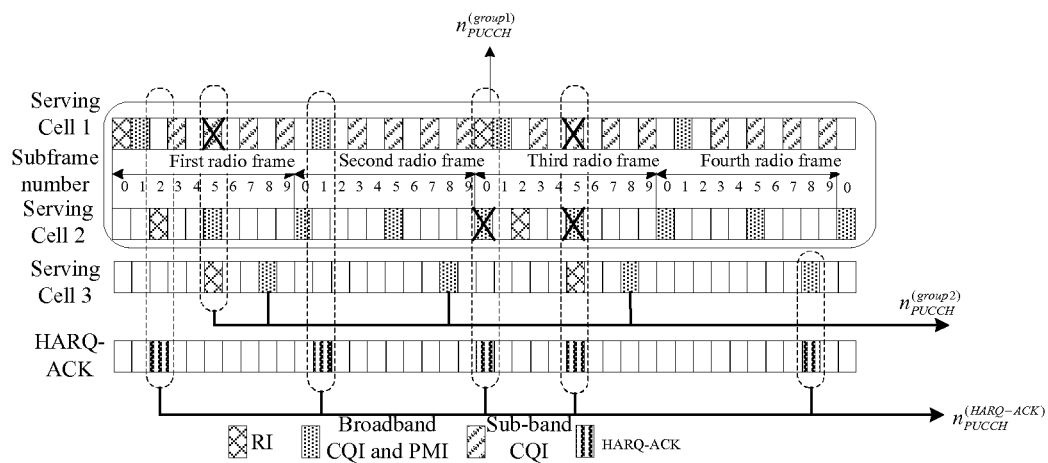
FIG. 17 is a flowchart of another method for processing information according to a preferred embodiment eight of the disclosure.

FIG. 17 is a flowchart of another method for processing information according to a preferred embodiment eight of the disclosure. As shown in FIG. 17, the serving cells 1, 2 and 3 are put through an aggregation processing, and the three serving cells are divided into two groups, wherein the serving cell 1 and serving cell 2 are put into group 1 in which the channel resources used when the P-CSI reports of the serving cell 1 and serving cell 2 are transmitted are configured as $n_{PUCCH}^{(group1)}$, and the serving cell 3 is put into group 2 in which the channel resources used when the P-CSI report of the serving cell 3 is transmitted are configured as $n_{PUCCH}^{(group2)}$. At the same time, it is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and a period of transmission of the RI is ten times of that of transmission of the CSI. The transmitting mode configured for serving cell 2 needs to feed back a report type 3 (RI), report type 2 (broadband CQI and PMI), and a base period of transmission of the P-CSI report is set to 5 ms, wherein a bias of a sub-frame of RI is set to 3, and the period of transmission of the RI is four times of that of transmission of the CSI. The transmitting mode configured for serving cell 3 needs to feed back the report type 3 (RI) and report type 2 (broadband CQI and PMI), and the base period of transmission of the P-CSI report is set to 10 ms, wherein a bias of a sub-frame of RI is set to 3, and the period of transmission of the RI is two times of that of transmission of the CSI.

In a preferred embodiment, it is assumed that both $n_{PUCCH}^{(group1)}$ and $n_{PUCCH}^{(group2)}$ are PUCCH format 3, and at the same time, it is assumed that on the sub-frame 2 of a first radio frame, the sub-frame 1 of a second radio frame, the sub-frame 0 of a third radio frame and the sub-frame 8 of a fourth radio frame, the UE needs to feed back the HARQ-ACKs of the plurality of serving cells, and it is assumed that the HARQ-ACKs are transmitted by using the PUCCH format 3, and the channel resources are symbolized by $n_{PUCCH}^{(HARQ-ACK)}$.

For the serving cells 1 and 2, in addition to the sub-frames 2 and 5 of the first radio frame, the sub-frame 1 of the second radio frame and the sub-frames 0 and 5 of the third radio frame, on all of the other sub-frames where the P-CSI of serving cell 1 and serving cell 2 needs to be transmitted, the following may be included: transmitting the P-CSI of only one serving cell and simultaneously transmitting the P-CSI of two serving cells, and the UE may adopt $n_{PUCCH}^{(group1)}$ to transmit the corresponding P-CSI.

For the serving cell 3, in addition to the sub-frame 5 of the first radio frame, the sub-frame 5 of the third radio frame and the sub-frame 8 of the fourth radio frame, on all of the other sub-frames where the P-CSI of serving cell 3 needs to be transmitted, the UE may adopt $n_{PUCCH}^{(group2)}$ to transmit the corresponding P-CSI.

For the sub-frame 2 of the first radio frame, the UE needs to transmit the P-CSI of the serving cell 2 and the HARQ-ACKs of the plurality of serving cells, and since the resources used when the P-CSI of the serving cell 2 is transmitted are the PUCCH format 3, and the resources used when the HARQ-ACKs of the plurality of serving cells are transmitted are also configured as the PUCCH format 3, the UE will therefore transmit the P-CSI of serving cell 2 and the HARQ-ACKs of the plurality of serving cells on $n_{PUCCH}^{(HARQ-ACK)}$.

For the sub-frame 5 of the first radio frame, the UE needs to feed back the P-CSI of three serving cells, and since the serving cells 1 and 2 belong to one group, the serving cell 3 belongs to the other group, and the channel resources used in transmission are configured as the PUCCH format 3, according to the priority principles of P-CSI reports ruled in the Rel-10, the UE will select a PUCCH format 3 resource with the highest priority between $n_{PUCCH}^{(group1)}$ and $n_{PUCCH}^{(group2)}$; since the P-CSI report transmitted by the serving cell 3 is RI, the priority of which is higher than the priorities of the sub-band CQI of the serving cell 1 and the broadband CQI and PMI of the serving cell 2, the UE will select the channel resources $n_{PUCCH}^{(group2)}$ used when the P-CSI report of the serving cell 3 with the highest priority is transmitted, and then again according to the priority principles of P-CSI reports ruled in the Rel-10, select a P-CSI report with the highest priority from the P-CSI reports of the other serving cell 1 and serving cell 2. Since the P-CSI report of the serving cell 2 is broadband CQI and PMI, the priority of which is higher than the sub-band CQI of the serving cell 1, the UE will transmit the P-CSI report of the serving cell 3 and the P-CSI report of the serving cell 2 on $n_{PUCCH}^{(group2)}$.

For the sub-frame 1 of the second radio frame, the UE needs to transmit the P-CSI of the serving cell 1 and the HARQ-ACKs of the plurality of serving cells, and since the resources used when the P-CSI of the serving cell 1 is transmitted are the PUCCH format 3, and the resources used when the HARQ-ACKs of the plurality of serving cells are transmitted are also configured as the PUCCH format 3, the UE will transmit the P-CSI of the serving cell 1 and the HARQ-ACKs of the plurality of serving cells on $n_{PUCCH}^{(HARQ-ACK)}$.

For the sub-frame 0 of the third radio frame, the UE needs to transmit the P-CSI of the serving cells 1 and 2 and the HARQ-ACKs of the plurality of serving cells, and since the serving cells 1 and 2 belong to a same group and the resources used in transmission of the corresponding P-CSI are the PUCCH format 3, and the resources used when the HARQ-ACKs of the plurality of serving cells are transmitted are also configured as the PUCCH format 3, therefore according to the priority principles of P-CSI reports ruled in the Rel-10, the UE will select a report with the highest priority among the P-CSI reports of the serving cells 1 and 2, namely the P-CSI report of the serving cell 1 (the priority of RI is higher than that of broadband CQI and PMI), to be transmit together with the HARQ-ACKs of the plurality of serving cells on $n_{PUCCH}^{(HARQ-ACK)}$.

For the sub-frame 5 of the third radio frame, the UE needs to feed back the P-CSI of three serving cells and the HARQ-ACKs of the plurality of serving cells, and since the serving cells 1 and 2 belong to group 1, the serving cell 3 belongs to group 2, and all channel resources used in transmission are configured as the PUCCH format 3, and the resources used when the plurality of HARQ-ACKs are transmitted are also configured as the PUCCH format 3, therefore according to the priority principles of P-CSI reports ruled in the Rel-10, the UE will select a report with the highest priority among the P-CSI reports of the serving cells 1, 2 and 3, namely the P-CSI report of the serving cell 3 (the priority of RI is higher than the priorities of broadband CQI and PMI as well as the priority of the sub-band CQI), to transmit together with the HARQ-ACKs of the plurality of serving cells on $n_{PUCCH}^{(HARQ-ACK)}$.

For the sub-frame 8 of the fourth radio frame, the UE needs to transmit the P-CSI of the serving cell 3 and the HARQ-ACKs of the plurality of serving cells, and since the resources used when the P-CSI of serving cell 3 is transmitted are the PUCCH, and the resources used when the plurality of HARQ-ACKs are transmitted are also configured as the PUCCH format 3, the UE will transmit the P-CSI of the serving cell 3 and the HARQ-ACKs of the plurality of serving cells on $n_{PUCCH}^{(HARQ-ACK)}$.

Figure 18:
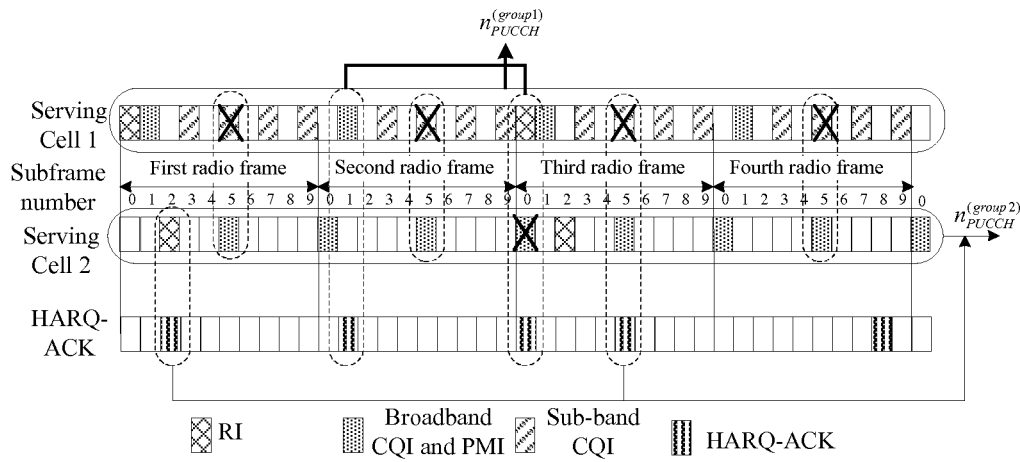
FIG. 18 is a flowchart of another method for processing information according to a preferred embodiment nine of the disclosure.

FIG. 18 is a flowchart of another method for processing information according to a preferred embodiment nine of the disclosure. As shown in FIG. 18, the serving cells 1 and 2 are put through an aggregation processing, and the serving cells 1 and 2 respectively corresponds to group 1 and group 2; the channel resources used when the P-CSI reports of group 1 and group 2 are transmitted are configured respectively as $n_{PUCCH}^{(group1)}$ and $n_{PUCCH}^{(group2)}$. At the same time, it is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and a period of transmission of the RI is ten times of that of transmission of the CSI. The transmitting mode configured for serving cell 2 needs to feed back the report type 3 (RI), report type 2 (broadband CQI and PMI), and the base period of transmission of the P-CSI report is set to 5 ms, wherein a bias of a sub-frame of RI is set to 3, and the period of transmission of the RI is four times of that of transmission of the CSI.

In a preferred embodiment, it is assumed that both $n_{PUCCH}^{(group1)}$ and $n_{PUCCH}^{(group2)}$ are configured as the PUCCH format 2, and at the same time it is assumed that the UE needs to feed back the HARQ-ACKs of the plurality of serving cells on the sub-frame 2 of a first radio frame, the sub-frame 2 of a second radio frame, the sub-frames 0 and 5 of a third radio frame and the sub-frame 8 of a fourth radio frame, and it is assumed that the HARQ-ACKs are transmitted in a manner of PUCCH format 1b combined channel selection.

For the serving cell 1, on the sub-frames 0, 1, 3, 7, 9 of the first radio frame, the sub-frames 3, 7, 9 of the second radio frame, the sub-frames 1, 3, 7, 9, of the third radio frame and the sub-frames 1, 3, 7, 9, of the fourth radio frame, the UE only needs to feed back the P-CSI of the serving cell 1, and therefore the UE will transmit the P-CSI of the serving cell 1 on the configured channel resources $n_{PUCCH}^{(group1)}$.

For the serving cell 2, on the sub-frame 0 of the second radio frame, the sub-frame 2 of the third radio frame and the sub-frame 0 of the fourth radio frame, the UE only needs to feed back the P-CSI of the serving cell 2, and therefore the UE will transmit the P-CSI of the serving cell 2 on the configured channel resources $n_{PUCCH}^{(group2)}$.

For the sub-frame 2 of the first radio frame, the UE needs to feed back the P-CSI of the serving cell 2 and the HARQ-ACKs of the plurality of serving cells, and since the resources used when the P-CSI of the serving cell 2 is transmitted are the PUCCH format 2 while the HARQ-ACKs are transmitted by using the PUCCH format 1b combined channel selection, here it is assumed further that the system participating in aggregation is FDD, and the UE firstly performs a spacial bundling on the HARQ-ACKs of the plurality of serving cells to obtain 2-bit information, and then transmits the P-CSI of the serving cell 2 and 2-bit HARQ-ACK after the above spacial bundling on the channel resources $n_{PUCCH}^{(group2)}$ configured in transmission of the P-CSI of the serving cell 2.

For the sub-frames 5 of the first/second/fourth radio frames, the UE needs to feed back the P-CSI of the serving cell 1 and the serving cell 2, and since the resources used when the P-CSI of the serving cells 1 and 2 is transmitted are the PUCCH format 2, which may not support the simultaneous transmission of the P-CSI of the plurality of serving cells, therefore according to the priority principles ruled in the Rel-10, the UE will select the P-CSI report of the serving cell 2 with the highest priority (because the priorities of broadband CQI and PMI are higher than the priority of sub-band CQI) to be transmitted on $n_{PUCCH}^{(group2)}$.

For the sub-frame 1 of the second radio frame, the UE needs to feed back the P-CSI of the serving cell 1 and the HARQ-ACKs of the plurality of serving cells, and since the resources used when the P-CSI of the serving cell 1 is transmitted is the PUCCH format 2 while the HARQ-ACKs are transmitted by using the PUCCH format 1b combined channel selection, here it is assumed further that the system participating in aggregation is FDD, and the UE firstly performs a spacial bundling on the HARQ-ACKs of the plurality of serving cells to obtain 2-bit information, and then transmits the P-CSI of the serving cells 1 and 2-bit HARQ-ACK after the above spacial bundling on the channel resources $n_{PUCCH}^{(group1)}$ configured in transmission of the P-CSI of the serving cell 1.

For the sub-frame 0 of the third radio frame, the UE needs to feed back the P-CSI of the serving cell 1 and the serving cell 2 and the HARQ-ACKs of the plurality of serving cells, and since the resources used when the P-CSI of the serving cells 1 and 2 is transmitted are the PUCCH format 2 and the HARQ-ACKs are transmitted by using the PUCCH format 1b combined channel selection, here it is assumed further that the system participating in aggregation is FDD, and the UE firstly performs a spacial bundling on the HARQ-ACKs of the plurality of serving cells to obtain 2-bit information, and then according to the priority principles ruled in the Rel-10, the UE selects the P-CSI report of the serving cell 1 with the highest priority (the priority of the serving cell 1 is higher than the priorities of broadband CQI and PMI of the serving cell 2) to transmits the P-CSI of the serving cells 1 and 2-bit HARQ-ACK after the above spacial bundling on the channel resources $n_{PUCCH}^{(group1)}$ configured in transmission of the P-CSI of the serving cell 1.

For the sub-frame 5 of the third radio frame, the UE needs to feed back the P-CSI of the serving cell 1 and the serving cell 2 and the HARQ-ACKs of the plurality of serving cells, and since the resources used when the P-CSI of the serving cells 1 and 2 is transmitted are the PUCCH format 2 and the HARQ-ACKs are transmitted by using the PUCCH format 1b combined channel selection, here it is assumed further that the system participating in aggregation is FDD, and the UE firstly performs a spacial bundling on the HARQ-ACKs of the plurality of serving cells to obtain 2-bit information, and then according to the priority principles ruled in the Rel-10, the UE selects the P-CSI report of the serving cell 2 with the highest priority (the priorities of broadband CQI and PMI of the serving cell 2 is higher than the priority of the serving cell 1) to transmits the P-CSI of the serving cell 2 and 2-bit HARQ-ACK after the above spacial bundling on the channel resources $n_{PUCCH}^{(group2)}$ configured in transmission of the P-CSI of the serving cell 2.

Figure 19:
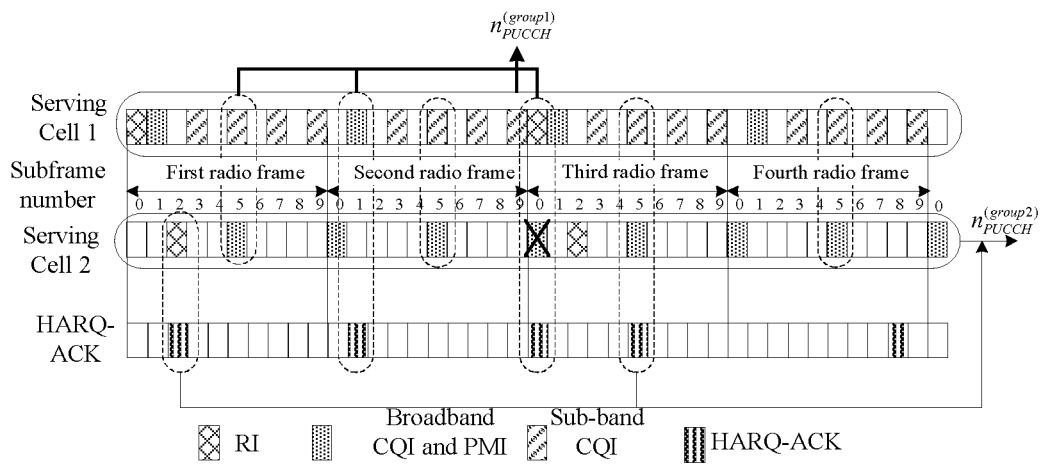
FIG. 19 is a flowchart of another method for processing information according to a preferred embodiment ten of the disclosure.

FIG. 19 is a flowchart of another method for processing information according to a preferred embodiment ten of the disclosure. As shown in FIG. 19, the serving cells 1 and 2 are put through an aggregation processing, and the serving cells 1 and 2 respectively correspond to group 1 and group 2, and the channel resources used when the P-CSI reports of group 1 and group 2 are transmitted are configured respectively as $n_{PUCCH}^{(group1)}$ and $n_{PUCCH}^{(group2)}$. At the same time, it is assumed that the transmitting mode configured for serving cell 1 needs to feed back a report type 3 (RI), report type 2 (broadband CQI and PMI) and report type 1 (the sub-band CQI selected by the UE), and a base period of transmission of the P-CSI report is set to 2 ms, wherein a bias of a sub-frame of RI is set to 1, and the period of transmission of the RI is ten times of that of transmission of the CSI. The transmitting mode configured for serving cell 2 needs to feed back a report type 3 (RI), report type 2 (broadband CQI and PMI), and a base period of transmission of the P-CSI report is set to 5 ms, wherein a bias of a sub-frame of RI is set to 3, and the period of transmission of the RI is four times of that of transmission of the CSI.

In a preferred embodiment, it is assumed that $n_{PUCCH}^{(group1)}$ and $n_{PUCCH}^{(group2)}$ are configured respectively as PUCCH format 3 and PUCCH format 2, and at the same time it is assumed that on the sub-frame 2 of a first radio frame, the sub-frame 1 of a second radio frame, the sub-frames 0 and 5 of a third radio frame and the sub-frame 8 of a fourth radio frame, the UE needs to feed back the HARQ-ACKs of the plurality of serving cells, and it is assumed that the HARQ-ACKs are transmitted in a manner of PUCCH format 1b combined channel selection.

For the serving cell 1, on the sub-frames 0, 1, 3, 7, 9 of the first radio frame, the sub-frames 3, 7, 9 of the second radio frame, the sub-frames 1, 3, 7, 9, of the third radio frame and the sub-frames 1, 3, 7, 9, of the fourth radio frame, the UE only needs to feed back the P-CSI of the serving cell 1, and therefore the UE will transmit the P-CSI of the serving cell 1 on the configured channel resources $n_{PUCCH}^{(group1)}$.

For the serving cell 2, on the sub-frame 0 of the second radio frame, the sub-frame 2 of the third radio frame and the sub-frame 0 of the fourth radio frame, the UE only needs to feed back the P-CSI of the serving cell 2, and therefore the UE will transmit the P-CSI of the serving cell 2 on the configured channel resources $n_{PUCCH}^{(group2)}$.

For the sub-frame 2 of the first radio frame, the UE needs to feed back the P-CSI of serving cell 2 and the HARQ-ACKs of the plurality of serving cells, and since the channel resources used when the P-CSI of serving cell 2 is transmitted are configured as the PUCCH format 2 and the HARQ-ACKs are transmitted by using the PUCCH format 1b combined channel selection, here it is assumed further that the system participating in aggregation is FDD, the UE firstly performs a spacial bundling on the HARQ-ACKs of the plurality of serving cells to obtain 2-bit information, and then transmit the P-CSI of the serving cell 2 and 2-bit HARQ-ACK after the above spacial bundling on the channel resources $n_{PUCCH}^{(group2)}$ configured in transmission of the P-CSI report of the serving cell 2.

For the sub-frames 5 of the first/second/fourth radio frames, the UE needs to feed back the P-CSI of the serving cell 1 and the serving cell 2, and since the channel resources used when the P-CSI of the serving cell 1 is transmitted are the PUCCH format 3, the UE will transmit the P-CSI of the serving cells 1 and 2 on $n_{PUCCH}^{(group1)}$.

For the sub-frame 1 of the second radio frame, the UE needs to feed back the P-CSI of serving cell 1 and the HARQ-ACKs of the plurality of serving cells, and since the channel resources used when the P-CSI of serving cell 1 is transmitted are the PUCCH format 3 and the HARQ-ACKs are transmitted by using the PUCCH format 1b combined channel selection, the UE will transmit the P-CSI of serving cell 1 and the HARQ-ACKs of the plurality of serving cells on $n_{PUCCH}^{(group1)}$.

For the sub-frame 0 of the third radio frame, the UE needs to feed back the P-CSI of the serving cell 1 and serving cell 2 and the HARQ-ACKs of the plurality of serving cells, and since the channel resources used when the P-CSI of the serving cell 1 is transmitted are the PUCCH format 3 and the HARQ-ACKs are transmitted by using the PUCCH format 1b combined channel selection, then the UE determines that the channel resources used when the P-CSI and the HARQ-ACKs of the plurality of serving cells are transmitted are the channel resources used when the P-CSI of the serving cell 1 is transmitted, namely $n_{PUCCH}^{(group1)}$, and transmits the P-CSI reports of serving cells corresponding to the selected PUCCH format 3 resource and the HARQ-ACKs of the plurality of serving cells on the selected PUCCH format 3, namely transmitting the P-CSI report of serving cell 1 and the HARQ-ACKs of the plurality of serving cells on $n_{PUCCH}^{(group1)}$; or, according to the priority principles of the P-CSI report ruled in the Rel-10, the UE selects the P-CSI report of the serving cell 1 with the highest priority (the priority of RI of the serving cell 1 is higher than the priorities of broadband CQI and PMI of the serving cell 2) to transmit the P-CSI of the serving cell 1 and the HARQ-ACKs of the plurality of serving cells on the channel resources $n_{PUCCH}^{(group1)}$ configured in transmission of the P-CSI of the serving cell 1.

For the sub-frame 5 of the third radio frame, the UE needs to feed back the P-CSI of the serving cell 1 and serving cell 2 and the HARQ-ACKs of the plurality of serving cells, and since the channel resources used when the P-CSI of the serving cell 1 is transmitted are the PUCCH format 3 and the HARQ-ACKs are transmitted by using the PUCCH format 1b combined channel selection, then the UE determines that the channel resources used when the P-CSI and the HARQ-ACKs of the plurality of serving cells are transmitted are the channel resources used when the P-CSI of the serving cell 1 is transmitted, namely $n_{PUCCH}^{(group1)}$, and transmits the P-CSI reports of serving cells corresponding to the selected PUCCH format 3 resource and the HARQ-ACKs of the plurality of serving cells on the selected PUCCH format 3, namely transmitting the P-CSI report of serving cell 1 and the HARQ-ACKs of the plurality of serving cells on $n_{PUCCH}^{(group1)}$; or, according to the priority principles of the P-CSI report ruled in the Rel-10, the UE selects the P-CSI report of the serving cell 2 with the highest priority (the priorities of broadband CQI and PMI of the serving cell 2 are higher than the priority of sub-band CQI of the serving cell 1) to transmit the P-CSI of the serving cell 2 and the HARQ-ACKs of the plurality of serving cells on the channel resources $n_{PUCCH}^{(group1)}$ configured in transmission of the P-CSI of the serving cell 1.

Figure 20:
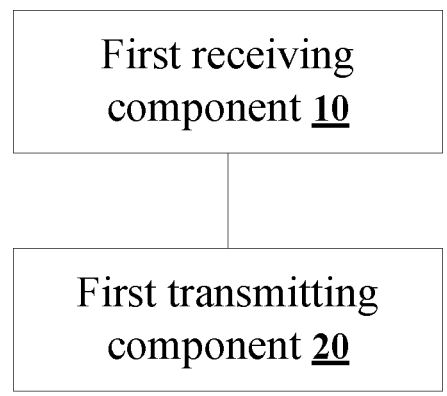
FIG. 20 is a structure diagram of a device for processing information according to an embodiment of the disclosure.

FIG. 20 is a structure diagram of a device for processing information according to an embodiment of the disclosure. As shown in FIG. 20, the device for processing information may comprise: a first receiving component 10 configured to receive a higher-layer signaling from a base station, wherein the higher-layer signaling carries uplink channel resources configured by the base station for a user equipment (UE), and the uplink channel resources are used for simultaneously transmitting periodic channel state information (P-CSI) of a plurality of serving cells corresponding to the UE, or are used for simultaneously transmitting hybrid automatic repeat request acknowledgments (HARQ-ACKs) of the plurality of serving cells corresponding to the UE and the P-CSI of the plurality of serving cells; and a first transmitting block 20 configured to simultaneously transmit the P-CSI of the plurality of serving cells on the uplink channel resources according to the higher-layer signaling in a preset uplink sub-frame, or simultaneously transmit the HARQ-ACKs of the plurality of serving cells and the P-CSI of the plurality of serving cells on the uplink channel resources according to the higher-layer signaling in the preset uplink sub-frame.

The device shown in FIG. 20 solves the problem that the simultaneous transmission of P-CSI of the plurality of serving cells, or the simultaneous transmission of the HARQ-ACKs of the plurality of serving cells and the P-CSI of a plurality of serving cells can not be realized in the related arts, thereby implementing the simultaneous transmission of acknowledgments of the plurality of downlink component carries and the channel state information of the plurality of serving cells.

Preferably, the uplink channel resources may comprise, but are not limited to, at least one of the following: PUCCH format 3 and PUSCH.

Figure 21:
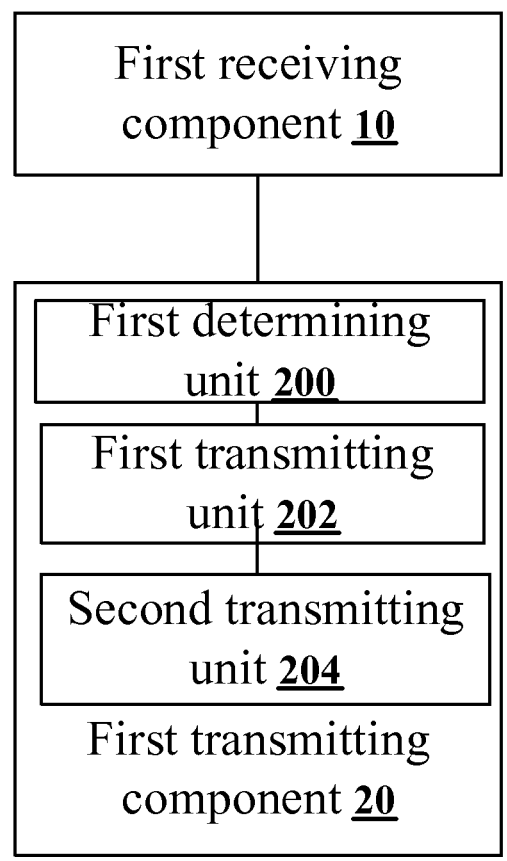
FIG. 21 is a structure diagram of a device for processing information according to a preferred embodiment one of the disclosure.

Preferably, as shown in FIG. 21, the first transmitting component 20 may comprise: a first determining unit 200 configured to, when the uplink channel resources are the PUCCH format 3, determine the number of the plurality of serving cells to be transmitted in the preset uplink sub-frame; a first transmitting unit 202 configured to, when the number of the plurality of serving cells is less than or equal to 2, simultaneously transmit the P-CSI of each of the plurality of serving cells on the PUCCH format 3; and a second transmitting unit 204 configured to, when the number of the plurality of serving cells is greater than 2, select two serving cells with the highest P-CSI priority from the plurality of serving cells, and simultaneously transmit the P-CSI of each of the selected serving cells on the PUCCH format 3.

Figure 22:
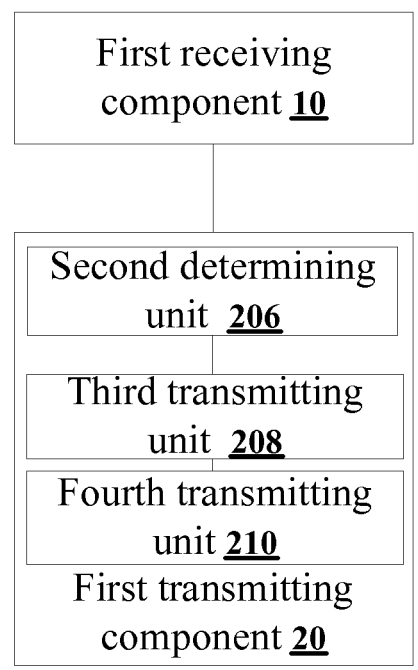
FIG. 22 is a structure diagram of a device for processing information according to a preferred embodiment two of the disclosure.

Preferably, as shown in FIG. 22, the first transmitting component 20 may comprise: a second determining unit 206 configured to, when the uplink channel resources are the PUCCH format 3, determine the number of bits fed back together by the P-CSI of the plurality of serving cells to be transmitted in the preset uplink sub-frame; a third transmitting unit 208 configured to, when the number of bits fed back together by the P-CSI of the plurality of serving cells does not exceed the maximum value of the number of bits that can be carried by the PUCCH format 3, simultaneously transmit the P-CSI of each of the plurality of serving cells on the PUCCH format 3; and a fourth transmitting unit 210 configured to, when the number of bits fed back together by the P-CSI of the plurality of serving cells exceeds the maximum value of the number of bits that can be carried by the PUCCH format 3, select N serving cells with the highest P-CSI priority from the plurality of serving cells and simultaneously transmit the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

Figure 23:
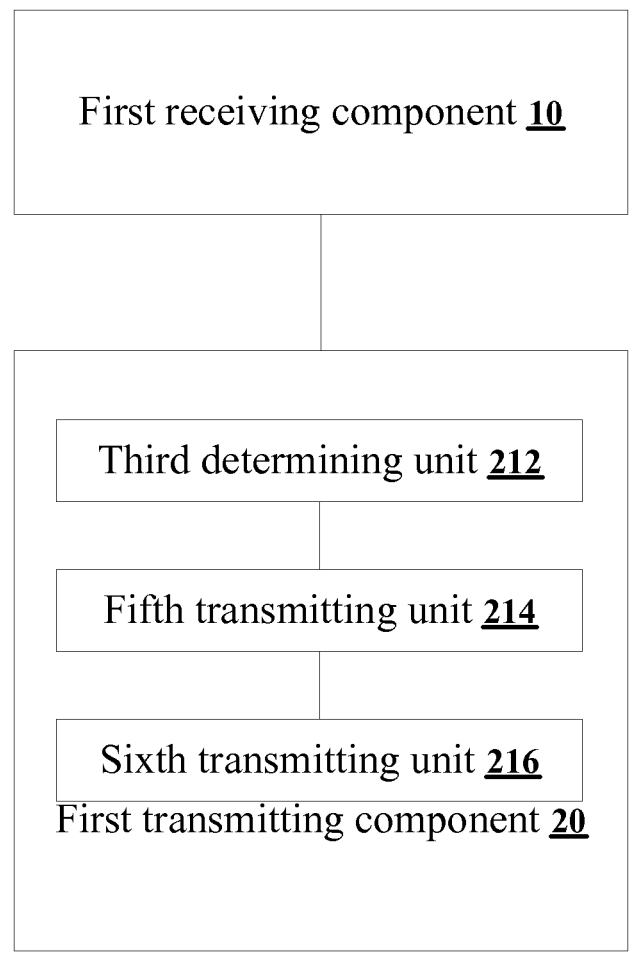
FIG. 23 is a structure diagram of a device for processing information according to a preferred embodiment three of the disclosure.

Preferably, as shown in FIG. 23, the first transmitting component 20 may comprise: a third determining unit 212 configured to, when the uplink channel resources are the PUCCH format 3, determine the number of the plurality of serving cells with the P_CSI to be transmitted in the preset uplink sub-frame; a fifth transmitting unit 214 configured to, when the number of the plurality of serving cells with the P-CSI to be transmitted is 1, simultaneously transmit the P-CSI of the serving cell with the P-CSI to be transmitted and the HARQ-ACKs of the plurality of serving cells on the PUCCH format 3; and a sixth transmitting unit 216 configured to, when the number of the plurality of serving cells with the P-CSI to be transmitted is more than one, select a serving cell with the highest P-CSI priority from the plurality of serving cells, and simultaneously transmit the P-CSI of the selected serving cell and the HARQ-ACKs of the plurality of serving cells on the PUCCH format 3.

Figure 24:
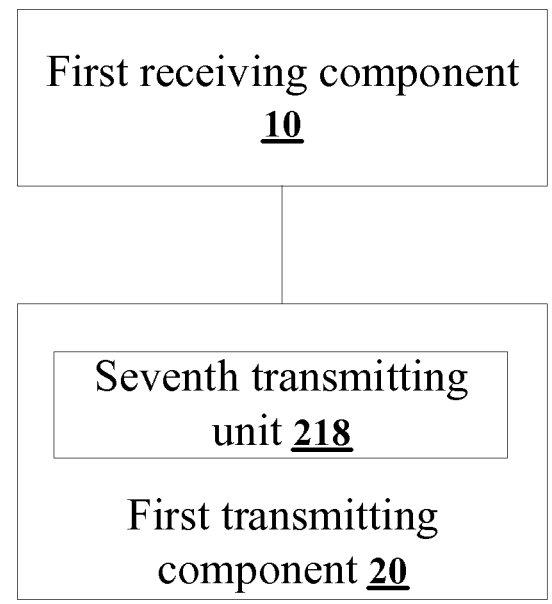
FIG. 24 is a structure diagram of a device for processing information according to a preferred embodiment four of the disclosure.

Preferably, as shown in FIG. 24, the first transmitting component 20 may comprise: a seventh transmitting unit 218 configured to, when the uplink channel resources are the PUSCH, simultaneously transmit the P-CSI of the plurality of serving cells corresponding to the UE on the PUSCH according to the higher-layer signaling in the preset uplink sub-frame, or simultaneously transmit the HARQ-ACKs of the plurality of serving cells and the P-CSI of the plurality of serving cells on the PUSCH according to the higher-layer signaling in the preset uplink sub-frame.

Preferably, the first transmitting component is configured to, when the P-CSI of the plurality of serving cells or the HARQ-ACKs of the plurality of serving cells and the P-CSI of the plurality of serving cells are simultaneously transmitted in the preset uplink sub-frame, simultaneously transmit the P-CSI of the plurality of serving cells on the uplink channel resources according to the higher-layer signaling in the preset uplink sub-frame, or simultaneously transmit the HARQ-ACKs of the plurality of serving cells and the P-CSI of the plurality of serving cells on the uplink channel resource according to the higher-layer signaling in the preset uplink sub-frame.

Figure 25:
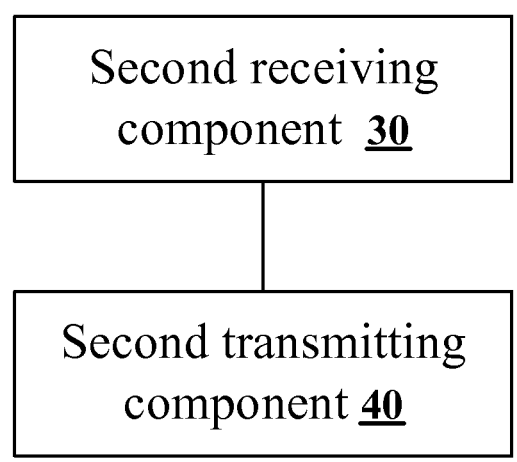
FIG. 25 is a structure diagram of another device for processing information according to an embodiment of the disclosure.

FIG. 25 is a structure diagram of another device for processing information according to an embodiment of the disclosure. As shown in FIG. 25, the device for processing information may comprise: a second receiving component 30 configured to receive a higher-layer signaling from a base station, wherein the higher-layer signaling carries information of grouping a plurality of serving cells corresponding to a user equipment (UE) by the base station, and the base station respectively configures uplink channel resources for each group of serving cells after the grouping processing; and a second transmitting component 40 configured to transmit periodic channel state information (P-CSI) of any of the plurality of serving cells on the uplink channel resources according to the higher-layer signaling in the preset uplink sub-frame, or simultaneously transmit the P-CSI of each of the plurality of serving cells; or, on the uplink channel resources according to the higher-layer signaling in the preset uplink sub-frame or on uplink channel resources used when hybrid automatic repeat request acknowledgements (HARQ-ACKs) of the plurality of serving cells are transmitted, simultaneously transmit the HARQ-ACKs of the plurality of serving cells and the P-CSI of the plurality of serving cells.

The device shown in FIG. 25 solves the problem that the simultaneous transmission of P-CSI of the plurality of serving cells or the simultaneous transmission of the HARQ-ACKs of the plurality of serving cells and the P-CSI of the plurality of serving cells can not be realized in the related arts, thereby implementing the simultaneous transmission of acknowledgments of the plurality of downlink component carries and the channel state information of the plurality of serving cells.

In a preferred embodiment, the uplink channel resource may comprise, but are not limited to, at least one of the following: PUCCH format 2, PUCCH format 3 and PUSCH.

Figure 26:
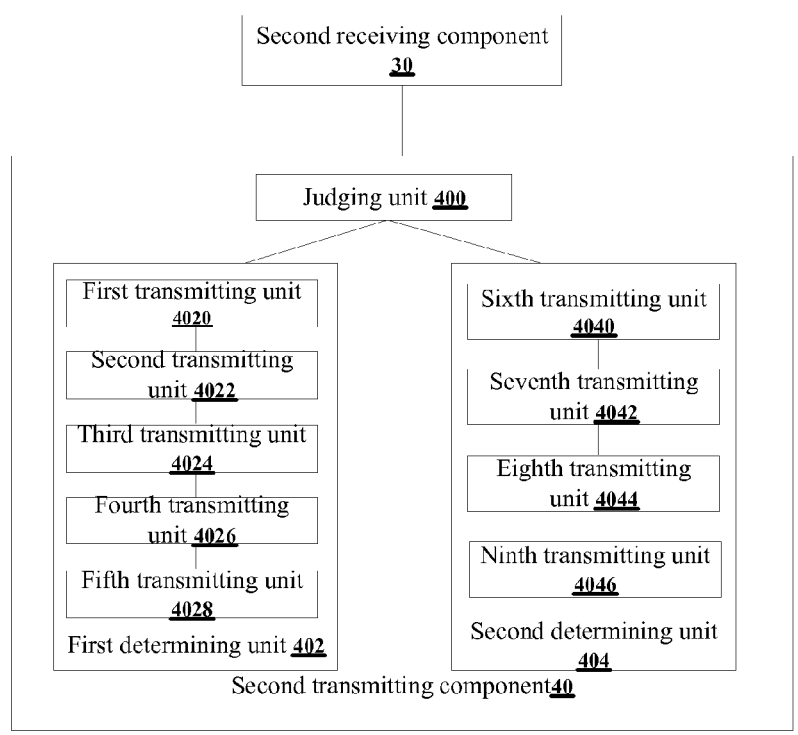
FIG. 26 is a structure diagram of another device for processing information according to a preferred embodiment one of the disclosure.

Preferably, as shown in FIG. 26, the second transmitting component 40 may comprise: a judging unit 400 configured to judge whether the plurality of serving cells of which the P-CSI is to be transmitted are in a same group; a first determining unit 402 configured to, when an output of the judging unit is yes, determine configuration information for the uplink channel resources used by the same group of serving cells according to the higher-layer signaling, and transmit the P-CSI of the plurality of serving cells on the determined uplink channel resources; and a second determining unit 404 configured to, when the output of the judging unit is no, respectively determine configuration information of the uplink channel resources used by various groups of serving cells according to the higher-layer signaling, and select from the determined uplink channel resources used by various groups of serving cells, and employ the selected uplink channel resources to transmit the P-CSI of each of the serving cells of the plurality of serving cells.

Preferably, as shown in FIG. 26, the first determining unit 402 may comprise: a first transmitting unit 4020 configured to, when the number of serving cells located in the same group is 1, and the uplink channel resources are the PUCCH format 2 or the PUCCH format 3 or the PUSCH, simultaneously transmit the P-CSI of the serving cell located in the same group on the PUCCH format 2 or the PUCCH format 3 or the PUSCH; a second transmitting unit 4022 configured to, when the number of serving cells located in the same group is 2, and the uplink channel resources are the PUCCH format 3 or the PUSCH, simultaneously transmit the P-CSI of each serving cell in the same group on the PUCCH format 3 or the PUSCH; a third transmitting unit 4024 configured to, when the number of serving cells located in the same group is greater than 2, and the uplink channel resources are the PUSCH, simultaneously transmit the P-CSI of each serving cell in the same group on the PUSCH; the fourth transmitting unit 4026 configured to, when the number of serving cells located in the same group is greater than 2, and the uplink channel resources are the PUCCH format 3, select two serving cells with the highest P-CSI priority from the same group of serving cells, and simultaneously transmit the P-CSI of each of the selected serving cells on the PUCCH format 3; and a fifth transmitting unit 4028 configured to, when the number of serving cells located in the same group is greater than 2, and the uplink channel resources are the PUCCH format 3, if the number of bits fed back together by the P-CSI of the plurality of serving cells does not exceed the maximum value of the number of bits that can be carried by the PUCCH format 3, transmit the P-CSI of the plurality of serving cells on the PUCCH format 3, otherwise select N serving cells with the highest P-CSI priority from the plurality of serving cells and simultaneously transmit the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

Preferably, as shown in FIG. 26, the second determining unit 404 may comprise: a sixth transmitting unit 4040 configured to, when the uplink channel resources used only by one of various groups of serving cells are the PUSCH, simultaneously transmit the P-CSI of the plurality of serving cells on the PUSCH; a seventh transmitting unit 4042 configured to, when the uplink channel resources used by more than one of various groups of serving cells are the PUSCH, select a PUSCH used by a serving cell with the highest P-CSI priority from the more than one of various groups of serving cells, and simultaneously transmit the P-CSI of the plurality of serving cells on the selected PUSCH; an eighth transmitting unit 4044 configured to, when the uplink channel resources used by more than one of various groups of serving cells are the PUCCH format 3, select a PUCCH format 3 used by a serving cell with the highest P-CSI priority from the multiple groups of serving cells and select two serving cells with the highest P-CSI priority from the plurality of serving cells, and simultaneously transmit the P-CSI of each of the selected serving cells on the selected PUCCH format 3; and a ninth transmitting unit 4046 configured to, when the uplink channel resources used by more than one of various groups of serving cells are the PUCCH format 3, select a PUCCH format 3 used by a serving cell with the highest P-CSI priority from the more than one of various groups of serving cells, and if the number of bits fed back together by the P-CSI of the plurality of serving cells does not exceed the maximum value of the number of bits that can be carried by the PUCCH format 3, then transmit the P-CSI of the plurality of serving cells on the selected PUCCH format 3, otherwise select N serving cells with the highest P-CSI priority from the plurality of serving cells and simultaneously transmit the P-CSI of each of the selected serving cells on the selected PUCCH format 3, wherein the number of bits fed back together by the P-CSI of the selected N serving cells does not exceed the maximum value of the number of bits that can be carried by the PUCCH format 3, with N being a positive integer.

Figure 27:
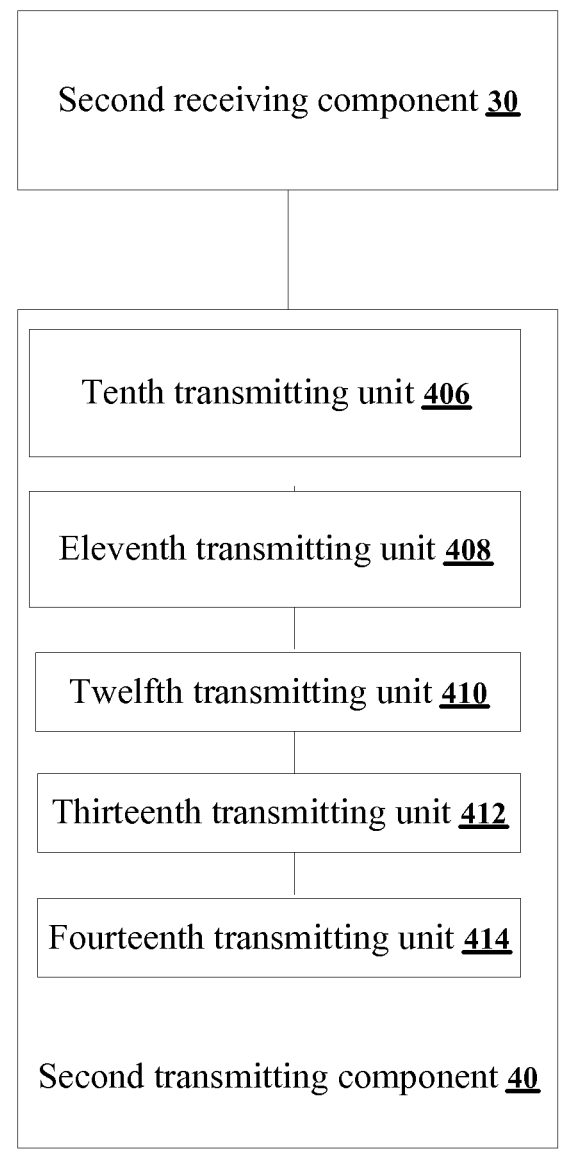
FIG. 27 is a structure diagram of another device for processing information according to a preferred embodiment two of the disclosure.

Preferably, as shown in FIG. 27, the second transmitting component 40 may comprise: a tenth transmitting unit 406 configured to, when the uplink channel resources used by the P-CSI of only one group of serving cells of groups where the plurality of serving cells are located are the PUSCH, simultaneously transmit the P-CSI of each of the plurality of serving cells and the HARQ-ACKs of the plurality of serving cells on the PUSCH; an eleventh transmitting unit 408 configured to, when the uplink channel resources used by the P-CSI of multiple groups of serving cells of the groups where the plurality of serving cells are located are the PUSCH, select a PUSCH used by a serving cell with the highest P-CSI priority from the multiple groups of serving cells, and simultaneously transmit the P-CSI of each of the plurality of serving cells and the HARQ-ACKs of the plurality of serving cells on the selected PUSCH; a twelfth transmitting unit 410 configured to, when the uplink channel resources used when the P-CSI of each of the plurality of serving cells is transmitted is not configured as the PUSCH and the HARQ-ACKs of the plurality of serving cells are configured to use the PUCCH format 3 for transmission, select a PUCCH format 3 used by a serving cell with the highest P-CSI priority from the plurality of serving cells, and simultaneously transmit the P-CSI of the selected serving cell and the HARQ-ACKs of the plurality of serving cells on the PUCCH format 3 used when the HARQ-ACKs of the plurality of serving cells are transmitted; a thirteenth transmitting unit 412 configured to, when the uplink channel resources used when the P-CSI of each of the serving cells of the plurality of serving cells is transmitted are the PUCCH format 2, and the HARQ-ACKs of the plurality of serving cells are configured to use a PUCCH format 1b combined channel selection for transmission, perform spatial bundling processing on the HARQ-ACKs of the plurality of serving cells, and judge whether the HARQ-ACKs after the spatial bundling processing exceeds 2-bit information, if not, the UE then selecting the PUCCH format 2 used by a serving cell with the highest P-CSI priority from the plurality of serving cells, and simultaneously transmitting the P-CSI of the selected serving cell and the HARQ-ACKs of the plurality of serving cells after the spatial bundling on the selected PUCCH format 2; and if so, then using a manner of PUCCH format 1b combined channel selection to transmit the HARQ-ACKs of the plurality of serving cells; and a fourteenth transmitting unit 414 configured to, when the uplink channel resources used by the P-CSI of more than one of the plurality of serving cells are the PUCCH format 3, and the HARQ-ACKs of the plurality of serving cells are configured to use the PUCCH format 1b combined channel selection for transmission, select a PUCCH format 3 used by a serving cell with the highest P-CSI priority from the plurality of serving cells, and simultaneously transmit the P-CSI of the serving cell corresponding to the selected PUCCH format 3 and the HARQ-ACKs of the plurality of serving cells on the selected PUCCH format 3.

Preferably, the second transmitting component 40 is configured to, when the P-CSI of any one of the plurality of serving cells is transmitted or the P-CSI of the plurality of serving cells is simultaneously transmitted in the preset uplink sub-frame, transmit the periodic channel state information (P-CSI) of any one of the plurality of serving cells on the uplink channel resources according to the higher-layer signaling in the preset uplink sub-frame, or simultaneously transmit the P-CSI of each of the plurality of serving cells.

Preferably, the second transmitting component 40 is configured to, when the HARQ-ACKs of the plurality of serving cells and the P-CSI of the plurality of serving cells corresponding to the UE are simultaneously transmitted in the preset uplink sub-frame, on the uplink channel resources according to the higher-layer signaling in the preset uplink sub-frame, or on an uplink channel resources used when HARQ-ACKs of the plurality of serving cells are transmitted, simultaneously transmit the HARQ-ACKs of the plurality of serving cells and the P-CSI of the plurality of serving cells by the UE.

It should be noted that the above PUSCH resource information may comprise: indexes of the physical resource blocks where the PUSCH resource are, modulation mode, frequency hopping or no frequency hopping and mode of frequency hopping From the above description, it can be seen that the above embodiments achieve the following technical effects (it should be noted that these effects are effects that some preferred embodiments can reach): implementing simultaneous transmission of acknowledgments of a plurality of downlink component carries and channel state information of a plurality of serving cells.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the disclosure are all included in the scope of the protection of the disclosure.

What is claimed is:

1. A method for processing information, comprising:

a User Equipment (UE) receiving a higher-layer signaling from a base station, wherein the higher-layer signaling carries uplink channel resources configured by the base station for the UE, and the uplink channel resources are used for simultaneously transmitting Periodic Channel State Information (P-CSI) of a plurality of serving cells corresponding to the UE, or are used for simultaneously transmitting Hybrid Automatic Repeat Request Acknowledgments (HARQ-ACKs) of the plurality of serving cells corresponding to the UE and the P-CSI of the plurality of serving cells; and the UE simultaneously transmitting the P-CSI of the plurality of serving cells, or the HARQ-ACKs of the plurality of serving cells and the P-CSI of the plurality of serving cells, on the uplink channel resources according to the higher-layer signalling in a preset uplink sub-frame;

wherein the uplink channel resources comprise at least one of the following: a Physical Uplink Control Channel Format 3 (PUCCH format 3); and a Physical Uplink Shared Channel (PUSCH);

wherein when the uplink channel resources are the PUCCH format 3, the UE simultaneously transmitting the P-CSI of the plurality of serving cells on the uplink channel resources according to the higher-layer signaling in the preset uplink sub-frame comprises:

the UE determining a number of the plurality of serving cells with the P-CSI to be transmitted in the preset uplink sub-frame;

when the determined number of the plurality of serving cells with the P-CSI to be transmitted is less than or equal to 2, the UE simultaneously transmitting the P-CSI of each of the plurality of serving cells on the PUCCH format 3; and when the determined number of the plurality of serving cells with the P-CSI to be transmitted is greater than 2, the UE selecting two serving cells with a highest P-CSI priority from the plurality of serving cells, and simultaneously transmitting the P-CSI of each of the selected serving cells on the PUCCH format 3; or the UE determining a number of bits fed back together by the P-CSI of the plurality of serving cells to be transmitted in the preset uplink sub-frame;

when the number of bits fed back together do not exceed a maximum value of the number of bits that can be carried by the PUCCH format 3, the UE simultaneously transmitting the P-CSI of each of the plurality of serving cells on the PUCCH format 3; and when the number of bits fed back together exceeds the maximum value of the number of bits that can be carried by the PUCCH format 3, the UE selecting N serving cells with the highest P-CSI priority from the plurality of serving cells and simultaneously transmitting the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer; or when the uplink channel resources are the PUCCH format 3, the UE simultaneously transmitting the HARQ-ACKs of the plurality of serving cells and the P CSI of the plurality of serving cells on the uplink channel resources according to the higher-layer signaling in the preset uplink sub-frame comprises: the UE determining the number of the plurality of serving cells with the P-CSI to be transmitted in the preset uplink sub-frame;

when the determined number of the plurality of serving cells with the P-CSI to be transmitted is I, the UE simultaneously transmitting the P-CSI of the serving cell with the P-CSI to be transmitted and the HARQ-ACKs of the plurality of serving cells on the PUCCH format 3; and when the determined number of the plurality of serving cells with the P-CSI to be transmitted is more than one, the UE selecting a serving cell with the highest P-CSI priority from the plurality of serving cells, and simultaneously transmitting the P-CSI of the selected serving cell and the HARQ-ACKs of the plurality of serving cells on the PUCCH format 3.

2. The method according to claim 1, wherein the method further comprises: when the uplink channel resources are the PUSCH, the UE simultaneously transmitting the P-CSI of the plurality of serving cells, or the HARQ-ACKs of the plurality of serving cells and the P-CSI of the plurality of serving cells on the PUSCH according to the higher-layer signaling in the preset uplink sub-frame.

3. A method for processing information, comprising:

a User Equipment (UE) receiving a higher-layer signaling from a base station, wherein the higher-layer signaling carries information of grouping a plurality of serving cells corresponding to the UE by the base station, and the base station respectively configures uplink channel resources for each group of serving cells after grouping processing; and the UE transmitting Periodic Channel State Information (P-CSI) of any of the plurality of serving cells or simultaneously transmitting the P-CSI of each of the plurality of serving cells on the uplink channel resources according to the higher-layer signaling in a preset uplink sub-frame; or, on the uplink channel resources according to the higher-layer signaling in the preset uplink sub-frame or on the uplink channel resources used when Hybrid Automatic Repeat Request Acknowledgements (HARQ-ACKs) of the plurality of serving cells are transmitted, the UE simultaneously transmitting the HARQ-ACKs of the plurality of serving cells and the P-CSI of the plurality of serving cells;

wherein the uplink channel resources comprise at least one of the following: a Physical Uplink Control Channel Format 2 (PUCCH format 2); a Physical Uplink Control Channel Format 3 (PUCCH format 3); and a Physical Uplink Shared Channel (PUSCH);

wherein the UE simultaneously transmitting the P-CSI of the plurality of serving cells on the uplink channel resources according to the higher-layer signaling in the preset uplink sub-frame comprises:

the UE judging whether the plurality of serving cells of which the P-CSI is to be transmitted are in a same group;

if the plurality of serving cells of which the P-CSI is to be transmitted are in the same group, the UE determining configuration information for the uplink channel resources used by the same group of serving cells according to the higher-layer signaling, and transmitting the P-CSI of the plurality of serving cells on the determined uplink channel resources; and if the plurality of serving cells of which the P-CSI is to be transmitted are not in the same group, the UE respectively determining the uplink channel resources used by various groups of serving cells according to the higher-layer signaling, and selecting from the determined uplink channel resources used by the various groups of serving cells, and employing the selected uplink channel resource to transmit the P-CSI of the plurality of serving cells;

wherein on the uplink channel resources according to the higher-layer signaling in the preset uplink sub-frame, or on an uplink channel resource used when HARQ-ACKs of the plurality of serving cells are transmitted, the UE simultaneously transmitting the HARQ-ACKs of the plurality of serving cells and the P-CSI of the plurality of serving cells comprises one of the following:

when the uplink channel resources used by the P-CSI of only one group of serving cells of groups where the plurality of serving cells are located are the PUSCH, the UE simultaneously transmitting the P-CSI of the plurality of serving cells and the HARQ-ACKs of the plurality of serving cells on the PUSCH;

when the uplink channel resources used by the P-CSI of multiple groups of serving cells of the groups where the plurality of serving cells are located are the PUSCH, the UE selecting a PUSCH used by a serving cell with a highest P-CSI priority from the multiple groups of serving cells, and simultaneously transmitting the P-CSI of each of the plurality of serving cells and the HARQ-ACKs of the plurality of serving cells on the selected PUSCH;

when the uplink channel resources used when the P-CSI of the plurality of serving cells is transmitted are not configured as the PUSCH and the HARQ ACKs of the plurality of serving cells are configured to use the PUCCH format 3 for transmission, the UE selecting a serving cell with the highest P-CSI priority from the plurality of serving cells, and simultaneously transmitting the P-CSI of the selected serving cell and the HARQ-ACKs of the plurality of serving cells on a PUCCH format 3 resource used when the HARQ-ACKs of the plurality of serving cells are transmitted;

when the uplink channel resources used when the P-CSI of the plurality of serving cells is transmitted are the PUCCH format 2, and the HARQ-ACKs of the plurality of serving cells are configured to use a PUCCH format 1b combined channel selection for transmission, the UE performing spatial bundling processing on the HARQ-ACKs of the plurality of serving cells, and judging whether the HARQ-ACKs after the spatial bundling processing exceeds 2-bit information, if not, the UE then selecting a PUCCH format 2 used by a serving cell with the highest P-CSI priority from the plurality of serving cells, and simultaneously transmitting the P-CSI of the selected serving cell and the HARQ-ACKs of the plurality of serving cells after the spatial bundling on the selected PUCCH format 2; and if so, the UE then using a manner of PUCCH format 1b combined channel selection to transmit the HARQ-ACKs of the plurality of serving cells; and when the uplink channel resources used by the P-CSI of more than one of the plurality of serving cells are the PUCCH format 3, and the HARQ-ACKs of the plurality of serving cells are configured to use the PUCCH format 1b combined channel selection for transmission, the UE selecting a PUCCH format 3 used by a serving cell with the highest P-CSI priority from the plurality of serving cells, and simultaneously transmitting the P-CSI of a serving cell corresponding to the selected PUCCH format 3 and the HARQ-ACKs of the plurality of serving cells on the selected PUCCH format 3.

4. The method according to claim 3, wherein the UE determining the configuration information for the uplink channel resources used by the same group of serving cells according to the higher-layer signaling, and transmitting the P-CSI of the plurality of serving cells on the determined uplink channel resources comprise one of the following:

when the number of serving cells located in the same group is 1, and the uplink channel resources are PUCCH format 2 or PUCCH format 3 or PUSCH, the UE transmitting the P-CSI of the serving cell located in the same group on the PUCCH format 2 or the PUCCH format 3 or the PUSCH;

when the number of serving cells located in the same group is 2, and the uplink channel resources are the PUCCH format 3 or the PUSCH, the UE simultaneously transmitting the P-CSI of each serving cell in the same group on the PUCCH format 3 or the PUSCH;

when the number of serving cells located in the same group is greater than 2, and the uplink channel resources are the PUSCH, the UE simultaneously transmitting the P-CSI of each serving cell in the same group on the PUSCH;

when the number of serving cells located in the same group is greater than 2, and the uplink channel resources are the PUCCH format 3, the UE selecting two serving cells with the highest P-CSI priority from the same group of serving cells, and simultaneously transmitting the P-CSI of each of the selected serving cells on the PUCCH format 3; and when the number of serving cells located in the same group is greater than 2 and the uplink channel resources are the PUCCH format 3, if the number of bits fed back together by the P-CSI of the plurality of serving cells does not exceed the maximum value of the number of bits that can be carried by the PUCCH format 3, the UE transmitting the P-CSI of the plurality of serving cells on the PUCCH format 3, otherwise the UE selecting N serving cells with the highest P-CSI priority from the plurality of serving cells and simultaneously transmitting the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer.

5. The method according to claim 3, wherein the UE respectively determining the uplink channel resources used by various groups of serving cells according to the higher-layer signaling, and selecting from the determined uplink channel resources used by various groups of serving cells, and employing the selected uplink channel resources to transmit the P-CSI of the plurality of serving cells comprise one of the following:

when the uplink channel resources used only by one of various groups of serving cells are the PUSCH, the UE simultaneously transmitting the P-CSI of the plurality of serving cells on the PUSCH;

when the uplink channel resources used by more than one of various groups of serving cells are the PUSCH, the UE selecting a PUSCH used by a serving cell with the highest P-CSI priority from the more than one of various groups of serving cells, and simultaneously transmitting the P-CSI of the plurality of serving cells on the selected PUSCH;

when the uplink channel resources used by more than one of various groups of serving cells are the PUCCH format 3, the UE selecting a PUCCH format 3 used by a serving cell with the highest P-CSI priority from the more than one of various groups of serving cells and selecting two serving cells with the highest P-CSI priority from the plurality of serving cells, and simultaneously transmitting the P-CSI of each of the selected serving cells on the selected PUCCH format 3; and when the uplink channel resources used by more than one of various groups of serving cells is the PUCCH format 3, the UE selecting a PUCCH format 3 used by a serving cell with the highest P-CSI priority from the more than one of various groups of serving cells, and if the number of bits fed back together by the P-CSI of the plurality of serving cells does not exceed the maximum value of the number of bits that can be carried by the PUCCH format 3, the UE then transmitting the P-CSI of the plurality of serving cells on the selected PUCCH format 3, otherwise the UE selecting N serving cells with the highest P-CSI priority from the plurality of serving cells and simultaneously transmitting the P-CSI of each of the selected serving cells on the selected PUCCH format 3, wherein the number of bits fed back together by the P-CSI of the selected N serving cells does not exceed the maximum value of the number of bits that can be carried by the PUCCH format 3, with N being a positive integer.

6. A device for processing information, comprising:

a first receiving component coupled with a first transmitting component and configured to receive a higher-layer signaling from a base station, wherein the higher-layer signaling carries uplink channel resources configured by the base station for a User Equipment (UE), and the uplink channel resources are used for simultaneously transmitting Periodic Channel State Information (P-CSI) of a plurality of serving cells corresponding to the UE, or are used for simultaneously transmitting Hybrid Automatic Repeat Request Acknowledgments (HARQ-ACKs) of the plurality of serving cells corresponding to the UE and the P-CSI of the plurality of serving cells; and the first transmitting component coupled with the first receiving component and configured to, according to the higher-layer signaling, simultaneously transmit the PCSI of the plurality of serving cells on the uplink channel resources in a preset uplink sub-frame, or simultaneously transmit the HARQ-ACKs of the plurality of serving cells and the P-CSI of the plurality of serving cells;

wherein the uplink channel resources comprise at least one of the following: a Physical Uplink Control Channel Format 3 (PUCCH format 3); and a Physical Uplink Shared Channel (PUSCH);

wherein the first transmitting component comprises: a first determining unit coupled with a first transmitting unit and configured to, when the uplink channel resources are the PUCCH format 3, determine a number of the plurality of serving cells to be transmitted in the preset uplink sub-frame; the first transmitting unit coupled with the first determining unit and configured to, when the number of the plurality of serving cells is less than or equal to 2, simultaneously transmit the P-CSI of each of the plurality of serving cells on the PUCCH format 3; and a second transmitting unit coupled with the first transmitting unit and configured to, when the number of the plurality of serving cells is greater than 2, select two serving cells with a highest P-CSI priority from the plurality of serving cells, and simultaneously transmit the P-CSI of each of the selected serving cells on the PUCCH format 3;

or the first transmitting component comprises: a second determining unit configured to, when the uplink channel resources are the PUCCH format 3, determine a number of bits fed back together by the P-CSI of the plurality of serving cells to be transmitted in the preset uplink sub-frame; a third transmitting unit configured to, when the number of bits fed back together by the P-CSI of the plurality of serving cells does not exceed a maximum value of the number of bits that can be carried by the PUCCH format 3, simultaneously transmit the P-CSI of each of the plurality of serving cells on the PUCCH format 3; and a fourth transmitting unit configured to, when the number of bits fed back together by the P-CSI of the plurality of serving cells exceeds the maximum value of the number of bits that can be carried by the PUCCH format 3, select N serving cells with the highest P-CSI priority from the plurality of serving cells and simultaneously transmit the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer;

or the first transmitting component comprises: a third determining unit configured to, when the uplink channel resources are the PUCCH format 3, determine the number of the plurality of serving cells with the P-CSI to be transmitted in the preset uplink sub-frame; a fifth transmitting unit configured to, when the number of the plurality of serving cells with the P-CSI to be transmitted is I, simultaneously transmit the P-CSI of the serving cell with the P-CSI to be transmitted and the HARQ-ACKs of the plurality of serving cells on the PUCCH format 3; and a sixth transmitting unit configured to, when the number of the plurality of serving cells with the P-CSI to be transmitted is more than one, select a serving cell with the highest P-CSI priority from the plurality of serving cells, and simultaneously transmit the P-CSI of the selected serving cell and the HARQACKs of the plurality of serving cells on the PUCCH format 3.

7. The device according to claim 6, wherein the first transmitting component further comprises:

a seventh transmitting unit configured to, when the uplink channel resources are the PUSCH, simultaneously transmit the P-CSI of the plurality of serving cells corresponding to the UE, or the HARQ-ACKs of the plurality of serving cells and the P-CSI of the plurality of serving cells on the PUSCH according to the higher-layer signaling in the preset uplink sub-frame.

8. A device for processing information, comprising:

a second receiving component coupled with a second transmitting component and configured to receive a higher-layer signaling from a base station, wherein the higher-layer signaling carries information of grouping a plurality of serving cells corresponding to a User Equipment (UE) by the base station, and the base station respectively configures uplink channel resources for each group of serving cells after grouping processing; and the second transmitting component coupled with the second receiving component and configured to transmit Periodic Channel State Information (P-CSI) of any of the plurality of serving cells on the uplink channel resources according to the higher-layer signaling in a preset uplink sub-frame, or simultaneously transmit the P-CSI of each of the plurality of serving cells; or, on the uplink channel resources according to the higher-layer signaling in the preset uplink sub-frame or on uplink channel resources used when Hybrid Automatic Repeat Request Acknowledgements (HARQ-ACKs) of the plurality of serving cells are transmitted, simultaneously transmit the HARQ-ACKs of the plurality of serving cells and the P-CSI of the plurality of serving cells;

wherein the uplink channel resources comprise at least one of the following: a Physical Uplink Control Channel Format 2 (PUCCH format 2); a Physical Uplink Control Channel Format 3 (PUCCH format 3); and a Physical Uplink Shared Channel (PUSCH);

wherein the second transmitting component comprises: a judging unit coupled with a first determining unit and a second determining unit and configured to judge whether the plurality of serving cells of which the P-CSI is to be transmitted are in a same group; the first determining unit coupled with the judging unit and configured to, when an output of the judging unit is yes, determine configuration information for the uplink channel resources used by the same group of serving cells according to the higher-layer signaling, and transmit the P-CSI of the plurality of serving cells on the determined uplink channel resources; and the second determining unit coupled with the judging unit and configured to, when the output of the judging unit is no, respectively determine configuration information of the uplink channel resources used by various groups of serving cells according to the higher-layer signaling, and select from the determined uplink channel resources used by the various groups of serving cells, and employ the selected uplink channel resources to transmit the P-CSI of each of the plurality of serving cells;

or the second transmitting component comprises: a tenth transmitting unit coupled with an eleventh transmitting unit and configured to, when the uplink channel resources used by the P-CSI of only one group of serving cells of groups where the plurality of serving cells are located are the PUSCH, simultaneously transmit the P-CSI of each of the plurality of serving cells and the HARQ-ACKs of the plurality of serving cells on the PUSCH; the eleventh transmitting unit coupled with the tenth transmitting unit and configured to, when the uplink channel resources used by the P-CSI of multiple groups of serving cells of the groups where the plurality of serving cells are located are the PUSCH, select a PUSCH used by a serving cell with a highest P-CSI priority from the multiple groups of serving cells, and simultaneously transmit the P-CSI of each of the plurality of serving cells and the HARQ-ACKs of the plurality of serving cells on the selected PUSCH; a twelfth transmitting unit coupled with the eleventh transmitting unit and configured to, when the uplink channel resources used when the P-CSI of each of the plurality of serving cells is transmitted are not configured as the PUSCH and the HARQACKs of the plurality of serving cells are configured to use the PUCCH format 3 for transmission, select a PUCCH format 3 used by a serving cell with the highest P-CSI priority from the plurality of serving cells, and simultaneously transmit the P-CSI of the selected serving cell and the HARQ-ACKs of the plurality of serving cells on the PUCCH format 3 used when the HARQ-ACKs of the plurality of serving cells are transmitted; a thirteenth transmitting unit coupled with the twelfth transmitting unit and configured to, when the uplink channel resources used when the P-CSI of each of the serving cells of the plurality of serving cells is transmitted are the PUCCH format 2, and the HARQ-ACKs of the plurality of serving cells are configured to use a PUCCH format 1b combined channel selection for transmission, perform spatial bundling processing on the HARQ-ACKs of the plurality of serving cells, and judge whether the HARQ-ACKs after the spatial bundling processing exceeds 2-bit information, if not, the UE then selecting the PUCCH format 2 used by a serving cell with the highest P-CSI priority from the plurality of serving cells, and simultaneously transmitting the P-CSI of the selected serving cell and the HARQ-ACKs of the plurality of serving cells after the spatial bundling on the selected PUCCH format 2; and if so, then using a manner of PUCCH format 1b combined channel selection to transmit the HARQ-ACKs of the plurality of serving cells; and a fourteenth transmitting unit coupled with the thirteenth transmitting unit and configured to, when the uplink channel resources used by the P-CSI of more than one of the plurality of serving cells are the PUCCH format 3, and the HARQ-ACKs of the plurality of serving cells are configured to use the PUCCH format 1b combined channel selection for transmission, select a PUCCH format 3 used by a serving cell with the highest P-CSI priority from the plurality of serving cells, and simultaneously transmit the P-CSI of the serving cell corresponding to the selected PUCCH format 3 and the HARQ-ACKs of the plurality of serving cells on the selected PUCCH format 3.

9. The device according to claim 8, wherein the first determining unit comprises: a first transmitting unit coupled with a second transmitting unit and configured to, when the number of serving cells located in the same group is 1, and the uplink channel resources are PUCCH format 2 or PUCCH format 3 or PUSCH, simultaneously transmit the P-CSI of the serving cell located in the same group on the PUCCH format 2 or the PUCCH format 3 or the PUSCH; the second transmitting unit coupled with the first transmitting unit and configured to, when the number of serving cells located in the same group is 2, and the uplink channel resources are the PUCCH format 3 or the PUSCH, simultaneously transmit the P-CSI of each serving cell in the same group on the PUCCH format 3 or the PUSCH; a third transmitting unit coupled with the second transmitting unit and configured to, when the number of serving cells located in the same group is greater than 2, and the uplink channel resources are the PUSCH, simultaneously transmit the P-CSI of each serving cell in the same group on the PUSCH; the fourth transmitting unit coupled with third transmitting unit and configured to, when the number of serving cells located in the same group is greater than 2, and the uplink channel resources are the PUCCH format 3, select two serving cells with the highest P-CSI priority from the same group of serving cells, and simultaneously transmit the P-CSI of each of the selected serving cells on the PUCCH format 3; and a fifth transmitting unit coupled with the fourth transmitting unit and configured to, when the number of serving cells located in the same group is greater than 2 and the uplink channel resources are the PUCCH format 3, if the number of bits fed back together by the P-CSI of the plurality of serving cells does not exceed the maximum value of the number of bits that can be carried by the PUCCH format 3, transmit the P-CSI of the plurality of serving cells on the PUCCH format 3, otherwise select N serving cells with the highest P-CSI priority from the plurality of serving cells and simultaneously transmit the P-CSI of each of the selected serving cells on the PUCCH format 3, wherein the number of bits fed back together by the P-CSI of the selected N serving cells does not exceed the maximum value of the number of bits that can be carried by the PUCCH format 3, with N being a positive integer;

and/or the second determining unit comprises: a sixth transmitting unit coupled with a seventh transmitting unit and configured to, when the uplink channel resources used only by one of various groups of serving cells are the PUSCH, simultaneously transmit the P-CSI of the plurality of serving cells on the PUSCH; the seventh transmitting unit coupled with the sixth transmitting unit and configured to, when the uplink channel resources used by more than one of various groups of serving cells are the PUSCH, select a PUSCH used by a serving cell with the highest P-CSI priority from the more than one of various groups of serving cells, and simultaneously transmit the P-CSI of the plurality of serving cells on the selected PUSCH; an eighth transmitting unit coupled with the seventh transmitting unit and configured to, when the uplink channel resources used by more than one of various groups of serving cells are the PUCCH format 3, select a PUCCH format 3 used by a serving cell with the highest P-CSI priority from the more than one of various groups of serving cells and select two serving cells with the highest P-CSI priority from the plurality of serving cells, and simultaneously transmit the P-CSI of each of the selected serving cells on the selected PUCCH format 3; and a ninth transmitting unit coupled with the eighth transmitting unit and configured to, when the uplink channel resources used by more than one of various groups of serving cells are the PUCCH format 3, select a PUCCH format 3 used by a serving cell with the highest P-CSI priority from the more than one of various groups of serving cells, and if the number of bits fed back together by the P-CSI of the plurality of serving cells does not exceed the maximum value of the number of bits that can be carried by the PUCCH format 3, then transmit the P-CSI of the plurality of serving cells on the selected PUCCH format 3, otherwise select N serving cells with the highest P-CSI priority from the plurality of serving cells and simultaneously transmit the P-CSI of each of the selected serving cells on the selected PUCCH format 3, wherein the number of bits fed back together by the P-CSI of the selected N serving cells does not exceed the maximum value of the number of bits that can be carried by the PUCCH format 3, with N being a positive integer.

\* \* \* \* \*